United States Patent
Noh et al.

(10) Patent No.: US 12,317,092 B2
(45) Date of Patent: *May 27, 2025

(54) METHOD, APPARATUS, AND SYSTEM FOR PHYSICAL CHANNEL TRANSMISSION IN UNLICENSED BAND

(71) Applicant: WILUS INSTITUTE OF STANDARDS AND TECHNOLOGY INC., Gyeonggi-do (KR)

(72) Inventors: Minseok Noh, Gyeonggi-do (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,213

(22) Filed: Mar. 28, 2024

(65) Prior Publication Data

US 2024/0298187 A1 Sep. 5, 2024

Related U.S. Application Data

(63) Continuation of application No. 18/095,619, filed on Jan. 11, 2023, now Pat. No. 11,974,140, which is a
(Continued)

(30) Foreign Application Priority Data

| Mar. 25, 2017 | (KR) | 10-2017-0038005 |
| Aug. 11, 2017 | (KR) | 10-2017-0102374 |
| Nov. 14, 2017 | (KR) | 10-2017-0151749 |

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/0446* (2013.01); *H04W 72/23* (2023.01); *H04W 74/0808* (2013.01)

(58) Field of Classification Search
CPC . H04W 16/14; H04W 72/0446; H04W 72/21; H04W 72/04; H04W 72/12;
(Continued)

(56) References Cited

U.S. PATENT DOCUMENTS

| 10,887,912 B2 | 1/2021 | Kim et al. |
| 2015/0341921 A1* | 11/2015 | Chen ................... H04W 74/004 370/330 |

(Continued)

FOREIGN PATENT DOCUMENTS

| CN | 104796920 | 7/2015 |
| CN | 105636233 | 6/2016 |

(Continued)

OTHER PUBLICATIONS

International Search Report for PCT/KR2018/003562 mailed on Jul. 13, 2018 and its English translation from WIPO (now published as WO 2018/182264).

(Continued)

*Primary Examiner* — Shantell L Heiber
(74) *Attorney, Agent, or Firm* — WOMBLE BOND DICKINSON (US) LLP

(57) ABSTRACT

A user equipment of a wireless communication system is disclosed. The user equipment includes a communication module, and a processor. The processor is configured to transmit a radio frame divided into a plurality of subframes through the communication module, and perform a UL transmission in a partial subframe having a duration shorter than one subframe duration to the base station based on at
(Continued)

least one of an indication of a base station and a result of a channel access of the wireless communication system.

16 Claims, 31 Drawing Sheets

Related U.S. Application Data continuation of application No. 17/361,313, filed on Jun. 28, 2021, now Pat. No. 11,595,824, which is a continuation of application No. 16/578,246, filed on Sep. 20, 2019, now Pat. No. 11,096,060, which is a continuation of application No. PCT/KR2018/003562, filed on Mar. 26, 2018.

(51) Int. Cl.
*H04W 72/0446* (2023.01)
*H04W 72/23* (2023.01)
*H04W 74/0808* (2024.01)

(58) Field of Classification Search
CPC ........... H04W 72/50; H04J 2203/0069; H04L 5/0094; H04L 5/0092; H04L 5/003
See application file for complete search history.

(56) References Cited

U.S. PATENT DOCUMENTS

| | | | |
|---|---|---|---|
| 2015/0365880 A1 | 12/2015 | Malladi et al. | |
| 2016/0156437 A1 | 6/2016 | Li et al. | |
| 2016/0182199 A1 | 6/2016 | Webb et al. | |
| 2017/0048860 A1 | 2/2017 | Damnjanovi et al. | |
| 2017/0142751 A1 | 5/2017 | Liu et al. | |
| 2018/0278403 A1* | 9/2018 | Yerramalli | H04L 5/0092 |
| 2018/0324828 A1 | 11/2018 | Mukherjee et al. | |
| 2020/0015094 A1 | 1/2020 | Noh et al. | |
| 2022/0110000 A1 | 4/2022 | Noh et al. | |
| 2023/0232243 A1 | 7/2023 | Noh et al. | |

FOREIGN PATENT DOCUMENTS

| | | |
|---|---|---|
| CN | 106301733 | 1/2017 |
| CN | 106304372 | 1/2017 |
| CN | 106455117 | 2/2017 |
| KR | 10-2016-0121447 | 10/2016 |
| KR | 10-2017-0017913 | 2/2017 |
| WO | 2016/163657 | 10/2016 |
| WO | 2016/163709 | 10/2016 |
| WO | 2017/014074 | 1/2017 |
| WO | 2017/030486 | 2/2017 |
| WO | 2018/182264 | 10/2018 |

OTHER PUBLICATIONS

Written Opinion of the International Searching Authority for PCT/KR2018/003562 mailed on Jul. 13, 2018 and its English translation by Google Translate (now published as WO 2018/182264).
International Preliminary Report on Patentability (Chapter I) for PCT/KR2018/003562 issued on Oct. 1, 2019 and its English translation from WIPO (now published as WO 2018/182264).
Notice of Allowance dated May 11, 2021 for U.S. Appl. No. 16/578,246 (now published as 2020/0015094).
Non-Final Office Action dated Feb. 2, 2021 for U.S. Appl. No. 16/578,246 (now published as 2020/0015094).
Office Action dated May 10, 2021 for Korean Patent Application No. 10-2019-7027580 and its English translation provided by Applicant's foreign counsel.
Office Action dated Oct. 10, 2022 for Chinese Patent Application No. 201880020634.X and its English translation provided by Applicant's foreign counsel.
Notice of Allowance dated Dec. 12, 2022 for Korean Patent Application No. 10-2021-7021071 and its English translation provided by Applicant's foreign counsel.
Notice of Allowance dated Oct. 11, 2021 for U.S. Appl. No. 17/361,313 (now published as 2022/0110000).
Notice of Allowance dated Jul. 2, 2021 for Korean Patent Application No. 10-2019-7027580 and its English translation provided by Applicant's foreign counsel.
Notice of Allowance dated Mar. 30, 2023 for Korean Patent Application No. 10-2021-7021071 and its English translation provided by Applicant's foreign counsel.
Notice of Hearing dated Mar. 23, 2023 for Indian Patent Application No. 201927038291.
Notice of Allowance dated Dec. 12, 2023 for U.S. Appl. No. 18/095,619 (now published as 2023/0232243).
Office Action dated Aug. 29, 2023 for U.S. Appl. No. 18/095,619 (now published as 2023/0232243).

* cited by examiner

METHOD, APPARATUS, AND SYSTEM FOR PHYSICAL CHANNEL TRANSMISSION IN UNLICENSED BAND

CROSS-REFERENCE TO RELATED APPLICATIONS

This application is a continuation of U.S. patent application Ser. No. 18/095,619 filed on Jan. 11, 2023, which is a continuation of U.S. patent application Ser. No. 17/361,313 filed on Jun. 28, 2021, now issues as U.S. Pat. No. 11,595,824 dated Feb. 28, 2023, which is a continuation of U.S. patent application Ser. No. 16/578,246 filed on Sep. 20, 2019, now issued as U.S. Pat. No. 11,096,060 dated Aug. 17, 2021, which is a continuation of International Patent Application No. PCT/KR2018/003562 filed on Mar. 26, 2018, which claims the priority to Korean Patent Application No. 10-2017-0038005 filed in the Korean Intellectual Property Office on Mar. 25, 2017, Korean Patent Application No. 10-2017-0102374 filed in the Korean Intellectual Property Office on Aug. 11, 2017, and Korean Patent Application No. 10-2017-0151749 filed in the Korean Intellectual Property Office on Nov. 14, 2017, the entire contents of which are incorporated herein by reference.

TECHNICAL FIELD

The present invention relates to a wireless communication system. Specifically, the present invention relates to a method, device, and system for transmitting physical channels in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

It is an object of the present invention to provide a method and device for efficiently transmitting a signal in a wireless communication system, in particular, a cellular wireless communication system. It is another object of the present invention to provide a method and device for efficiently transmitting a signal in a specific frequency band (e.g., unlicensed band). In particular, it is an object of the present invention to provide a method and device for efficiently transmitting a physical channel in a specific frequency band.

The technical object of the present invention is not limited to the above technical objects, and other technical problems that are not mentioned will be apparent to those skilled in the art from the following description.

Technical Solution

According to an embodiment of the present invention, a user equipment of a wireless communication system includes a communication module; and a processor. The processor is configured to perform UL transmission including a single or a plurality of subframes through the communication module. In this case, the processor is configured to perform uplink (UL) transmission including a single or a plurality of subframes through the communication module, and performs UL transmission in a partial subframe having a duration shorter than a duration of one subframe to a base station according to at least one of an indication of the base station and a result of a channel access of the wireless communication system. In this case, the UL transmission may include transmission of a UL channel. In addition, the UL transmission may include transmission of a reference signal.

The processor, when the user equipment accesses a channel using a channel access based random backoff, may be configured to adjust a value of a contention window used in the channel access based random backoff based on whether a transmission of a reference subframe previously transmitted by the user equipment using the channel access based random backoff is successful or not, and attempt UL transmission to the base station by accessing the channel based on the value of the contention window. In this case, the reference subframe may include the partial subframe. In addition, the contention window may indicate a range in which a natural number that determines a backoff time in a procedure of the channel access based random backoff is obtained randomly, and the value of the contention window may be the largest value among values that the natural number is capable of having.

The processor, when an earliest subframe among one or more first subframes that are continuously transmitted, by the user equipment, without a gap before a recently transmitted subframe and perform a UL transmission is the partial subframe, may be configured to determine, as the reference subframe, a subframe transmitted by the user equipment immediately after the earliest subframe among the earliest subframe and the one or more first subframes. In this case, the recently transmitted subframe may be a subframe that is transmitted most recently by the user equipment among subframes that are transmitted by the user equipment before a time point obtained by subtracting a predetermined time interval from a starting time point of a subframe including a UL grant and perform a UL transmission. In addition, the UL grant may indicate a UL transmission to the base station, which is attempted by accessing the channel based on a size of the contention window.

When the recently transmitted subframe is the partial subframe and there are no one or more first subframes, the processor may be configured to determine only the recently transmitted subframe as the reference subframe.

The recently transmitted subframe may be the partial subframe, there may be no one or more first subframes, and there may be one or more second subframes that are continuously transmitted, by the user equipment, without a gap after the recently transmitted subframe and perform a UL transmission. In this case, the processor may be configured to determine a next subframe of the recently transmitted subframe among the recently transmitted subframe and the one or more second subframes as the reference subframe.

when a new data indicator (NDI) for at least one HARQ process associated with at least one reference hybrid automatic repeat request (HARQ) process identifier (ID) is toggled, the processor may be configured to set a value of a contention window of all channel access priority classes to a minimum value of a value of a contention window corresponding to each channel access priority classes. In this case, the reference HARQ process ID may be an identifier for identifying an HARQ process of a UL-SCH in the reference subframe.

When a new data indicator (NDI) for at least one HARQ process associated with at least one reference hybrid automatic repeat request (HARQ) process identifier (ID) is not toggled, the processor may be configured to increase a value of a contention window of all channel access priority classes to a next greater value than a current value of a contention window among values allowed in a corresponding channel access priority class.

When a UL grant indicates that the user equipment is capable of starting a UL transmission to the base station at a subframe boundary and at least one transmission starting time point in a subframe, and the user equipment fails to access the channel to fail to start a UL transmission to the base station until the initial starting time point of transmission, the processor may be configured to attempt a channel access for a UL transmission to the base station before remaining starting time points of transmission other than the initial starting time point of transmission.

When the user equipment fails to access a channel to fail to start the UL transmission to the base station until the initial starting time point of transmission, the processor may be configured to determine a channel access type used in a channel access for a UL transmission to the base station after the initial starting time point of transmission based on whether the user equipment performs a transmission within a maximum channel occupancy time (MCOT) configured by the base station.

When the user equipment fails to access the channel fails to start the UL transmission to the base station until the initial starting time point of transmission and the user equipment performs the transmission within the MCOT configured by the base station, the processor may be configured to attempt to access a channel for UL transmission for the base station based on whether the channel is idle for a predetermined single time interval after the first transmission starting time point.

When the user equipment fails to access a channel and fails to start transmission for the base station until the initial starting time point of transmission, the processor may be configured to determine a channel access type used in channel access for the UL transmission to the base station after the initial starting time point of transmission based on whether the user equipment performs the transmission in the MCOT configured by the base station, regardless of the channel access type indicated by a UL grant indicating the UL transmission after the initial starting time point of transmission from the base station.

When the user equipment fails to access the channel to fails to start the UL transmission to the base station until the initial starting time point of transmission, the processor may be configured to access the channel for the UL transmission for the base station after the initial starting time point of transmission, regardless of the channel access type indicated by the UL grant indicating the UL transmission after the initial starting time point of transmission from the base station.

The channel access type may include a first type indicating a channel access based random backoff and a second type indicating channel access in which channel access is performed based on whether the channel is idle for a predetermined single time interval.

When the user equipment transmits a last subframe of a UL transmission to the base station as the partial subframe, the processor may be configured to configure the partial subframe starting from a Single Carrier (SC)-Frequency Division Multiple Access (FDMA) index 0 to an SC-FDMA symbol having an SC-FDMA symbol index of 3, 6, or 10, and end the UL transmission to the base station by transmitting the configured partial subframe.

The processor may be configured to transmit a Demodulation-Reference Signal (DM-RS) at an SC-FDMA symbol position having an SC-FDMA symbol index of 3 or 10 in a subframe.

According to an embodiment of the present invention, an operation method of a user equipment of a wireless communication system includes performing uplink (UL) transmission including a single or a plurality of subframes. In this case, the performing the UL transmission may include performing the UL transmission in a partial subframe having a duration shorter than a duration of one subframe to a base station according to at least one of an indication of the base station and a result of channel access of the wireless communication system. In this case, the UL transmission may include transmission of a UL channel. In addition, the UL transmission may include transmission of a reference signal.

The method may further include, when the user equipment accesses a channel using a channel access based random backoff, adjusting a value of a contention window used in the channel access based random backoff based on whether a transmission of a reference subframe previously transmitted by the user equipment using the channel access based random backoff is successful or not, and attempting a UL transmission to the base station by accessing the channel based on the value of the contention window. In this case, the reference subframe may include the partial subframe. In addition, the contention window may indicate a range in which a natural number that determines a backoff time in a procedure of the channel access based random backoff is obtained randomly, and the value of the contention window may be the largest value among values that the natural number is capable of having.

The adjusting the value of the contention window may include, when the earliest subframe among one or more first subframes that are continuously transmitted, by the user equipment, without a gap before a recently transmitted subframe and perform a UL transmission is the partial subframe, determining, as the reference subframe, a subframe transmitted by the user equipment immediately after the earliest subframe among the earliest subframe and the one or more first subframes. In this case, the recently transmitted subframe may be a subframe that is transmitted most recently by the user equipment among subframes that are transmitted by the user equipment before a time point obtained by subtracting a predetermined time interval from a starting time point of a subframe including a UL grant and perform UL transmission. In addition, the UL grant may indicate a UL transmission for the base station, which is attempted by accessing a channel based on the size of the contention window.

The adjusting the value of the contention window may further include, when there are no one or more first subframes, determining only the recently transmitted subframe as the reference subframe.

The adjusting the value of the contention window may further include, when there are no one or more first subframes, and there are one or more second subframes that are continuously transmitted, by the user equipment, without a gap after the recently transmitted subframe and perform a UL transmission, determining a next subframe of the recently transmitted subframe among the recently transmitted subframe and the one or more second subframes as the reference subframe.

Advantageous Effects

A wireless communication system according to an embodiment of the present invention, in particular, a cellular wireless communication system provides a method and device for efficiently transmitting signals. In addition, the wireless communication system according to an embodiment of the present invention provides a method and device for efficiently transmitting a signal in a specific frequency band (e.g., unlicensed band). In addition, the wireless communication system according to an embodiment of the present invention provides a method and device for efficiently transmitting control channels in a specific frequency band (e.g., unlicensed band).

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

This application claims priority to and the benefit of Korean Patent Application Nos. 10-2017-0038005 (2017 Mar. 25), Nos. 10-2017-0102374 (2017 Aug. 11), and Nos. 10-2017-0151749 (2017 Now. 14) filed in the Korean Intellectual Property Office and the embodiments and mentioned items described in the respective applications are included in the Detailed Description of the present application.

Figure 1:
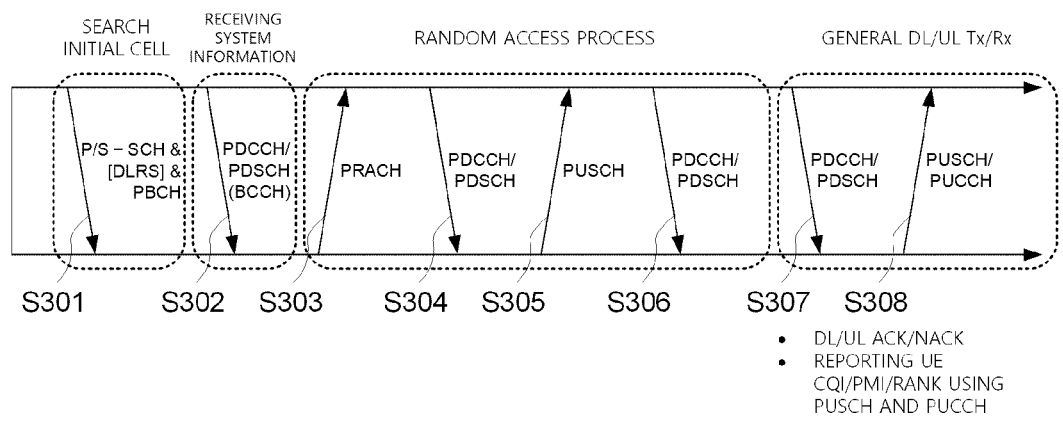
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control channel and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). Firstly, the user equipment may transmit a preamble through a physical random access channel (PRACH) (S103) and receive a response message to the preamble through the PDCCH and the PDSCH corresponding thereto (S104). When the user equipment receive a valid response message to random access, the user equipment may transmit data including an identifier of the user equipment to the base station by using the uplink(UL) grant(S105). To resolve a contention resolution, the user equipment may wait for receiving PDCCH as instruction of the base station. When the user equipment receive PDCCH by using the identifier of the user equipment (S016), random access procedure may end.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the control channel (PDCCH or E-PDCCH). The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
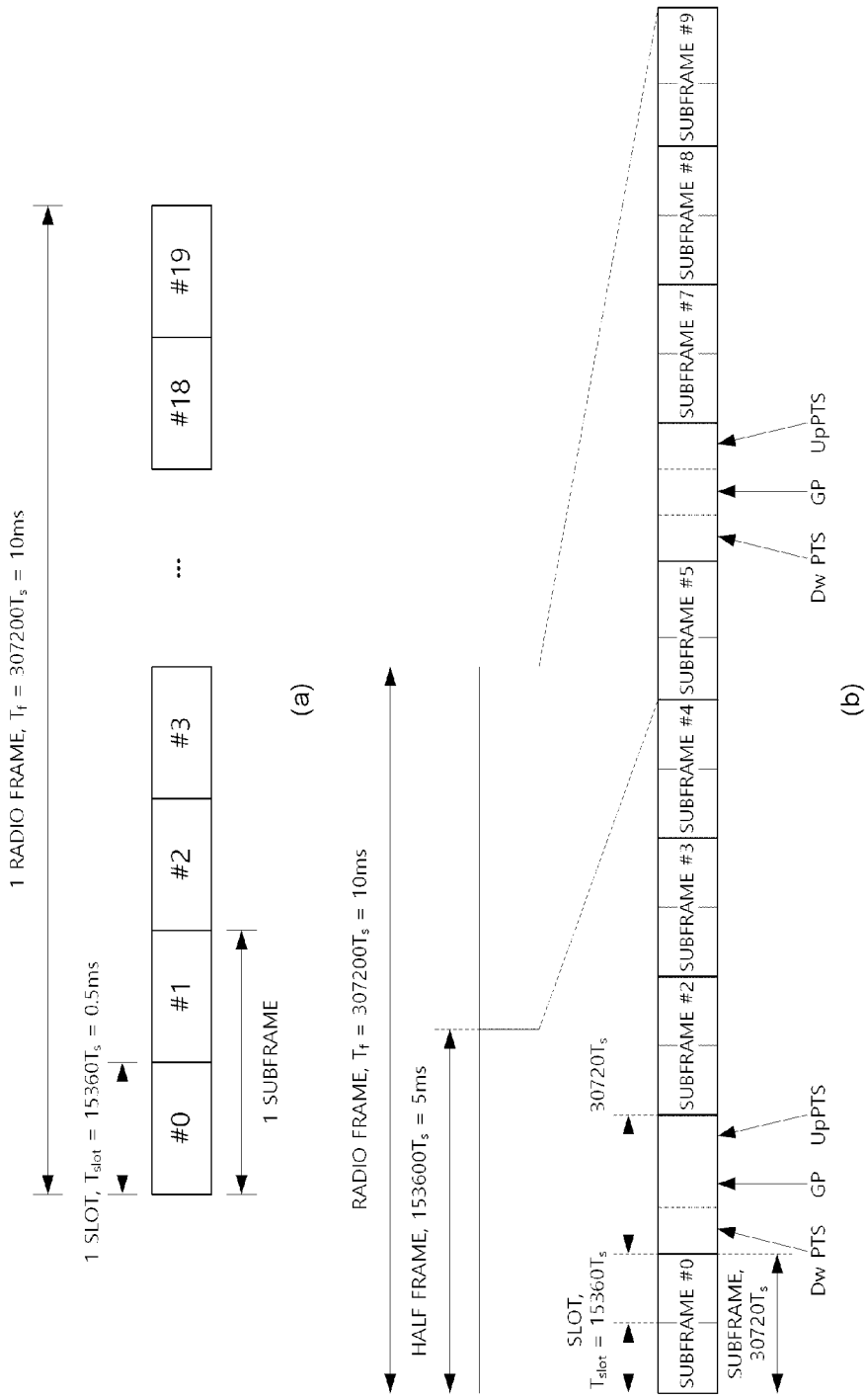
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. 20 slots in one radio frame may be sequentially numbered from 0 to 19. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
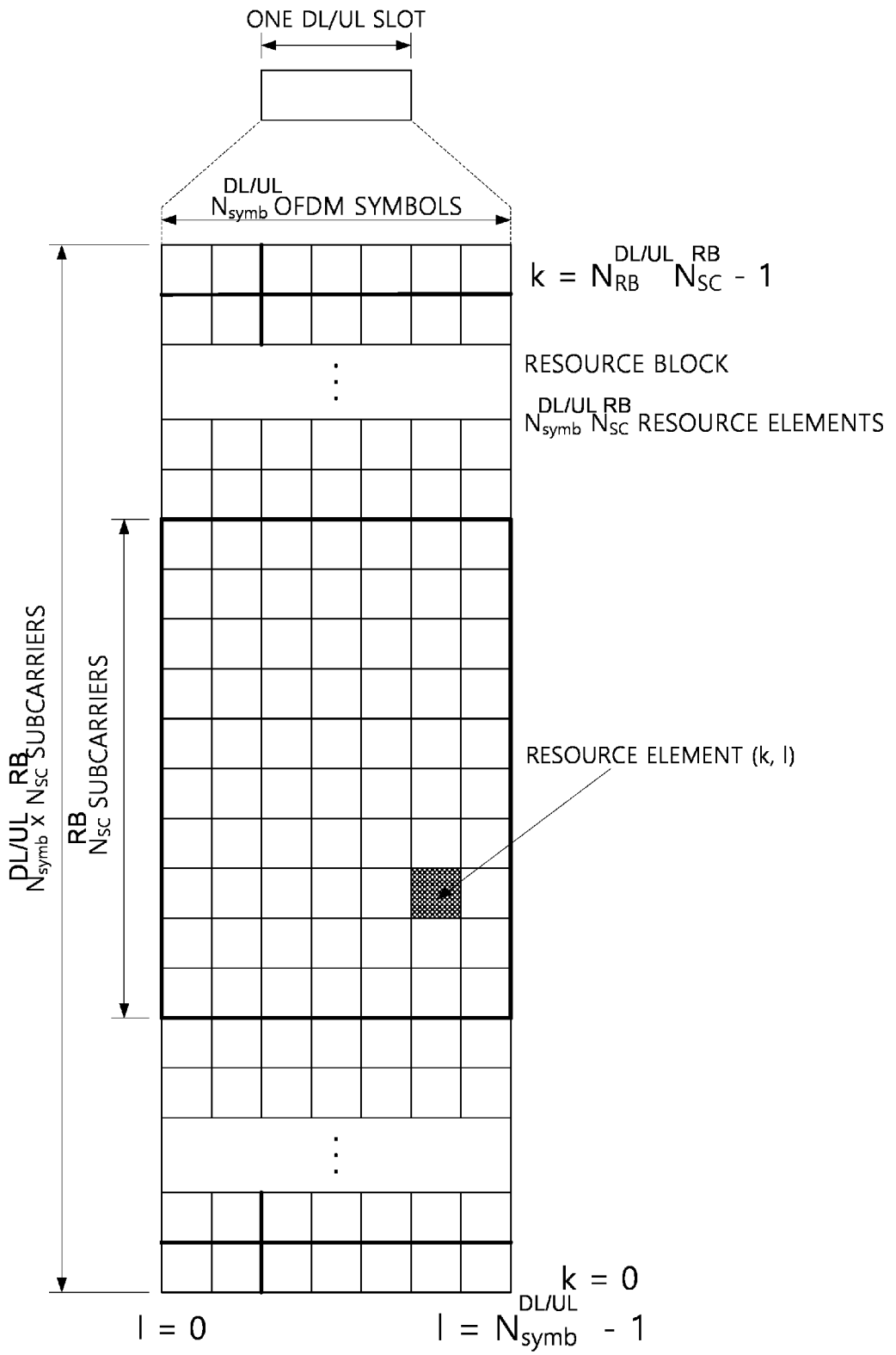
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{RB} * N^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB} * N^{RB}_{sc} - 1$ in the frequency domain and 1 represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
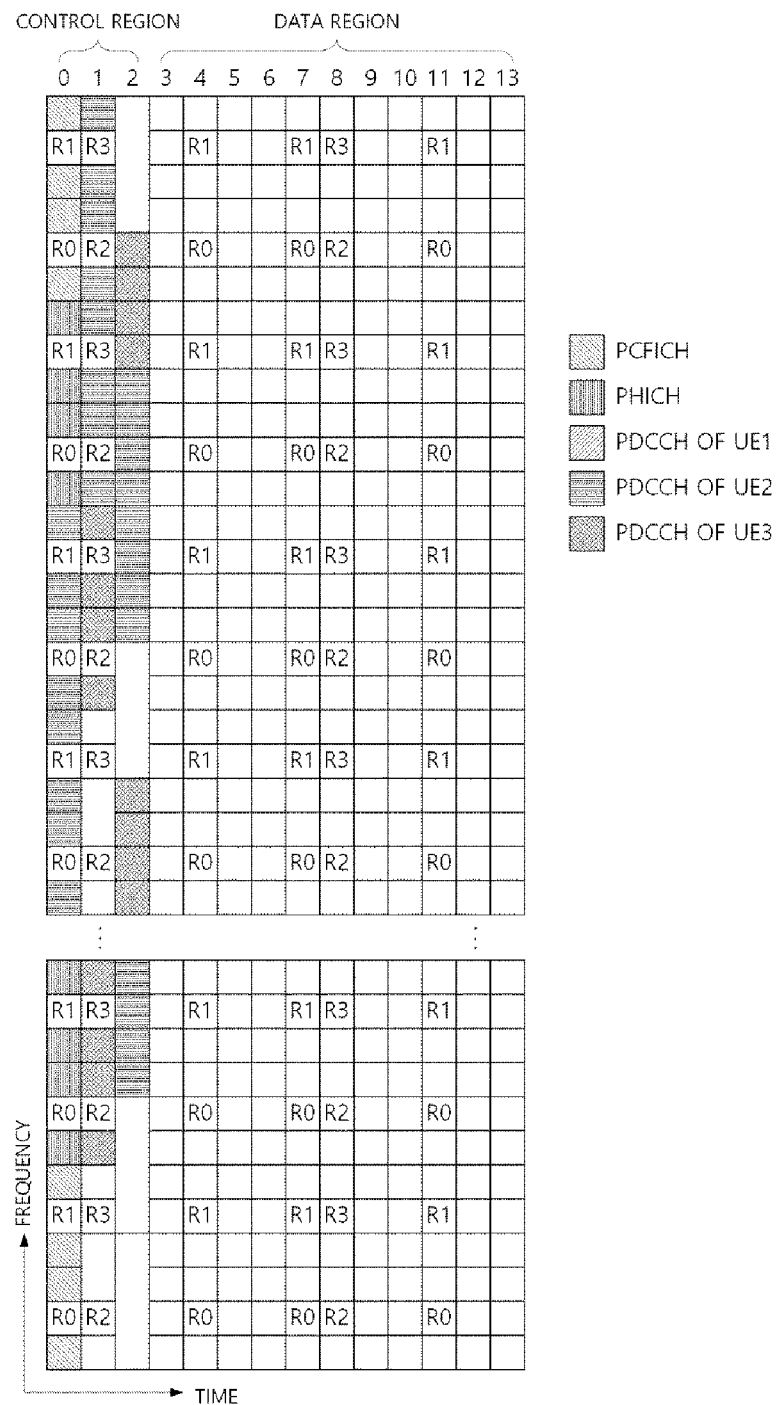
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
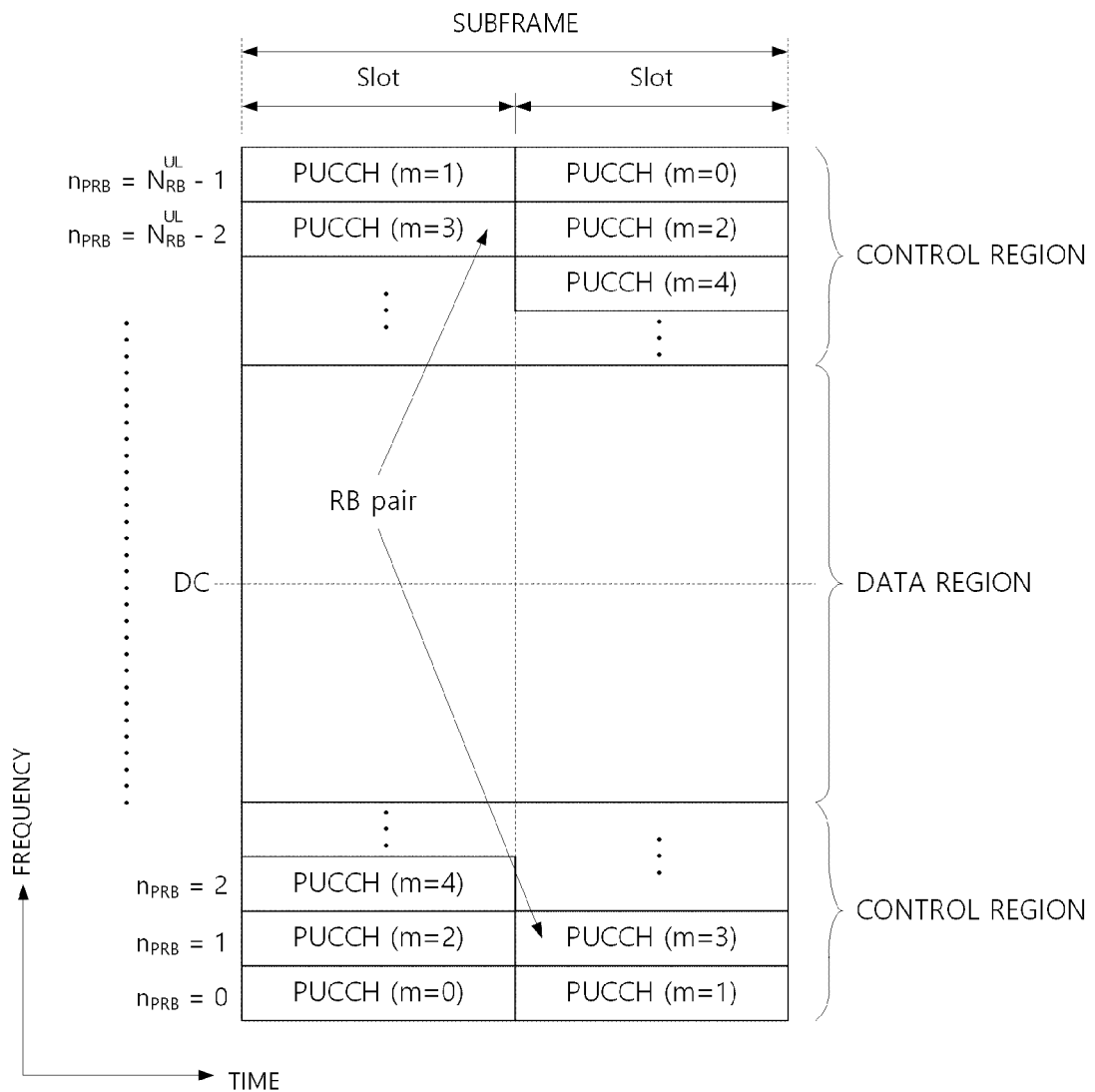
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
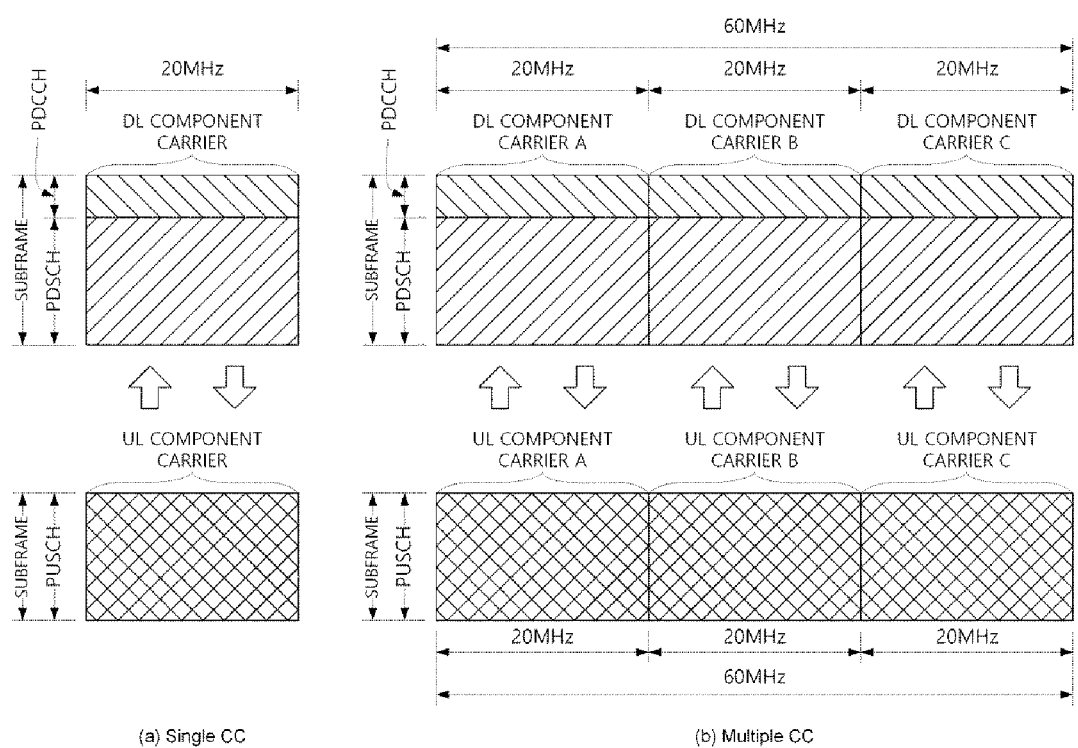
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
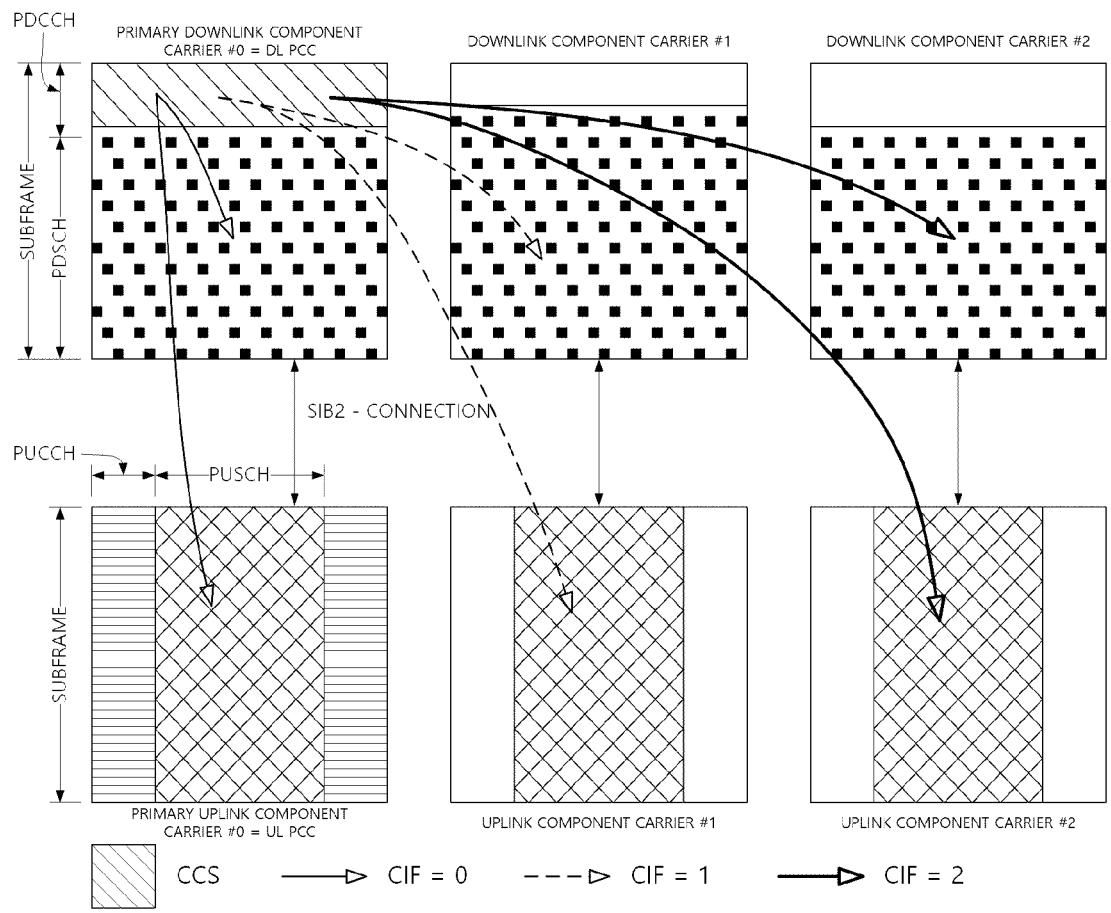
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
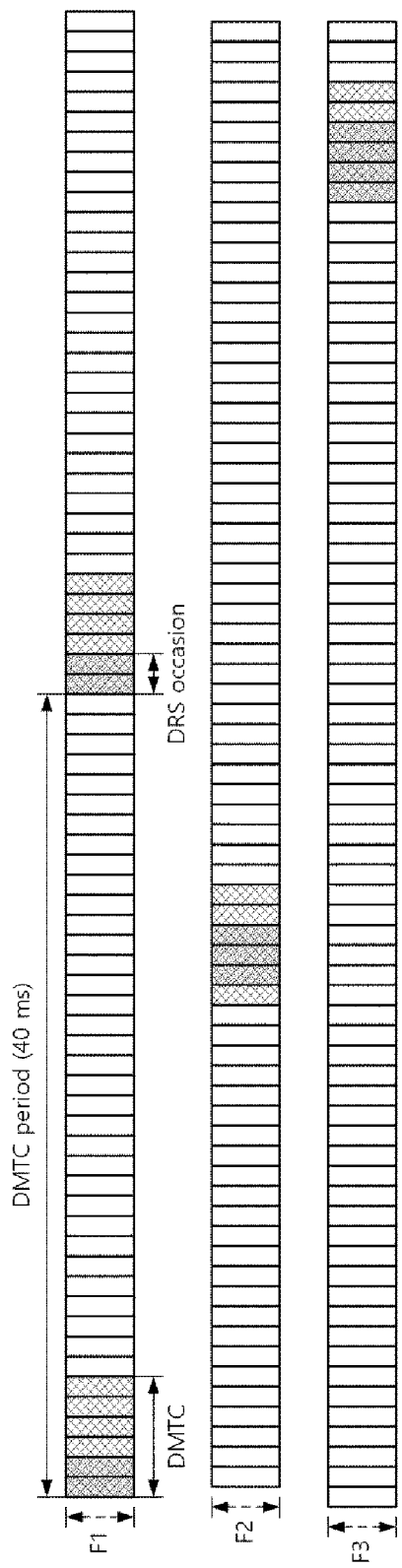
FIG. 8 illustrates Discovery Reference Signal (DRS) transmission.
Figure 9:
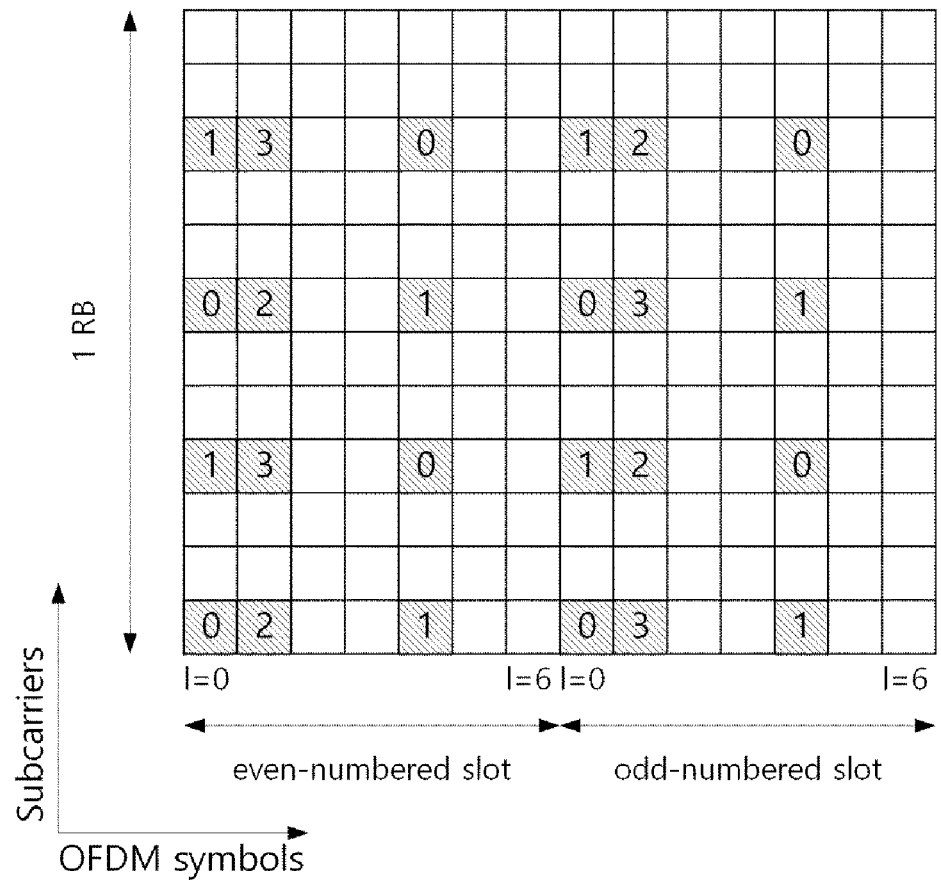
FIGS. 9 to 11 illustrate the structure of a reference signal used as DRS.
Figure 10:
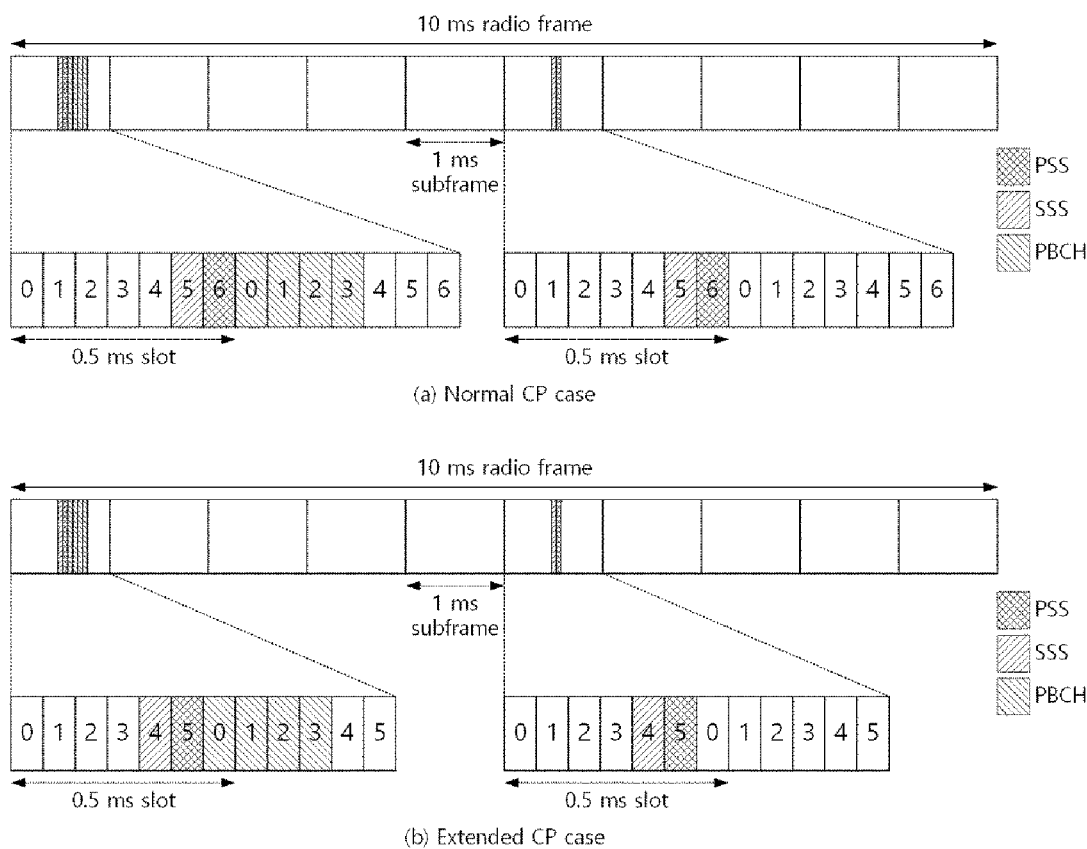
Figure 11:
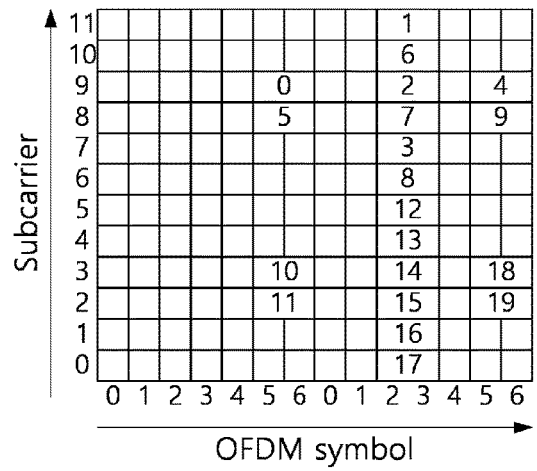
Figure 11:
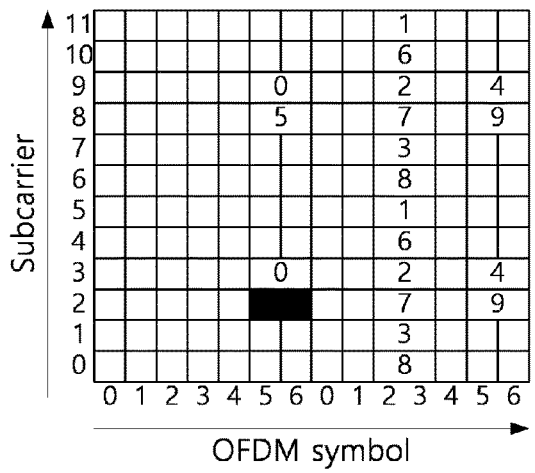
Figure 11:
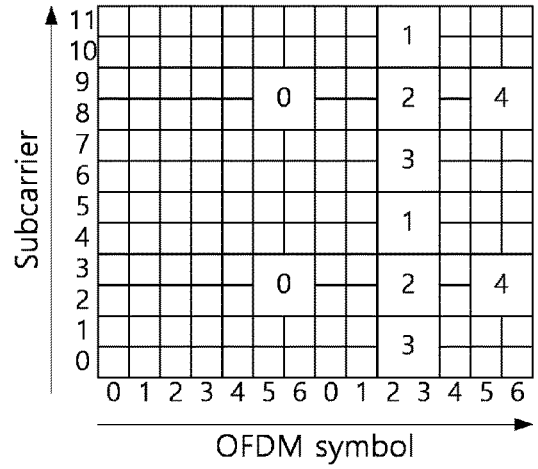

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.

Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
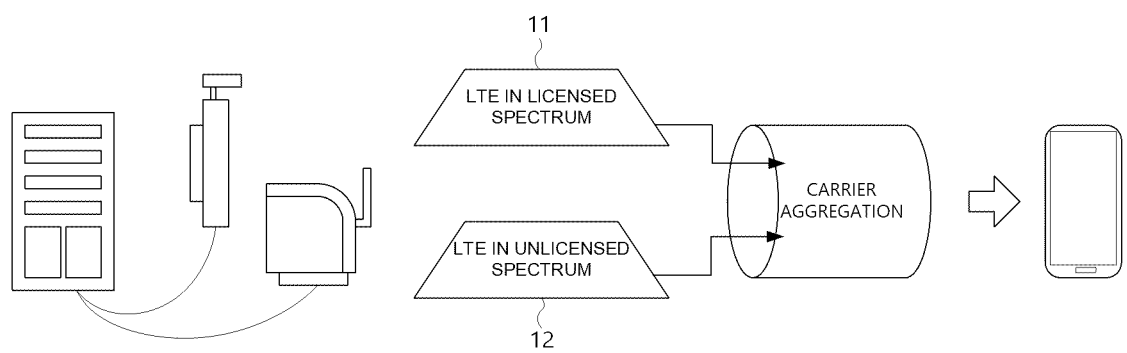
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
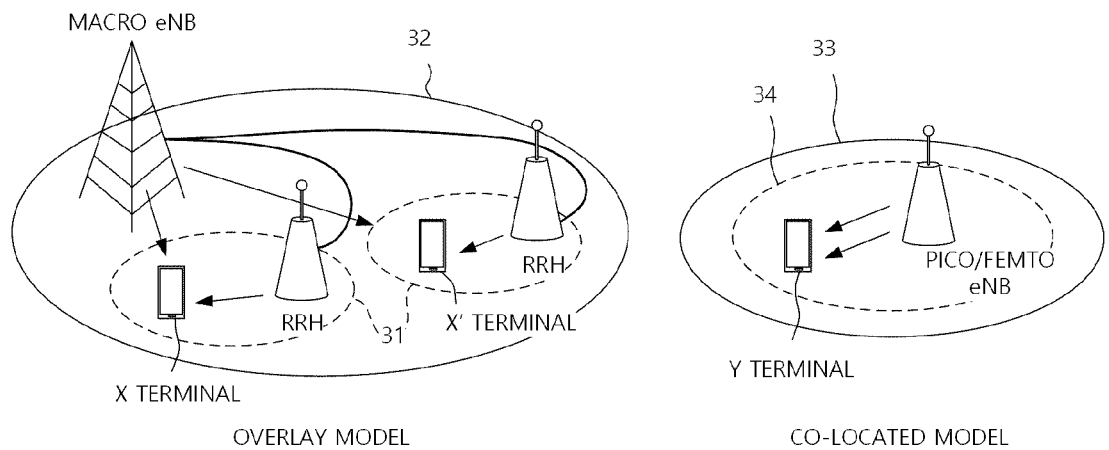
FIG. 13 illustrates a deployment scenario of a user equipment and a base station in an LAA service environment.

FIG. 13 illustrates a deployment scenario of a user equipment and a base station in an LAA service environment.

A frequency band targeted by the LAA service environment has short radio communication range due to the high frequency characteristics. Considering this, the deployment scenario of the user equipment and the base station may be an overlay model or a co-located model in an environment in which coexist the existing LTE-L service and LAA service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Therefore, conventional equipments determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
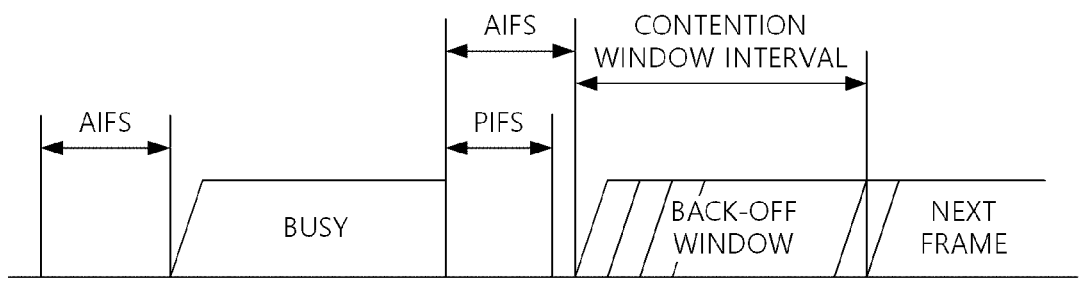
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration means a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT

An LBT procedure by a Tx entity is not performed.

Category 2: LBT without random backoff

A time interval in which the channel needs to be sensed in an idle state before the Tx entity performs a transmission on the channel is decided. The random backoff is not performed.

Category 3: LBT with random backoff with a CW of fixed size

LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4: LBT with random backoff with a CW of variable size

LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
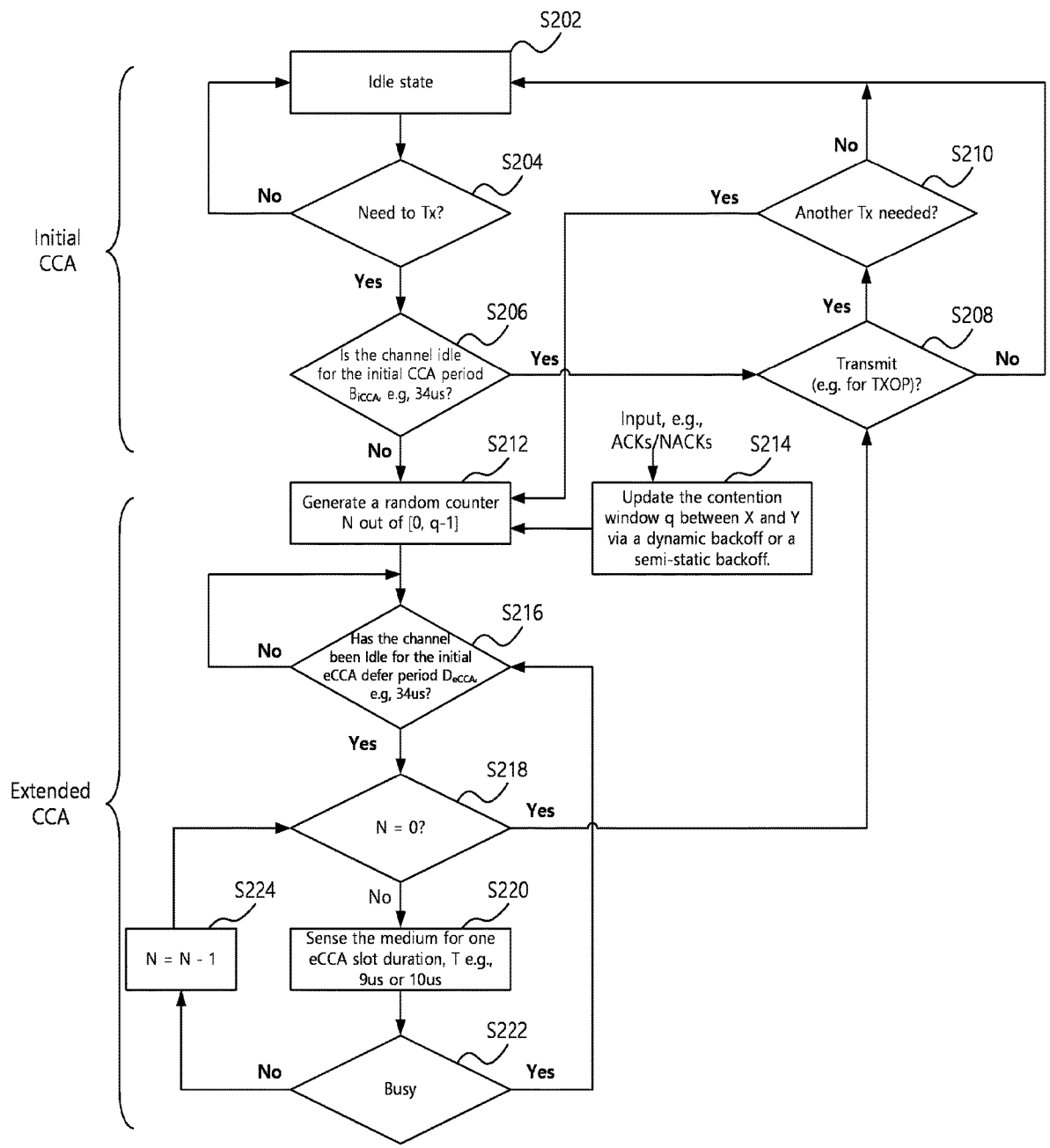
FIGS. 15 and 16 illustrate a Listen-Before-Talk (LBT) procedure for DL transmission.
Figure 16:
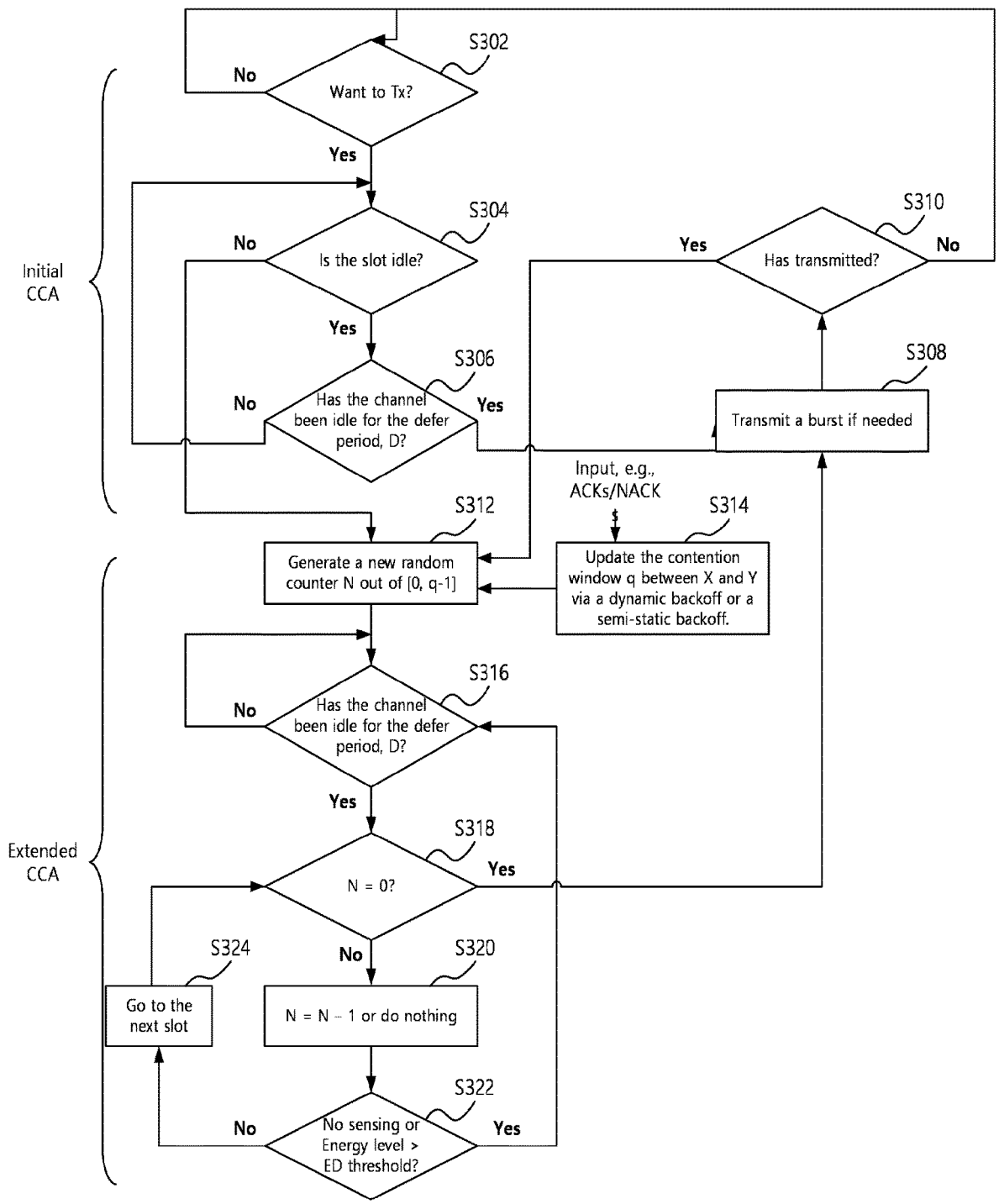

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer duration+backoff counter after setting a random backoff counter.

Referring to FIG. 15, the signal transmission process may be performed as follows.

Initial CCA

S202: The base station verifies that the channel is idle.

S204: The base station verifies whether the signal transmission is required. When the signal transmission is not required, the process returns to S202 and when the signal transmission is required, the process proceeds to S206.

S206: The base station verifies whether the channel is idle for an ICCA defer duration ($B_{CCA}$). The ICCA defer duration is configurable. As an implementation example, the ICCA defer duration may be constituted by an interval of 16 μs and n consecutive CCA slots. Herein, n may be a positive integer and one CCA slot duration may be 9 μs. The number of CCA slots may be configured differently according to a QoS class. The ICCA defer duration may be set to an appropriate value by considering a defer duration (e.g., DIFS or AIFS) of Wi-Fi. For example, the ICCA defer duration may be 34 us. When the channel is idle for the ICCA defer duration, the base station may perform the signal transmitting process (S208). When it is determined that the channel is busy during the ICCA defer duration, the process proceeds to S212 (ECCA).

S208: The base station may perform the signal transmitting process. When the signal transmission is not performed, the process proceeds to S202 (ICCA) and when the signal transmission is performed, the process proceeds to S210. Even in the case where a backoff counter N reaches 0 in S218 and S208 is performed, when the signal transmission is not performed, the process proceeds to S202 (ICCA) and when the signal transmission is performed, the process proceeds to S210.

S210: When additional signal transmission is not required, the process proceeds to S202 (ICCA) and when the additional signal transmission is required, the process proceeds to S212 (ECCA).

Extended CCA

S212: The base station generates the random number N in the CW. N is used as a counter during the backoff process and generated from [0, q−1]. The CW may be constituted by q ECCA slots and an ECCA slot size may be 9 μs or 10 μs. The CW size (CWS) may be defined as q and be variable in S214. Thereafter, the base station proceeds to S216.

S214: The base station may update CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the terminal's feedback/report (e.g., HARQ ACK/NACK) or updated/adjusted based on the base station sensing.

S216: The base station determines that the channel is idle during the ECCA defer duration (DeCCA). The ECCA defer duration is configurable. As an embodiment, the ECCA defer duration may be composed of a 16 is section and n consecutive CCA slots. Herein, n is a positive integer and one CCA slot duration may be 9 is. The number of CCA slots may be set differently according to the QoS class. The ECCA defer duration may be set to an appropriate value by considering the defer duration of Wi-Fi (e.g., DIFS and AIFS). For example, the ECCA defer duration may be 34 us. If the channel is idle during the ECCA defer duration, the base station proceeds to S218. If the channel is determined to be busy during the ECCA defer duration, the base station repeats S216.

S218: The base station checks if N is 0. If N is 0, the base station may perform a signal transmission process (S208). In this case (i.e., N=0), the base station may continue the ECCA procedure by performing CCA checking during at least one slot without performing the transmission immediately. If N is not 0 (i.e., N>0), the process proceeds to S220.

S220: The base station senses the channel for one ECCA slot duration T. The ECCA slot size may be 9 μs or 10 μs, and the actual sensing time may be at least 4 μs.

S222: If it is determined that the channel is idle, the process proceeds to S224. If it is determined that the channel is busy, the process returns to S216. That is, one ECCA defer duration is reapplied after the channel is idle, and N does not count down during the ECCA defer duration.

S224: Decrement N by 1 (ECCA countdown).

FIG. 16 is substantially the same as/similar to the transmission process of FIG. 15 and differs according to the implementation method. Therefore, the details may refer to the contents of FIG. 15.

Initial CCA

S302: The base station checks whether signal transmission is needed. If no signal transmission is required, S302 is repeated, and if signal transmission is required, the process proceeds to S304.

S304: The base station checks if the slot is idle. If the slot is idle, the process proceeds to S306. If the slot is busy, the process proceeds to S312 (ECCA). The slot may correspond to the CCA slot in FIG. 15.

S306: The base station checks that the channel is idle during the defer duration D. D may correspond to the ICCA defer duration in FIG. 15. If the channel is idle during the defer duration, the base station may perform the signal transmission process (S308). If it is determined that the channel is busy during the defer duration, the process proceeds to S304.

S308: The base station may perform the signal transmission process if necessary.

S310: If there is no signal transmission, the process proceeds to S302 (ICCA), and if there is a signal transmission, the process proceeds to S312 (ECCA). Even through the back-off counter N reaches 0 in S318 and S308 is performed, if there is no signal transmission, the process proceeds to S302 (ICCA) and if there is signal transmission, the process proceeds to S312 (ECCA).

Extended CCA

S312: The base station generates a random number N in the CW. N is used as a counter in the back-off process and is generated from [0, q−1]. The CW size CWS is defined by q and may be varied in S314. Thereafter, the base station proceeds to S316.

S314: The base station may update the CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the user equipment's feedback/report (e.g., HARQ ACK/NACK) or updated/adjusted based on the base station sensing.

S316: The base station checks that the channel is idle during the defer duration D. D may correspond to the ECCA defer duration in FIG. 15. D in S306 and S316 may be the same. If the channel is idle during the defer duration, the base station proceeds to S318. If the channel is determined to be busy during the defer duration, the base station repeats S316.

S318: The base station checks if N is 0. If N is 0, the base station may perform a signal transmission process (S308). In this case (N=0), the base station may continue the ECCA procedure by performing CCA checking during at least one slot without performing the transmission immediately. If N is not 0 (i.e., N>0), the process proceeds to S320.

S320: The base station selects one of an operation of decrementing N by 1 (ECCA countdown) and an operation of not decrementing N (self-deferral). The self-deferral operation may be performed according to the implementation/selection of the base station. At the self-deferral time, the base station does not perform sensing for energy detection and does not perform ECCA countdown.

S322: The base station may select one of an operation not to perform sensing for energy detection and an energy detection operation. If sensing for energy detection is not performed, the process proceeds to S324. When the energy detection operation is performed, if the energy level is lower than the energy detection threshold value (i.e., idle), the process proceeds to S324. If the energy level exceeds the energy detection threshold value (i.e., busy), the process returns to S316. That is, one defer duration is reapplied after the channel is idle, and N does not count down during the defer duration.

S324: The process proceeds to S318.

The channel access procedure described with reference to FIGS. 15 and 16 may be used not only for DL transmission but also for UL transmission. Therefore, the base station as well as the user equipment may access the channel according to the channel access procedure described with reference to FIG. 15 and FIG. 16. In the channel access procedure described with reference to FIG. 15 and FIG. 16, the wireless communication device waits for a slot duration by a random number in order to disperse access time points of various wireless communication devices that perform channel access. Therefore, the probability of selecting one of the values in the above-described CWS is uniform. In addition, for the purpose of access distribution, the wireless communication device should wait for another time according to the obtained random number.

As described above, the wireless communication device determines whether the channel is idle during the defer duration. After the defer duration, the wireless communication device waits based on the counter value N determined based on the random number and the slot duration. At this time, the base station may start traffic transmission when the counter value N is 0. In a specific embodiment, the traffic may be a data channel. Specifically, the data channel may be either a PDSCH or a PUSCH. In yet another specific embodiment, the traffic may be a control channel. At this time, the control channel may be a PDCCH or an EPDCCH. The wireless communication device sets the counter value N to be randomly selected for access distribution and determines whether the channel to be accessed during a slot duration is idle according to the corresponding counter value. For convenience of explanation, this counter value setting procedure is referred to as a random counter value setting procedure.

Specifically, the wireless communication device senses whether the channel is idle during the defer duration. When the channel is idle during the defer duration, the wireless communication device may set the counter value according to the following procedure.

1) The wireless communication device sets counter (N)=Ninit. Ninit is a random number uniformly distributed within 0 and $CW_p$.
2) When N>0 and the wireless communication device determines to decrease N, set N=N−1.
3) Senses the channel during one additional slot duration, and when the channel is idle during that one slot duration, the wireless communication device goes to step 4), otherwise goes to step 5).
4) When N=0, the wireless communication device stops the counter value setting procedure. When not N=0, the wireless communication device goes to step 2). 5) The wireless communication device senses the channel during one additional defer duration.
6) When the channel is idle during a plurality of slot durations that include one additional defer duration, the wireless communication device goes to step 2), and when the channel is not idle during that one additional defer duration, the wireless communication device goes to step 5).

When the wireless communication terminal fails to transmit traffic on the channel to be accessed in step 4) in the above-described procedure, the wireless communication terminal may transmit traffic when the channel is idle during one additional defer duration. In addition, when the wireless communication device stops the counter value setting procedure, the wireless communication device starts the traffic transmission.

When the traffic includes a data channel, the defer duration may be set according to the channel access priority class of the traffic that the data channel is included in. At this time, the channel access priority class may be a channel access priority class. Also, the defer duration may be composed of 16 us (Tf) and mp number of slot durations. At this time, each slot duration Tsl may be 9 us. Tf includes one idle slot duration Tsl. Also, the mp value may be set according to the channel access priority class as shown in Table 2 below.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may also set a range of CW values according to the channel access priority class. Specifically, the wireless communication device may set the range of the CW values to satisfy $CW_{min,p} \leq CW_p \leq CW_{max,p}$. At this time, the value of $CW_{min,p}$ and the value of $CW_{max,p}$ may be determined according to the channel access priority class as shown in Table 2 described above. Also, the wireless communication device may set the value of $CW_{min,p}$ and the value of $CW_{max,p}$ in step 1) of the counter value setting procedure. During channel access, the base station may adjust the CW value as described above.

Also, the maximum transmission duration $T_{\_mcot,p}$ (maximum channel occupancy time (MCOT)) that may be used in one transmission through a channel included in the unlicensed band may be determined according to the channel access priority of the transmitted data. Specifically, it may be determined as shown in Table 2 above.

Accordingly, the wireless communication device should not maintain a transmission continuously more than a time T_mcot,p. In the unlicensed band, since it is a frequency band accessed by several wireless communication devices through contention procedures, it is not preferable that any one of the wireless communication devices continuously use the frequency band for a predetermined time or more. In Table 2, when the value of the channel access priority class is p=3 or p=4, in a long term, the unlicensed band is used according to the rule, and there is no wireless communication device using other technology, the wireless communication device may set to $T_{\_mcot,p}=10$ ms. Otherwise, the wireless communication device may set to $T_{\_mcot,p}=8$ ms.

Also, the wireless communication device determines whether the channel is idle based on an energy detection (ED) threshold value. Specifically, the wireless communication device may determine that the channel is idle when the energy detected by the channel is smaller than the threshold value. At this time, the ED threshold value may vary depending on whether or not a wireless communication device using other technology coexists. In addition, the ED threshold may vary depending on the country and region. Specifically, the ED threshold value may be determined as shown in Table 3 below.

TABLE 3

| Case | ED adaptation rule | Note |
|---|---|---|
| Case 1: Coexistance with other technologies | $X_{Thresh\_max} = \max \begin{cases} -72\ dBm(20\ \text{MHz}), \\ \min \begin{cases} T_{max}, \\ T_{max} - T_A + (P_H - P_{TX}) \end{cases} \end{cases}$ $P_H = 23\ dB$ | $T_A$ = 10 dB for fx(s) including PDSCH; $T_A$ = 5 dB for fx(s) including DRS transmission(s) and not including PDSCH |

TABLE 3-continued

| Case | ED adaptation rule | Note |
|---|---|---|
| | $P_{TX}$ is the set Max eNB output power in dBm for the carrier | |
| Case 2: Absence of Wi-Fi(e.g: by level of regulation) | $X_{Tresh\_max} = \min\left\{\begin{array}{l}T_{max} + 10 \text{ dB,} \\ X,\end{array}\right\}$ | |
| | $Xr[dBm]$ is MAX ED threshold defined by regulation | |
| | Otherwise | |

In this case, the value of $T_{-max}$ in Table 3 may be determined as shown in the following equation.

$$T_{max}(dBm) = 10 \cdot \log 10\left(3.16228 \cdot 10^{-8}(mW/MHz) \cdot BWMHz\right) \text{ (MHz)}$$

The wireless communication device may perform transmission through a plurality of carriers. Thus, the embodiments described above may be used equally when a wireless communication device accesses a channel on any one carrier as well as through a plurality of carriers. At this time, channel access methods for a plurality of carriers may be distinguished as follows. When the wireless communication device performs the channel access procedure independently from each of a plurality of carriers, the corresponding channel access may be classified as Type A. In this case, when the wireless communication device obtains a random number independently for each carrier, the corresponding channel access may be classified as Type A1. Also, when one random number is obtained and used based on the largest CWS among the CWS corresponding to each carrier, the corresponding channel access may be classified as Type A2. In addition, when a wireless communication device accesses a channel on a plurality of carriers based on the channel access procedure for any one carrier, the corresponding channel access may be classified as Type B.

When a wireless communication device accesses a channel on a plurality of carriers according to the classification described above, the wireless communication device may not be able to start transmissions simultaneously on a plurality of carriers. This is because channel states corresponding to each of a plurality of carriers may be different from each other and channel access parameters corresponding to each of a plurality of carriers, for example, defer duration may be different. At this time, due to the RF leakage occurring from the channel or the carrier which starts transmission relatively first, the wireless communication device may not be able to transmit signals on the channel or carrier that starts transmission at a relatively later time.

Therefore, the wireless communication device may perform an operation for starting transmission simultaneously on a plurality of carriers in the counter value setting procedure described above. Specifically, in the counter value setting procedure described above, the wireless communication device may selectively subtract 1 from the counter value. Through this, the wireless communication device may delay the start of transmission on any one channel. As described above, this may be referred to as self-deferral.

Figure 17:
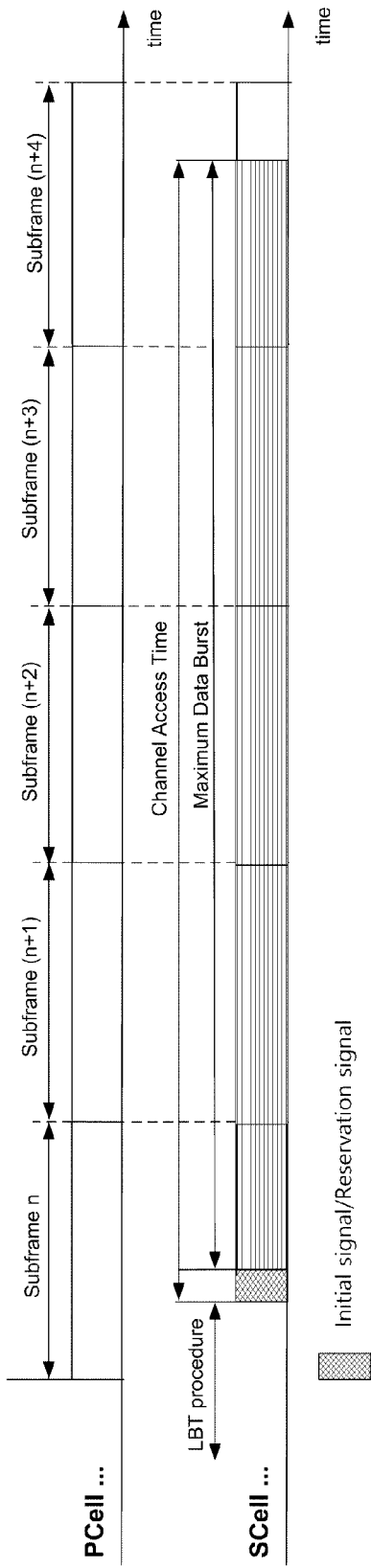
FIG. 17 shows a resource used by a base station after an LBT procedure in an unlicensed band according to an embodiment of the present invention.

FIG. 17 shows a resource used by a base station after an LBT procedure in an unlicensed band according to an embodiment of the present invention.

In a cellular wireless communication system, radio resources may be allocated in units of a subframe. In this case, the base station and the UE access the radio resource based on the subframe boundary. As described above, when the base station or a user equipment accesses the unlicensed band, it is required to perform a contention procedure unlike the licensed band. Specifically, the base station or the user equipment may perform an LBT procedure or a channel sensing procedure to access the unlicensed band.

Specifically, as in the embodiment of FIG. 17, a base station or a user equipment may transmit a PCell in a frequency band (e.g., a licensed band) in which the contention procedure is not performed, and transmit an SCell in an unlicensed band. In addition, the base station or user equipment may obtain transmission opportunities through the LBT procedure in an SCell. In this case, the start of the transmission opportunity on the SCell obtained by the base station or the user equipment may not match the boundaries of subframes as shown in FIG. 17. If the base station or user equipment waits after the contention procedure to access the channel based on the subframe boundaries, the base station or user equipment may lose the transmission opportunity obtained through the contention procedure to other wireless communication terminals.

Therefore, the base station or the user equipment is required to schedule the transmission time point of the data channel and the control channel through a method different from that used in the licensed band. Specifically, the base station or the user equipment may access radio resources regardless of the subframe boundaries in the unlicensed band. In a specific embodiment, the base station or user equipment may start transmitting and receiving at any time point within the subframe in the unlicensed band. In this case, when the base station or the user equipment performs transmission during a time interval shorter than one subframe, the corresponding time interval is referred to as a partial subframe. In the embodiment of FIG. 17, the base station or the user equipment starts transmission in the SCell from the middle of the time interval corresponding to the n-th subframe Subframe n of the PCell.

Also, in the case of the unlicensed band, the maximum time that the wireless communication device may occupy the wireless resources may be limited. Therefore, the base station or user equipment may transmit partial subframes at the end of transmission. In the embodiment of FIG. 17, the base station or the user equipment ends the transmission in the SCell in the middle of the time interval corresponding to the (n+4)-th subframe Subframe n+4 of the PCell.

In addition, the base station or the user equipment may transmit a signal to occupy radio resources before starting transmission. In this case, the signal for occupying the radio resource may be at least one of an initial signal indicating the start of transmission, a reservation signal including no information, an LAA preamble, and DRS. In this case, DRS may be Rel-12 DRS, or may be a combination of PSS, SSS, CRS, CSI-RS or a corresponding subset. Also, the signal for occupying the radio resource may be for matching the OFDM symbol unit (granularity) of the signal transmitted from the base station or the user equipment.

The operation of the base station and the user equipment in the unlicensed band will be described in detail with reference to FIGS. 18 to 23. In particular, an embodiment in which the base station transmits a physical channel to the user equipment in the unlicensed band will be described with reference to FIGS. 18 to 23. Meanwhile, the base station in the specification may indicate at least one of a Transmission Point (TP), an Access Point (AP), and a Radio Remote Host (RRH).

Figure 18:
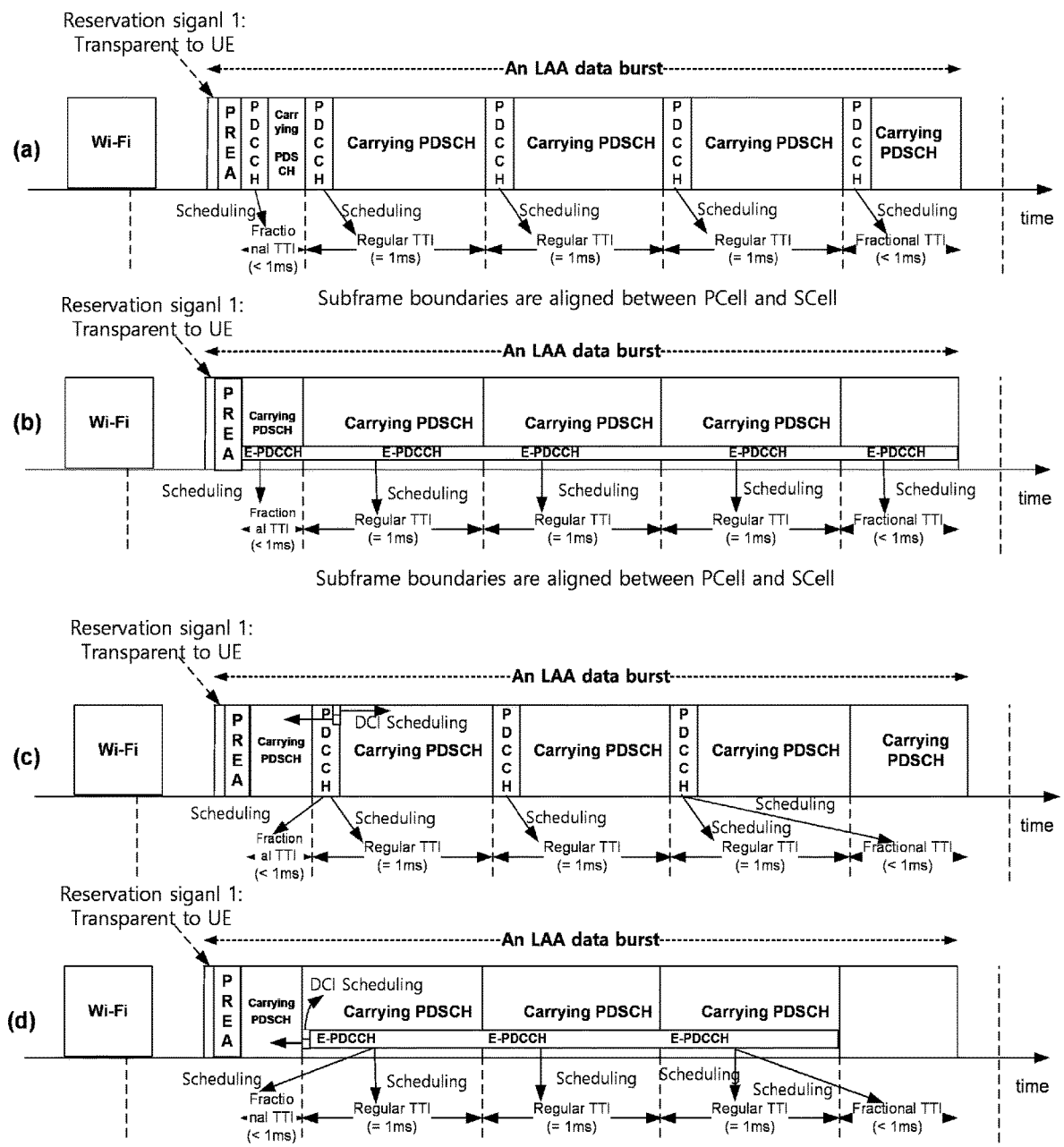
FIG. 18 shows a method of a base station to transmit a control channel for scheduling partial subframes after an LBT procedure in an unlicensed band according to an embodiment of the present invention.

FIG. 18 shows a method of a base station to transmit a control channel for scheduling partial subframes after an LBT procedure in an unlicensed band according to an embodiment of the present invention. Specifically, FIG. 18 shows that the base station transmits one partial subframe at the start of transmission, transmits three general subframes, and transmits one partial subframe again after transmitting three general subframes.

The base station may transmit a control channel at each subframe transmitting data. Specifically, the base station may transmit PDCCH and EPDCCH for each subframe transmitting the PDSCH. In this case, the control channel may only schedule data transmitted in the same carrier as the carrier in which the control channel is transmitted. For example, the base station may transmit the self-carrier scheduling control channel as described above. In yet another embodiment, the control channel may also schedule data transmitted in a carrier different from the carrier in which the control channel is transmitted. For example, the base station may transmit a control channel for cross-carrier scheduling as described above. When the base station transmits data and control channels for scheduling data in the licensed band, the base station transmits control channels from the beginning of the subframe. However, when accessing a channel of a frequency band through a contention procedure like an unlicensed band, a base station may transmit partial subframes. When a base station transmits data through a partial subframe, it is a matter of how to transmit a control channel for scheduling data to be transmitted through the partial subframe by the base station.

A base station according to an embodiment of the present invention may transmit, through a partial subframe, a control channel for scheduling data transmitted through the partial subframe. Specifically, the base station may transmit a control channel for scheduling data transmitted through the partial subframe before data transmission through the partial subframe. In this case, the control channel may be at least one of a PDCCH and an EPDCCH. For example, at the start of transmission, the base station may transmit a PDSCH after transmitting a preamble in the partial subframe and PDCCH for scheduling PDSCH, as in the embodiment of FIG. 18(a). At the end of the transmission, the base station may transmit the PDSCH after transmitting the PDCCH for scheduling the PDSCH in the partial subframe as in the embodiment of FIG. 18(a). Also, at the start of transmission, the base station may transmit a preamble in the partial subframe as in the embodiment of FIG. 18(b) and start transmission of E-PDCCH and PDSCH for scheduling PDSCH. At the end of the transmission, the base station may simultaneously transmit E-PDCCH and PDSCH for scheduling PDSCH in the partial subframe as in the embodiment of FIG. 18(b).

In another embodiment, the base station may transmit a control channel for scheduling data transmitted through a subframe next to a partial subframe or a subframe before the partial subframe. In this case, the base station does not transmit the control channel through the partial subframe. In this case, the control channel may be at least one of a PDCCH and an EPDCCH. In addition, the control channel may include an indicator indicating that data scheduled by the control channel is transmitted through the partial subframe. The DCI included in the PDCCH and the EPDCCH may include an indicator indicating that data scheduled by the PDCCH and the EPDCCH is transmitted through the partial subframe. For example, after transmitting a preamble in a partial subframe and transmitting a PDSCH, as in the embodiment of FIG. 18(c), at the start of transmission, the base station may transmit the PDSCH transmitted in the partial subframe and the PDCCH for scheduling the PDSCH transmitted through the corresponding subframe in the next subframe of the partial subframe. At the end of the transmission, the base station may transmit the PDSCH transmitted in the partial subframe in the previous subframe of the partial subframe and the PDCCH for scheduling the PDSCH transmitted in the corresponding subframe, as in the embodiment of FIG. 18(c). In addition, after transmitting a preamble in a partial subframe and transmitting a PDSCH, as in the embodiment of FIG. 18(d), at the start of transmission, the base station may transmit the PDSCH transmitted in the partial subframe and the E-PDCCH for scheduling the PDSCH transmitted through the corresponding subframe in the next subframe of the partial subframe. At the end of the transmission, the base station may transmit the PDSCH transmitted in the partial subframe in the previous subframe of the partial subframe and the E-PDCCH for scheduling the PDSCH transmitted in the corresponding subframe, as in the embodiment of FIG. 18(d).

As mentioned above, the base station may transmit a reservation signal or an initial signal before partial subframe transmission.

In the embodiment described above, the base station treats the partial subframe as a separate subframe. In another embodiment, the base station may treat the partial subframe and the other subframe as one subframe having a TTI value larger than the TTI value of a general subframe. For convenience of explanation, a subframe having a TTI value larger than a TTI value of a general subframe is referred to as a super subframe. In addition, a subframe having a general TTI value for distinguishing from the super subframe is referred to as a general subframe. A method of a base station to transmit the super subframe will be described with reference to FIG. 19.

Figure 19:
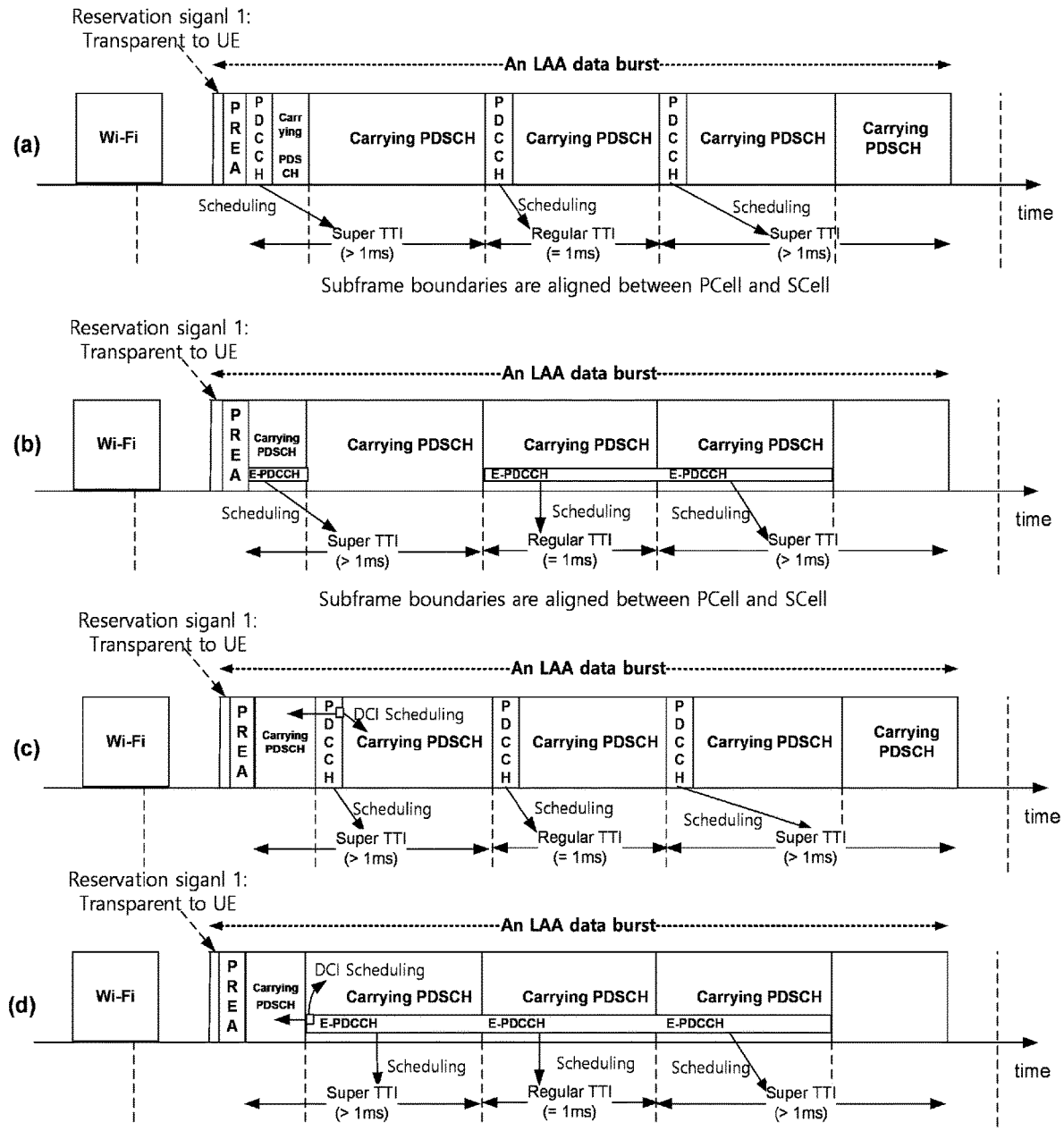
FIG. 19 shows a method of a base station to transmit a control channel for scheduling super subframes after an LBT procedure in an unlicensed band according to an embodiment of the present invention.

FIG. 19 shows a method of a base station to transmit a control channel for scheduling the super subframes after an LBT procedure in an unlicensed band according to an embodiment of the present invention. Specifically, FIG. 19 shows that the base station transmits one super subframe at the start of transmission, and then transmits one super subframe again after transmitting one general subframe.

A base station according to an embodiment of the present invention may transmit a control channel for scheduling data transmitted through a partial subframe, through a partial subframe. Specifically, the base station may transmit a control channel for scheduling data transmitted through a super subframe before data transmission through a super subframe. In this case, the control channel may be at least one of a PDCCH and an EPDCCH. For example, at the start of transmission, the base station may transmit a PDSCH after transmitting a preamble in a super subframe and a PDCCH for scheduling a PDSCH transmitted in a super subframe as in the embodiment of FIG. 19(*a*). At the end of the transmission, the base station may transmit the PDSCH after transmitting the PDCCH for scheduling the PDSCH in the super subframe as in the embodiment of FIG. 19(*a*). Also, at the start of transmission, the base station may transmit a preamble in a super subframe as in the embodiment of FIG. 19(*b*) and start transmission of E-PDCCH and PDSCH for scheduling PDSCH. At the end of the transmission, the base station may simultaneously transmit E-PDCCH and PDSCH for scheduling PDSCH in a super subframe as in the embodiment of FIG. 19(*b*). In this case, the size of the E-PDCCH may vary according to the data scheduled by the E-PDCCH.

In another specific embodiment, the base station may transmit a control channel for scheduling data transmitted through a super subframe based on a boundary of a general subframe included in the super subframe. Specifically, the base station may transmit a control channel for scheduling data transmitted through a super subframe at a starting time point of a general subframe included in the super subframe.

For example, at the start of transmission, the base station may transmit a preamble in the super subframe and start PDSCH transmission as in the embodiment of FIG. 19(*c*).

In this case, the base station may transmit a PDCCH for scheduling the PDSCH transmitted through the super subframe at the starting time point of the general subframe included in the super subframe. At the end of the transmission, the base station may transmit the PDSCH after transmitting the PDCCH for scheduling the PDSCH transmitted in the super subframe as in the embodiment of FIG. 19(*c*). In addition, at the start of transmission, the base station may transmit a preamble in the super subframe and start PDSCH transmission as in the embodiment of FIG. 19(*d*). In this case, the base station may transmit an E-PDCCH for scheduling the PDSCH transmitted through the super subframe from the starting time point of the general subframe included in the super subframe. In this case, the size of the E-PDCCH may vary according to the data scheduled by the E-PDCCH. At the end of the transmission, the base station may simultaneously transmit E-PDCCH and PDSCH for scheduling PDSCH transmitted in the super subframe as in the embodiment of FIG. 19(*d*).

The control channel described above may include an indicator indicating whether data to be scheduled by the control channel is transmitted through the super subframe or a general subframe. Specifically, the DCI included in the PDCCH or the E-PDCCH may include an indicator indicating whether the data scheduled by the PDCCH or the E-PDCCH is transmitted through the super subframe or the general subframe.

Through FIGS. 18 to 19, an embodiment is described in which a base station transmits a control channel in an unlicensed band on the basis of a boundary of a general subframe or a starting time point of transmission. A base station may transmit control channels at various time points within a subframe. An embodiment in which a base station transmits control channels at various time points within a subframe will be described with reference to FIGS. 20 to 22.

Figure 20:
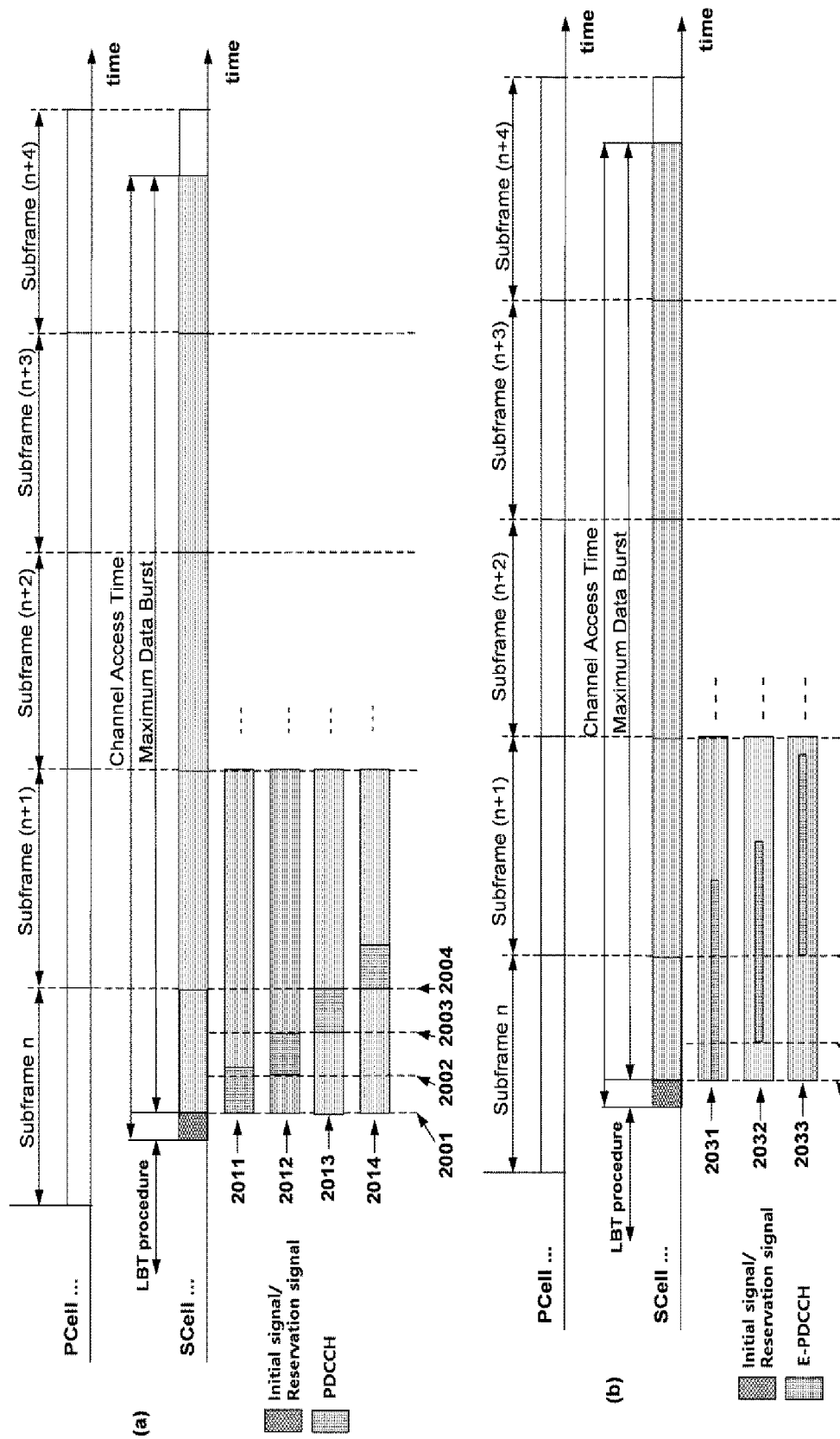
FIG. 20 shows another method of a base station to transmit a control channel for scheduling super subframes after an LBT procedure in an unlicensed band according to an embodiment of the present invention.

FIG. 20 shows another method of a base station to transmit a control channel for scheduling the super subframes after an LBT procedure in an unlicensed band according to an embodiment of the present invention.

The base station may transmit a control channel for scheduling data transmitted through the super subframe at the start of the transmission of the super subframe. For example, the base station may transmit the control channel at the start of the transmission of the super subframes 2001 and 2021 as in the first embodiments 2011 and 2031 of FIG. 20(*a*) and FIG. 20(*b*). In this case, the user equipment may receive the control channel first, and end the data reception when the decoded control channel does not schedule the data corresponding to the user equipment. Also, the user equipment is not required to buffer the data transmitted to the other user equipment in advance. Therefore, at the start of transmission of the super subframe, the base station may increase the operation efficiency of the user equipment by transmitting a control channel for scheduling data transmitted through the super subframe.

As described above, the base station may access radio resources in the unlicensed band regardless of subframe boundaries. In a specific embodiment, the base station or user equipment may start transmission at any time point within the subframe in the unlicensed band. Therefore, when accessing the unlicensed band, the base station may transmit the signal for occupying the above-mentioned radio resource first. In a specific embodiment, the user equipment may monitor the signal for occupying the radio resource. When the user equipment senses the signal for occupying the radio resource, the user equipment may determine that the base station transmits data. Thus, by transmitting the signal for occupying the radio resource, the base station may prevent another wireless communication user equipment from accessing radio communication resources before transmitting the control channel and data. In addition, the base station may signal the user equipment that the base station is starting data transmission. In addition, the base station may transmit a signal for occupying radio resources, thereby matching OFDM symbol units.

Accordingly, the base station may transmit a signal for occupying radio resources before the super subframe transmission. In this case, the user equipment must perform blind decoding of the control channel including control information for each received OFDM symbol until receiving the control channel.

The base station may transmit the control channel together from any one of the OFDM symbols previously designated to transmit the reference signal. In this case, as described above, the base station may transmit a signal for occupying radio resources and transmit the super subframe. The base station may adjust the duration of the signal for occupying the radio resources to make the start of transmission of the super subframe correspond to one of the OFDM symbols previously designated to transmit the reference signal. Also, the reference signal may be a Cell Specific Reference Signal (CRS). Specifically, the reference signal may be CRS port 0 or CRS port 1. In addition, the index value of the OFDM symbol in which the CRS is transmitted may be at least one of 0, 4, 7, and 11. According to the operation of the base station, the user equipment may receive the control information by monitoring the reception of the control channel from the OFDM symbol position previously designated to transmit the reference signal.

When the control channel is the E-PDCCH and the subframe boundaries of PCell and SCell match to each other, based on PCell's OFDM symbol index, the base station may transmit the E-PDCCH in an OFDM symbol position that does not split the downlink demodulation reference signal (DMRS). For example, the base station may transmit the E-PDCCH in an OFDM symbol position 2032 that does not split the DMRS, as in the second embodiment 2022 of FIG. 20(*b*). The reason is that if the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the subframe and the sixth OFDM symbol of the second slot based on the normal CP. That is, the base station may transmit an E-PDCCH from any one OFDM symbol of the first OFDM symbol to the fifth OFDM symbol in the first slot of the subframe and the first OFDM symbol to the fifth OFDM symbol in the second slot, based on the normal CP. Also, the base station may adjust the duration of the signal for occupying the radio resources to transmit the E-PDCCH in an OFDM symbol position that does not split the downlink DMRS while transmitting the signal for occupying the above-described radio resource before the super subframe transmission. In this case, the user equipment may demodulate/decode a signal including the E-PDCCH for a duration of a general subframe, and then determine whether to receive a PDSCH. Through this operation, the base station may improve the decoding/demodulation performance of the signal including the E-PDCCH of the terminal.

In another embodiment, the base station may transmit a control channel and a reference signal together. Specifically, the base station may transmit the reference signal together when transmitting the control channel. In yet another specific embodiment, the transmission of control channel may be started from an OFDM symbol designated to transmit the reference signal. The user equipment estimates a state of a control channel and a channel through which data is transmitted using a reference signal, and receives the control channel and the data to perform demodulation/decoding by using the estimated channel state. Therefore, when the base station starts to transmit the control channel from the OFDM symbol designated to transmit the reference signal, the user equipment may stably receive the control channel. In this case, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2002 and 2003 of the OFDM symbol in which the reference signal is transmitted as in the second and third embodiments 2012 and 2013 of FIG. 20(*a*).

In another embodiment, the base station may transmit a control channel in an OFDM symbol closest to a starting time point of transmission among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2011 and 2031 of FIGS. 20(*a*) and 20(*b*).

In another embodiment, the base station may transmit a control channel based on the boundary of the subframe. In this case, the boundary of the subframe is the boundary of the normal subframe included in the super subframe, not the super subframe. Specifically, the base station may transmit the control channel at the starting time point of the subframe. For example, the base station may transmit a control channel at the starting time points 2004 and 2023 of the subframe as in the fourth embodiment 2014 of FIG. 20(*a*) and the third embodiment 2033 of FIG. 20(*b*). In this case, the base station may transmit data before transmitting the control channel for scheduling the data. Therefore, the user equipment may buffer the data until receiving the control channel.

The control channel described with reference to FIG. 20 may be used for both the above-described self-carrier scheduling and cross-carrier scheduling according to a specific embodiment. Further, in the embodiment described with reference to FIG. 20, the base station may transmit the PCell in a frequency band that is accessible without a contention procedure, for example, a licensed band.

In the embodiment described with reference to FIGS. 17 to 20, the boundary of the subframe of SCell is aligned with the subframe boundary of PCell. In this case, the base station had to transmit a partial subframe or a super subframe in the unlicensed band SCell. In the existing wireless communication system, it is assumed that resources are allocated and transmitted in units of subframes having a 1 ms length, for example. Therefore, when a base station and a user equipment transmit a partial subframe or a super subframe, the operations of the base station and the user equipment may be complicated. To solve this problem, the base station may set the starting time point of the subframe based on the time point at which transmission starts in the unlicensed band SCell. Through this, the base station may transmit a normal subframe at the start of transmission. This will be described in more detail with reference to FIG. 21.

Figure 21:
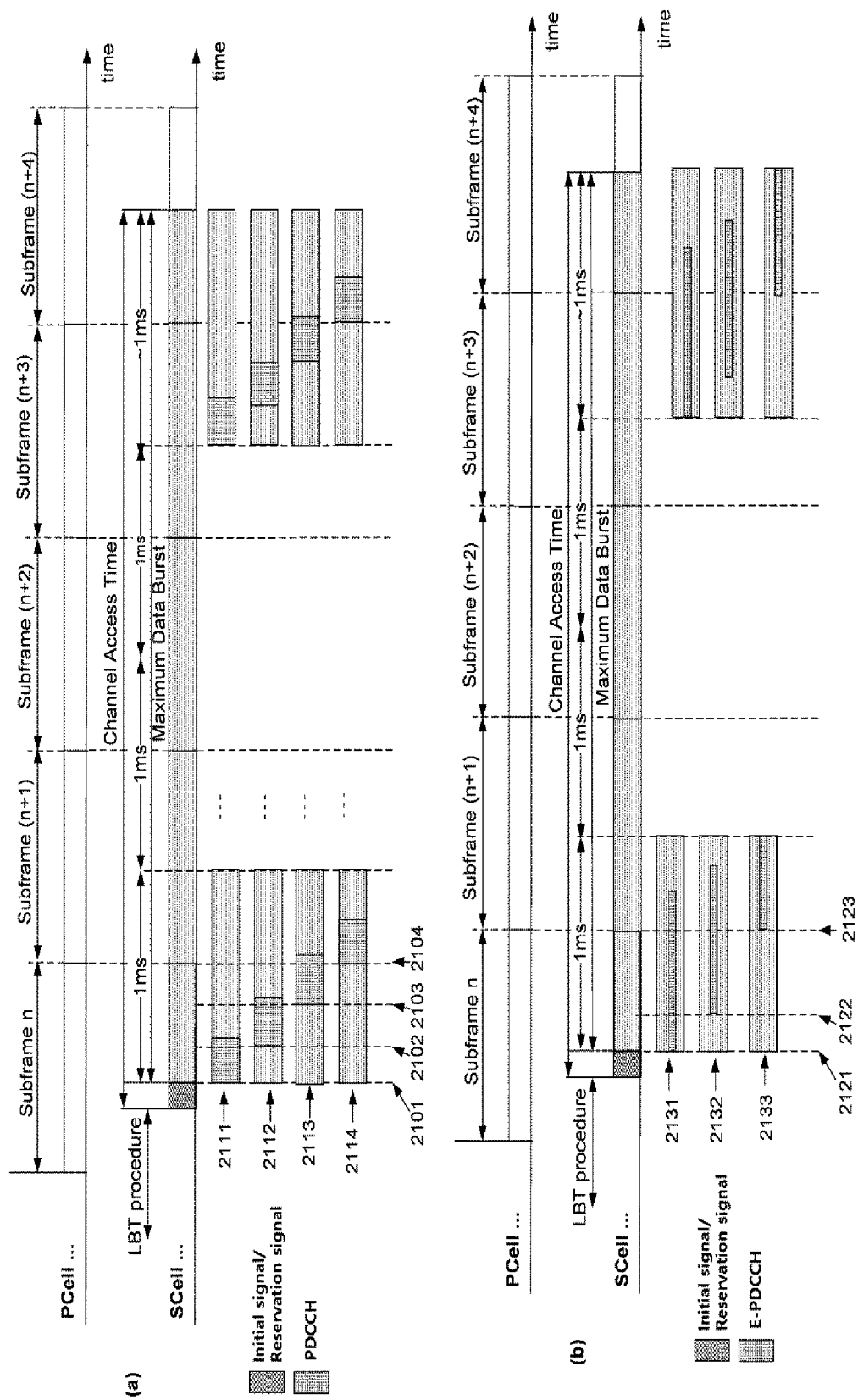
FIG. 21 shows a method of a base station to transmit a control channel for scheduling a subframe having a boundary different from a boundary of subframe of a PCell after the LBT procedure in the unlicensed band according to an embodiment of the present invention.

FIG. 21 shows a method of a base station to transmit a control channel for scheduling a subframe having a different boundary from a boundary of a subframe of a PCell, after performing an LBT procedure in an unlicensed band according to an embodiment of the present invention.

As described above, the base station may set the starting time point of the transmission of the SCell transmitted in the unlicensed band to the starting time point of the SCell subframe. In this case, the time that the base station may occupy the radio resource may not be a multiple of the subframe length of the SCell. In this case, the base station may transmit the partial subframe at the end of the transmission. When the base station sets the starting time point of the transmission of the SCell transmitted in the unlicensed band to the starting time point of the SCell subframe, the base station may apply the embodiment described with reference to FIG. 20 based on the subframe boundary of the SCell.

Specifically, the base station may transmit a control channel for scheduling data to be transmitted through a subframe of SCell at the start of subframe transmission of the SCell. For example, the base station may transmit the control channel at the starts 2101 and 2121 of the transmission of the Scell subframes as in the first embodiments 2111 and 2131 of FIG. 21(*a*) and FIG. 21(*b*). In this case, the user equipment may receive the control channel first, and end the data reception when the decoded control channel does not schedule the data corresponding to the terminal. Also, the user equipment does not need to buffer the data transmitted to the other user equipment in advance. Therefore, at the start of transmission of the SCell subframe, the base station may increase the operation efficiency of the user equipment by transmitting a control channel for scheduling data transmitted through the SCell subframe.

In this case, the base station may transmit a signal for occupying radio resources before the SCell subframe transmission. In this case, the user equipment must perform blind decoding of the control channel including control information for each received OFDM symbol until receiving the control channel.

The base station may transmit the control channel together from any one of the OFDM symbols previously designated to transmit the reference signal. In this case, as described above, the base station may transmit a signal for occupying radio resources and transmit the SCell subframe. The base station may adjust the duration of the signal for occupying the radio resources to make the start of transmission of the super subframe correspond to one of the OFDM symbols previously designated to transmit the reference signal. Also, the reference signal may be a CRS. Specifically, the reference signal may be CRS port 0 or CRS port 1. In addition, the index value of the OFDM symbol in which the CRS is transmitted may be at least one of 0, 4, 7, and 11. According to the operation of the base station, the user equipment may receive the control information by monitoring the reception of the control channel from the OFDM symbol position previously designated to transmit the reference signal.

When the control channel is an E-PDCCH, the base station may transmit the E-PDCCH in an OFDM symbol position that does not split the downlink demodulation reference signal (DMRS) based on the OFDM symbol index of the PCell. For example, the base station may transmit the E-PDCCH in an OFDM symbol position 2132 that does not split the DMRS, as in the second embodiment 2122 of FIG. 21(b). The reason is that if the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the subframe and the sixth OFDM symbol of the second slot based on the normal CP. That is, the base station may start to transmit an E-PDCCH in any one OFDM symbol of the first OFDM symbol to the fifth OFDM symbol in the first slot of the PCell subframe and the first OFDM symbol to the fifth OFDM symbol in the second slot, based on the normal CP. Through this operation, the base station may improve the decoding/demodulation performance of the signal including the E-PDCCH of the terminal.

In another embodiment, the base station may transmit a control channel and a reference signal together. Specifically, the base station may transmit a reference signal together when transmitting a control channel. In yet another specific embodiment, the transmission of the control channel may be started in an OFDM symbol position designated to transmit a reference signal. The user equipment estimates a state of a control channel and a channel through which data is transmitted using a reference signal, and demodulates/decodes the control channel and the data by using the estimated channel state. Therefore, when the base station starts to transmit the control channel in the OFDM symbol position in which the reference signal is transmitted, the user equipment may stably receive the control channel. In this case, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2112 and 2113 of the OFDM symbol in which the reference signal is transmitted as in the second and third embodiments 2102 and 2103 of FIG. 21(a).

In a specific embodiment, the base station may transmit a control channel in an OFDM symbol closest to a starting time point of the transmission among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2111 and 2131 of FIGS. 21(a) and 21(b).

In another embodiment, the base station may transmit a control channel based on the boundary of the PCell subframe. Specifically, the base station may transmit the control channel in the SCell at the starting time point of the PCell subframe. For example, the base station may transmit a control channel in the SCell at the starting time points 2104 and 2123 of the PCell subframe as in the fourth embodiments 2014 and 2033 of FIG. 21(a) and FIG. 21(b). In this case, the base station may transmit data before transmitting the control channel for scheduling the data. Therefore, the user equipment may buffer the data until receiving the control channel.

The control channel described with reference to FIG. 21 may be used for both the above-described self-carrier scheduling and cross-carrier scheduling according to a specific embodiment. Further, in the embodiment described with reference to FIG. 21, the base station may transmit the PCell in a frequency band that is accessible without a contention procedure, for example, a licensed band.

As in the above-described embodiment, the base station may treat partial subframes as individual subframes in an SCell transmitted in an unlicensed band. In this case, a method of a base station to transmit a control channel will be described with reference to FIG. 22.

Figure 22:
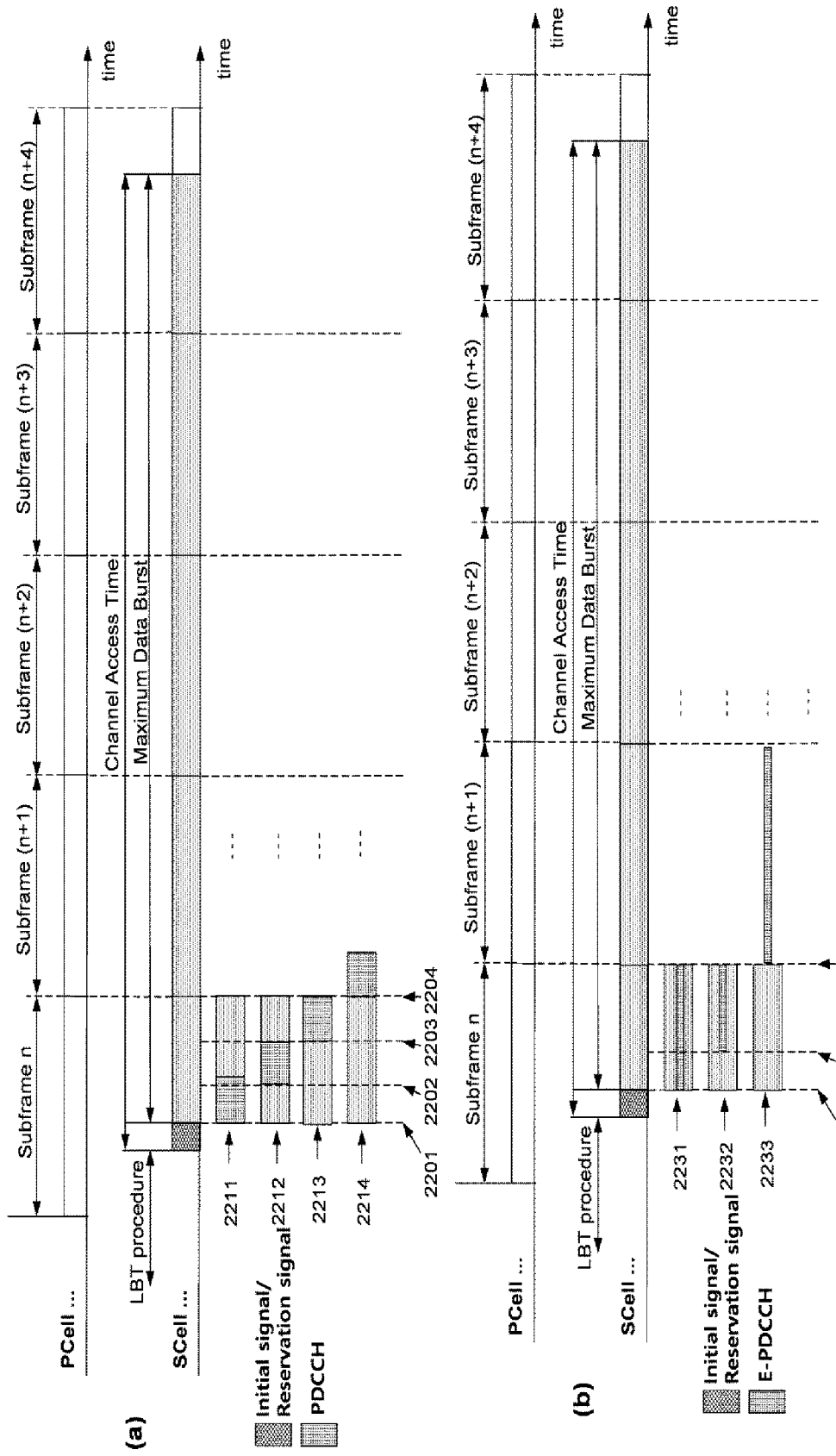
FIG. 22 shows another method of a base station to transmit a control channel for scheduling super subframes after an LBT procedure in an unlicensed band according to an embodiment of the present invention.

FIG. 22 shows another method of a base station to transmit a control channel for scheduling the partial subframes after an LBT procedure in an unlicensed band according to an embodiment of the present invention.

The base station may transmit a control channel for scheduling data transmitted through the partial subframe at the start of the transmission of the partial subframe. For example, the base station may transmit the control channel at the start of the transmission of the partial subframe 2211 and 2231 as in the first embodiment 2201 and 2221 of FIG. 22(a) and FIG. 22(b). In this case, the user equipment may receive the control channel first, and end the data reception if the decoded control channel does not schedule the data corresponding to the user equipment. Also, the user equipment does not need to buffer the data transmitted to the other user equipment in advance. Therefore, at the start of transmission of the partial subframe, the base station may increase the operation efficiency of the user equipment by transmitting a control channel for scheduling data transmitted through the partial subframe.

The base station may transmit a signal for occupying radio resources before the super subframe transmission. In this case, the user equipment must perform blind decoding of the control channel including control information for each received OFDM symbol until receiving the control channel.

The base station may transmit a control channel including control information from any one of the OFDM symbol positions previously designated to transmit the reference signal. In this case, as described above, the base station may transmit a signal for occupying radio resources and transmit the partial subframe. The base station may adjust the duration of the signal for occupying the radio resources so that the start of transmission of the partial subframe corresponds to one of the OFDM symbol positions previously designated to transmit the reference signal. Also, the reference signal may be a CRS. Specifically, the reference signal may be CRS port 0 or CRS port 1. In addition, the index value of the OFDM symbol in which the CRS is transmitted may be at least one of 0, 4, 7, and 11. According to the operation of the base station, the user equipment may receive the control information by monitoring the reception of the control channel from the OFDM symbol position previously designated to transmit the reference signal.

When the control channel is the E-PDCCH and the subframe boundaries of PCell and SCell match to each other, the base station may transmit, based on PCell's OFDM symbol index, the E-PDCCH in an OFDM symbol position that does not split the downlink DMRS (demodulation reference signal). For example, the base station may transmit the E-PDCCH in an OFDM symbol position 2222 that does not split the DMRS, as in the second embodiment 2232 of FIG. 22(b). The reason is that if the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the subframe and the sixth OFDM symbol of the second slot based on the normal CP. That is, the base station may transmit an E-PDCCH from any one OFDM symbol of the first OFDM symbol to the fifth OFDM symbol in the first slot of the subframe and the first OFDM symbol to the fifth OFDM symbol in the second slot, based on the normal CP. Through this, the base station may improve the decoding/demodulation performance of the signal including the E-PDCCH of the user equipment.

In another embodiment, the base station may transmit a control channel and a reference signal together. Specifically, the base station may transmit a reference signal together when transmitting a control channel. In yet another specific embodiment, the control channel may be transmitted from an OFDM symbol designated to transmit a reference signal. The user equipment estimates a state of a control channel and a channel through which data is transmitted using a reference signal, and demodulates/decodes the control channel and the data by using the estimated channel state. Therefore, when the base station transmits the control channel and the reference signal together, the user equipment may stably receive the control channel. In this case, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2212 and 2213 of the OFDM symbol in which the reference signal is transmitted as in the second and third embodiments 2202 and 2203 of FIG. 20(a).

In another embodiment, the base station may start to transmit a control channel in the OFDM symbol position closest to a starting time point of the transmission among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2211 and 2231 of FIGS. 22(a) and 22(b).

In another embodiment, the base station may transmit a control channel based on the boundary of the subframe. In this case, the boundary of the subframe is the boundary of the general subframe, not the partial subframe. Specifically, the base station may transmit a control channel at a starting time point of a general subframe positioned after a partial subframe. For example, the base station may transmit a control channel at the starting time points 2204 and 2223 of a general subframe positioned next to a partial subframe, as in the fourth embodiments 2214 and 2233 of FIGS. 22(a) and 22(b). In this case, the base station may transmit data before transmitting the control channel for scheduling the data. Therefore, the user equipment may buffer the data until receiving the control channel.

The control channel described with reference to FIG. 22 may be used for both the above-described self-carrier scheduling and cross-carrier scheduling according to a specific embodiment. Further, in the embodiment described with reference to FIG. 22, the base station may transmit the PCell in a frequency band that is accessible without a contention procedure, for example, a licensed band.

The base station may use a different transmission method of the control channel of the partial subframe at the end of transmission in the embodiments described with reference to FIGS. 20 to 22 from the transmission method of the control channel of the partial subframe at the start of transmission. Specifically, the base station may apply the control channel transmission method described with reference to FIG. 20 to FIG. 22 differently to the partial subframe transmitted at the start of transmission and the partial subframe transmitted at the end of transmission.

When a base station is to transmit a downlink burst composed of a single subframe or a plurality of subframes for downlink transmission in a specific cell on an unlicensed band, channel access must be performed before the transmission of DL bursts consisting of DL channels. In this case, when the base station performs channel access with cat-4 LBT, that is, random backoff, transmission of the DL channel may not be guaranteed at a specific subframe boundary. In this case, the user equipment may not perform data transmission during at least one OFDM symbol and up to a subframe of 1 ms. In order to prevent such radio resource waste, the base station may transmit a physical channel at the subframe boundary or the starting time point of the second slot of the subframe. If the base station still succeeds in the LBT at a different location within the subframe, which is not the subframe boundary or is not prior to the starting time point of the second slot of the subframe, there are some cases where data transmission may not be performed during at least one OFDM symbol resource and up to seven OFDM symbol resources. In such an embodiment, the base station may not transmit all of the physical channels intended to be transmitted through DL transmission or may need to further transmit a meaningless signal.

When the base station starts DL transmission using a partial subframe, the base station may determine the ending position of the OFDM symbol included in the last subframe of the DL transmission based on the starting position of the partial subframe. Specifically, when the base station starts DL transmission using a partial subframe and fails to start DL transmission at a specified time point, the base station may determine the ending position of the OFDM symbol included in the last subframe of the DL transmission based on the number of OFDM symbols used for the DL transmission. In relation to this, a method of the base station to signal the starting time point of the DL transmission is described when the base station can start DL transmission at a time point other than the subframe boundary. Furthermore, a method of the base station to determine a DL transmission configuration is described when the base station can start DL transmission at a time point other than the subframe boundary.

As described above, when the base station transmits a partial subframe, the base station may transmit a reference signal and a control channel together. In more detail, when the base station transmits a partial subframe, the base station may transmit a control channel in an OFDM symbol in which a reference signal is transmitted. In this case, the reference signal may be a CRS. In addition, the index value of the OFDM symbol in which the reference signal is transmitted may be at least one of 0, 4, 7, and 11. The control channel and the data channel may be allocated according to time division multiplexing (TDM). In this case, after transmitting the control channel for scheduling the data channel, the base station may transmit the data channel. Through this, the base station may reduce the buffering burden on the data channel of the user equipment. The downlink pilot time slot (DwPTS) may have a duration of any one of 3, 6, 9, 10, 11, and 12 OFDM symbols. In this case, when the base station schedules for each subframe, the base station may determine the duration of the DwPTS according to the starting time point of the transmission of the partial subframe. In more detail, the base station may determine the duration of the DwPTS such that the time elapsed by the duration of the DwPTS from the starting time point of the transmission of the partial subframe does not cross the subframe boundary. For example, when starting DL transmission from an OFDM symbol having an OFDM symbol index of 4, the base station may transmit a data channel using DwPTS having 10 OFDM symbols as a duration. In addition, when starting DL transmission from an OFDM symbol having an OFDM symbol index of 11, the base station may transmit a data channel using DwPTS having 3 OFDM symbols as a duration.

In addition, the base station may determine the configuration of the DL transmission based on the capability of the user equipment. In more detail, the base station may determine whether to transmit a partial subframe when starting DL transmission based on the capability of the user equipment.

In more detail, the base station may determine the starting time point of the DL transmission based on the capability of the user equipment. According to a specific embodiment, when the user equipment may receive DL transmission at the starting time point of the second slot of the subframe and the subframe boundary, the base station may start DL transmission at the starting time point of the second slot or the subframe boundary. In addition, when the user equipment is capable of receiving the DL transmission from the OFDM symbol corresponding to the index values 0, 4, 7, and 11 of the OFDM symbol, the base station may start DL transmission in an OFDM symbol corresponding to any one of index values 0, 4, 7, and 11 of the OFDM symbol. In addition, when the user equipment is capable of receiving the DL transmission at the boundary of the subframe, the base station may start the DL transmission at the subframe boundary. In such embodiments, the base station may indicate the starting time point of the DL transmission to the user equipment using RRC signaling. The user equipment may monitor the DL data channel at a time point indicated by RRC signaling. Specifically, when the user equipment is capable of receiving DL transmission at the starting time point of the second slot and the subframe boundary, the user equipment may monitor the DL data channel at least one of the starting time point of the second slot and the subframe boundary based on the RRC signaling. In addition, when the user equipment is capable of receiving the DL transmission from the OFDM symbol corresponding to the index values 0, 4, 7, and 11 of the OFDM symbol, the user equipment may monitor the DL data channel at least one of the index values 0, 4, 7, and 11 of the OFDM symbol based on the RRC signaling.

The base station may transmit the last subframe of the DL transmission as a partial subframe. In this case, the duration of the partial subframe may correspond to any one of 3, 6, 9, 10, 11, and 12 OFDM symbols, and the duration of the partial subframe may correspond to any one of 4 and 5 OFDM symbols. In DL transmission, a base station may transmit only one partial subframe. In this case, the partial subframe is not only the initial partial subframe but also the ending partial subframe. When the partial subframe is not only the initial partial subframe but also the ending partial subframe, the base station may transmit a partial subframe having a duration of 4 or 5 OFDM symbols. Accordingly, the user equipment may receive a partial subframe having 4 or 5 OFDM symbol durations. In more detail, the base station may determine the duration of the partial subframe such that at least one of CRS port 0 and CRS port 1 is transmitted. In the above-described embodiment, the base station may improve the channel estimation performance of the user equipment by setting the duration of the partial subframe to include two OFDM symbols including CRS port 0 and CRS port 1.

Figure 23:
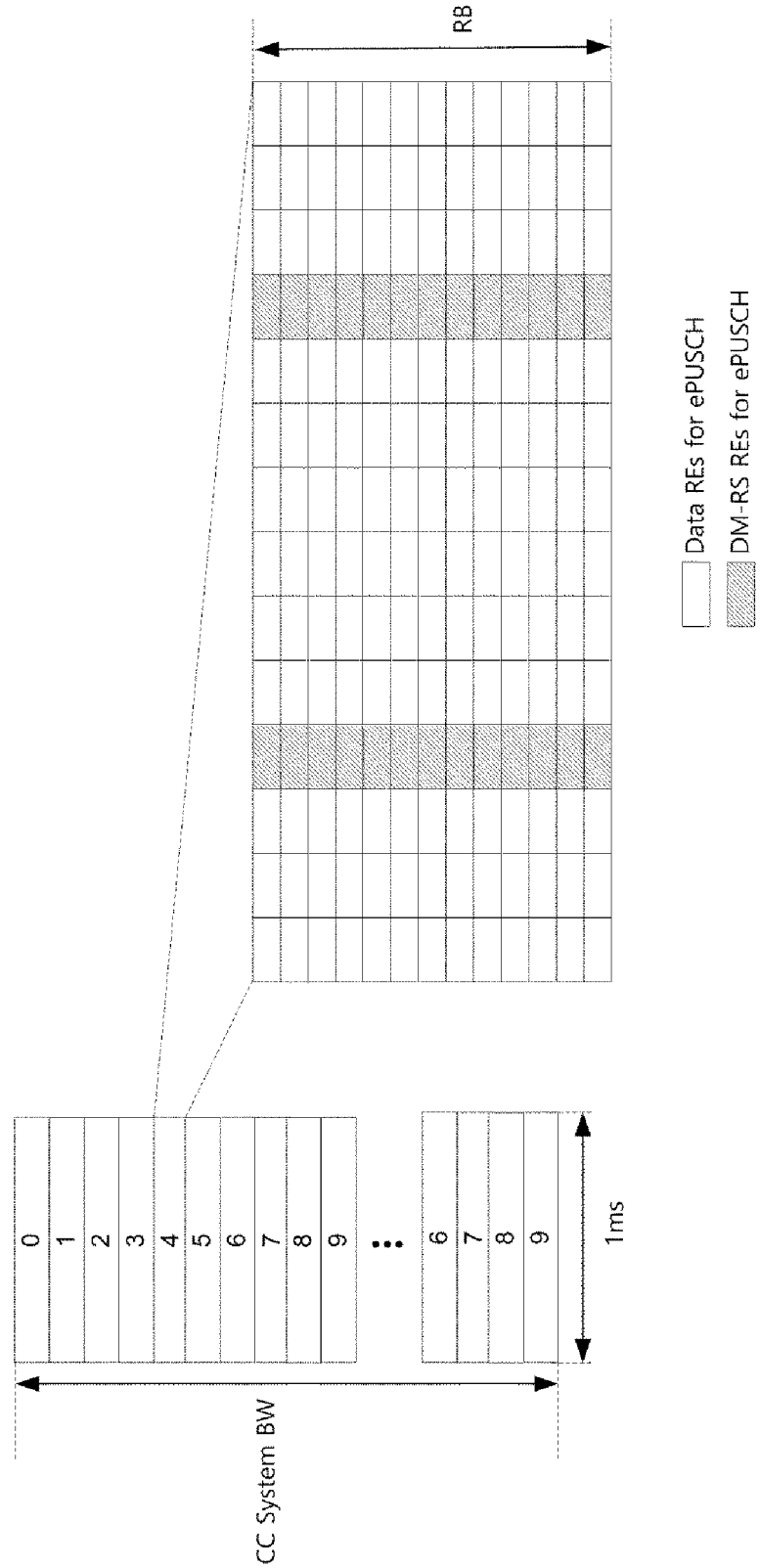
FIG. 23 shows an UL subframe structure transmitted by a user equipment according to an embodiment of the present invention.

FIG. 23 shows a UL transmission method of a user equipment according to an embodiment of the present invention. Specifically, the structure of the UL subframe and the ending position of the last subframe of the UL transmission will be described with reference to FIGS. 23 to 31.

FIG. 23 shows an UL subframe structure transmitted by a user equipment according to an embodiment of the present invention.

The user equipment may perform UL transmission using SC-FDMA. The base station may schedule the UL transmission of the user equipment for each subframe. The user equipment may transmit 12 to 14 SC-FDMA symbols in one subframe according to the scheduling of the base station. Specifically, the user equipment may start UL transmission between an SC-FDMA symbol having an index of 0 in a subframe or an SC-FDMA symbol having an index of 1 in a subframe or an SC-FDMA symbol having an index of 0 and an SC-FDMA symbol having an index of 1. In addition, the index of the last SC-FDMA symbol of the subframe transmitted by the user equipment may be 13 or index 12 depending on whether Sounding Reference Signal (SRS) is transmitted. In addition, the base station may indicate an index of the last SC-FDMA symbol for UL data channel transmission in a subframe through which the user equipment performs UL data channel transmission using a UL grant.

In relation to frequency bandwidth occupancy regulation applied to the unlicensed band, the base station may allocate a frequency band for UL transmission so that the user equipment can use the entire channel frequency band. In this case, as shown in FIG. 23, the user equipment uses an interlaced structure configured to equally divide the total number of RBs used in one carrier into 10 and have a 10 RB interval in the frequency domain. For example, a user equipment can transmit one interlaced composed of at least 10 RBs based on a 20 MHz bandwidth. In this case, one interlaced is composed of 10 RBs having 10 RB intervals in the frequency domain. A user equipment may perform UL transmission by receiving a single or a plurality of interlaces from a base station. The user equipment may perform uplink transmission in units of 1 ms. In more detail, the user equipment may utilize a system bandwidth as shown in FIG. 23. The user equipment receiving the UL grant from the base station may attempt channel access for UL transmission using type 1 channel access or type 2 channel access. In this case, the type 1 channel access may indicate a channel access based random backoff. In more detail, the type 1 channel access may indicate a channel access method in which a user equipment obtains a random value in a contention window and accesses the channel based on whether the channel is idle for a time interval determined based on the random value obtained by the user equipment. In more detail, the type 1 channel access may indicate a channel access method using the cat-4 LBT described above. In addition, the type 2 channel access may indicate a channel access method in which a user equipment accesses a channel based on whether the channel is idle for a predetermined time interval. In this case, the predetermined time section may be 25 us. In more detail, the type 2 channel access may indicate a channel access using the cat-2 LBT described above. When the user equipment fails to access the channel while performing UL transmission according to the RB unit and the time unit described above, transmission resources with 10 RBs and 1 ms duration can be wasted. In order to reduce such transmission resource waste, a method of variously setting a starting time point and an ending time point of UL transmission of a user equipment may be used.

Figure 24:
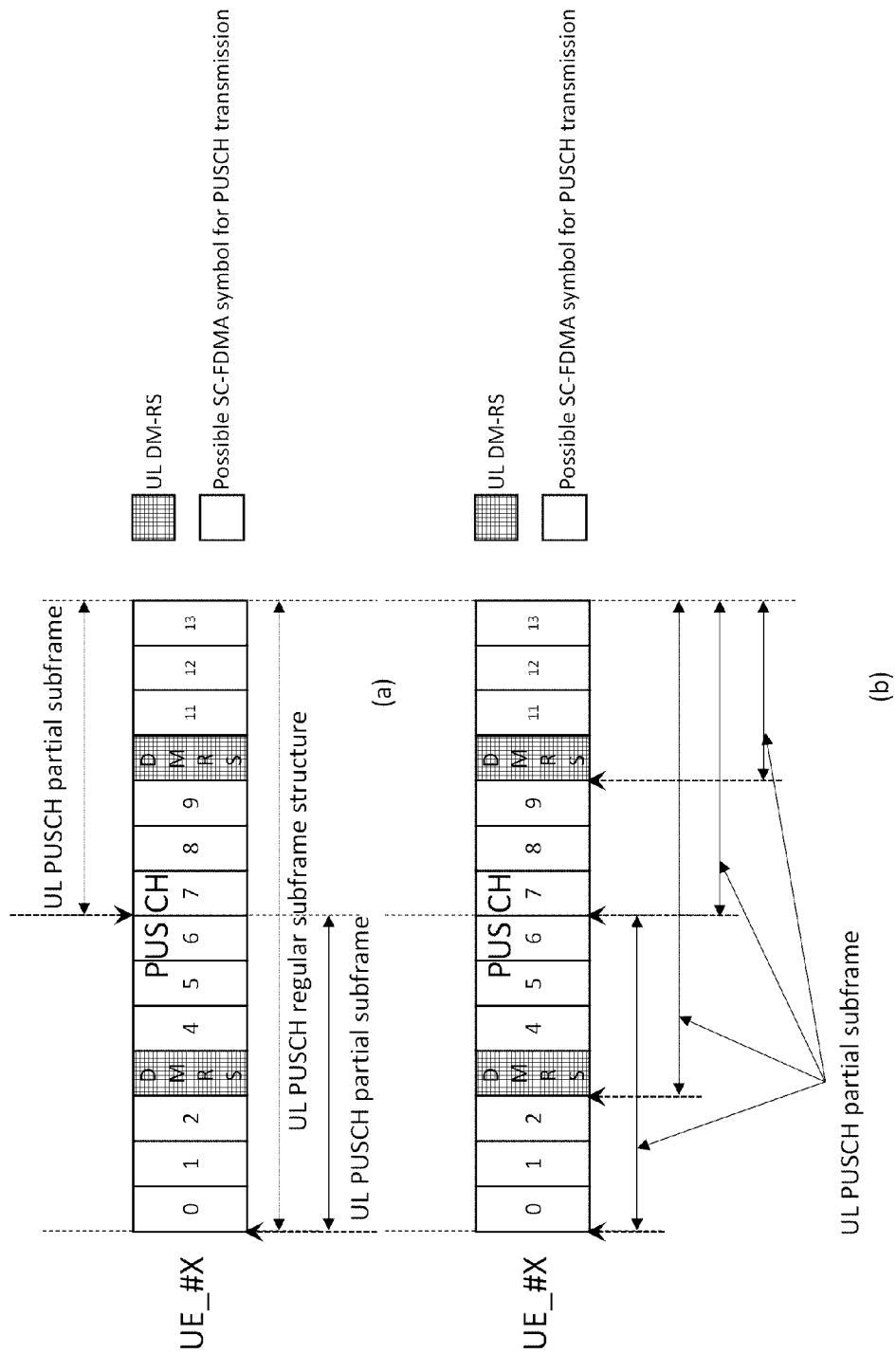
FIGS. 24 and 25 show that a user equipment is configured to receive an starting partial subframe of UL transmission from a base station and performs UL transmission to the base station according to an embodiment of the present invention.
Figure 25:
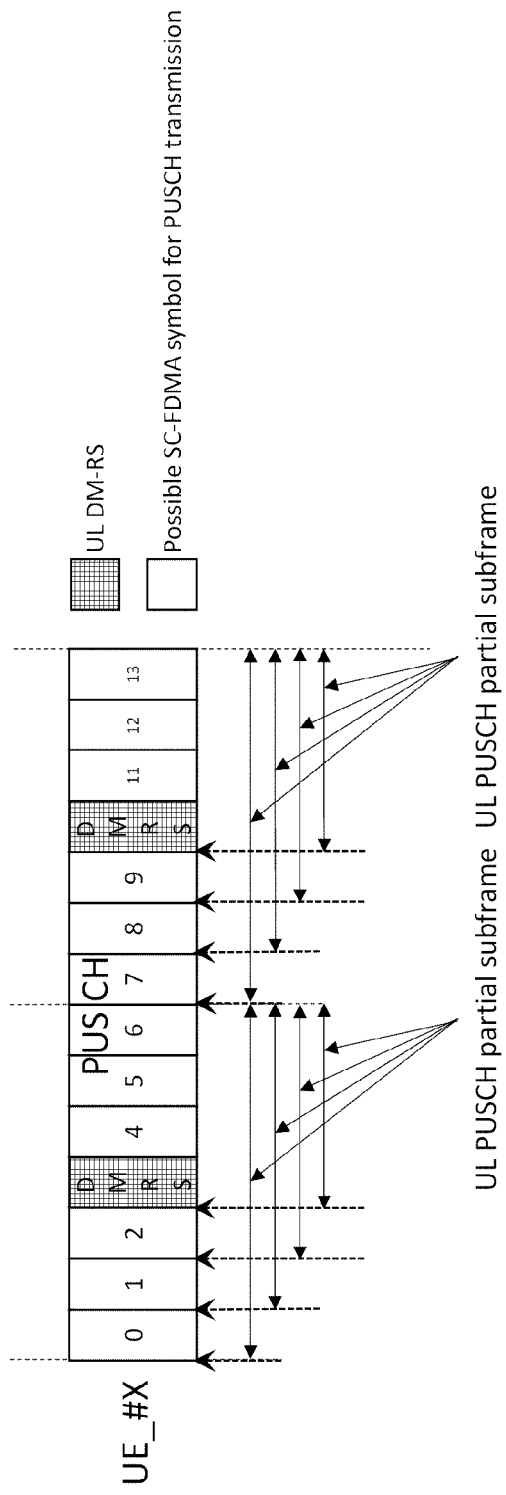

FIGS. 24 and 25 show that a user equipment is configured to receive a starting partial subframe of a UL transmission from a base station to perform a UL transmission to a base station according to an embodiment of the present invention.

Hereinafter, the transmitting the partial subframe may indicate transmitting a physical channel in the partial subframe.

The user equipment may transmit the physical channel and the UL DM-RS together. The base station may coherently demodulate the received physical channel using UL DM-RS. Therefore, the user equipment may transmit the partial subframe in consideration of the DM-RS transmission.

The user equipment may be configured by the base station to transmit a partial subframe including at least one UL DM-RS to the base station. In this case, the UL DM-RS may be a reference signal for demodulation of the data channel and the control channel transmitted through the UL. In more detail, the user equipment may start transmitting partial subframes to the base station at the slot boundary. In this case, the user equipment may transmit a partial subframe having a duration of 6 and 7 SC-FDMA symbols. That is, when UL transmission that ends at the SC-FDMA symbol index 12 is scheduled, the user equipment may transmit a partial subframe having a duration of 6 SC-FDMA symbols at the second slot boundary of the subframe. Furthermore, when UL transmission that ends at the SC-FDMA symbol index 13 is scheduled, the user equipment may transmit a partial subframe having a duration of 7 SC-FDMA symbols at the second slot boundary of the subframe. FIG. 24($a$) shows an operation in which a user equipment starts partial subframe transmission for a base station at a slot boundary.

In another specific embodiment, the user equipment may start transmission of the partial subframe for the base station from at least one of the UL DM-RS transmission starting position as well as the slot boundary. In this case, the UL DM-RS may be a reference signal for demodulation of the data channel and the control channel transmitted through the UL. In more detail, the user equipment may start partial subframe transmission for the base station in the SC-FDMA symbol, which is one of the SC-FDMA symbols transmitting the UL DM-RS having the index 3 or 10, as well as the slot boundary. FIG. 24($b$) shows an operation in which a user equipment starts partial subframe transmission for a base station from a UL DM-RS transmission starting position as well as a slot boundary.

In another specific embodiment, the user equipment transmits a partial subframe including at least one UL DM-RS to the base station regardless of whether the transmission starting position of the partial subframe is a slot boundary or an SC-FDMA symbol position of the UL DM-RS. In this case, the signaling overhead for the partial subframe transmission starting position may be larger than in the above-described embodiment, but the flexibility for the starting time point of the transmission may be increased. FIG. 25 shows an operation in which a user equipment starts transmitting a partial subframe for a base station in an SC-FDMA symbol index in which the partial subframe is capable of including at least one UL DM-RS.

The user equipment may receive the common control channel from the base station to obtain information on the starting position of the partial subframe transmission. In addition, when the user equipment receives the UL grant, the user equipment may receive a UE specific control channel from the base station to obtain information on the starting position of the partial subframe transmission. In addition, when the user equipment receives the common control channel and the UL grant, the user equipment may receive the UE specific control channel from the base station to obtain information on the starting position of the partial subframe transmission. In a specific embodiment, the control channel may be a PDCCH. As described above, when the user equipment is configured to start partial subframe transmission for the base station at the slot boundary, the information on the starting position of the partial subframe transmission may be 1-bit information. In addition, when the user equipment starts the partial subframe transmission from the UL DM-RS transmission starting position as well as the slot boundary, the information on the starting position of the partial subframe transmission may be 2-bit information. Also, when the partial subframe transmission starting position is determined by the user equipment such that the partial subframe includes at least one DM-RS regardless of whether the partial subframe transmission starting position is the slot boundary or the SC-FDMA symbol position of the UL DM-RS, the information on the starting position of the partial subframe transmission may be 3-bit information.

The starting position and configuration of the starting partial subframe through which the user equipment starts the physical channel transmission have been described with reference to FIGS. 24 and 25. The transmission ending position and configuration of an ending partial subframe through which a user equipment ends physical channel transmission will be described with reference to FIGS. 26 and 27.

Figure 26:
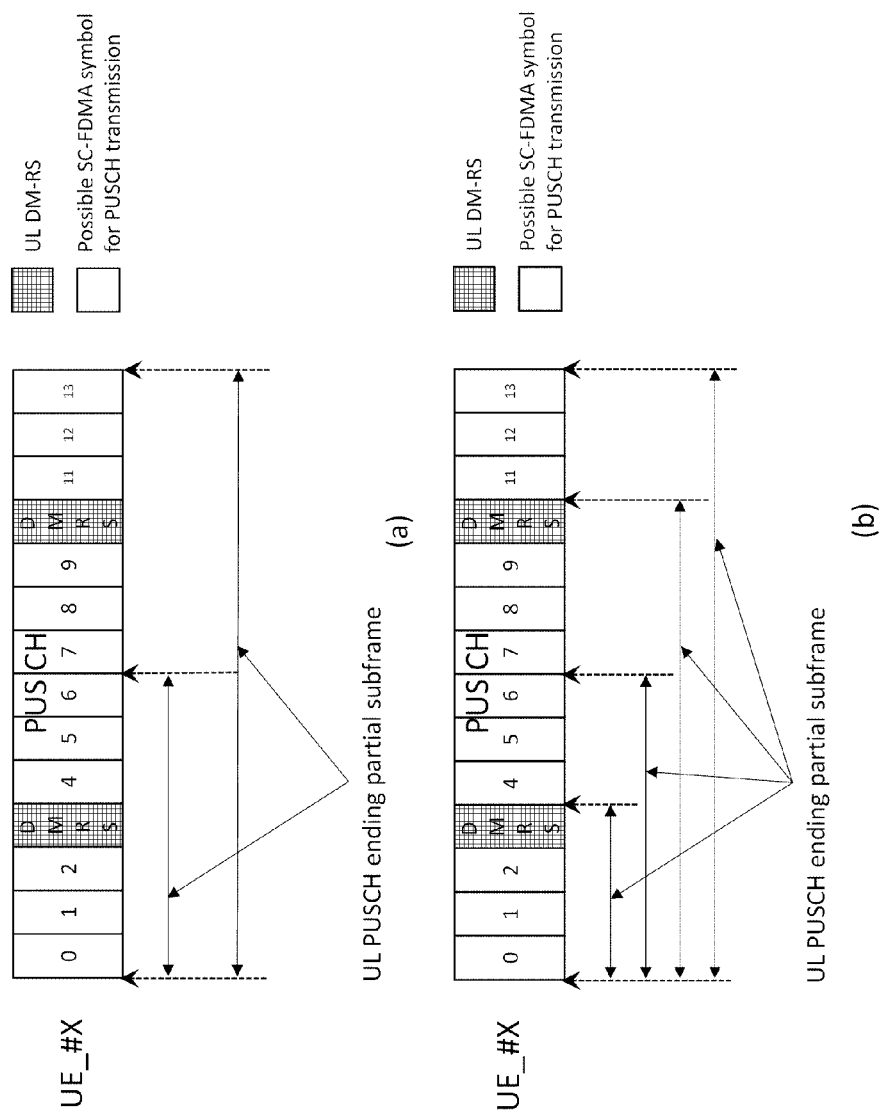
FIGS. 26 and 27 show that a user equipment is configured to receive an ending partial subframe that ends UL transmission from a base station and performs UL transmission to the base station according to an embodiment of the present invention.
Figure 27:
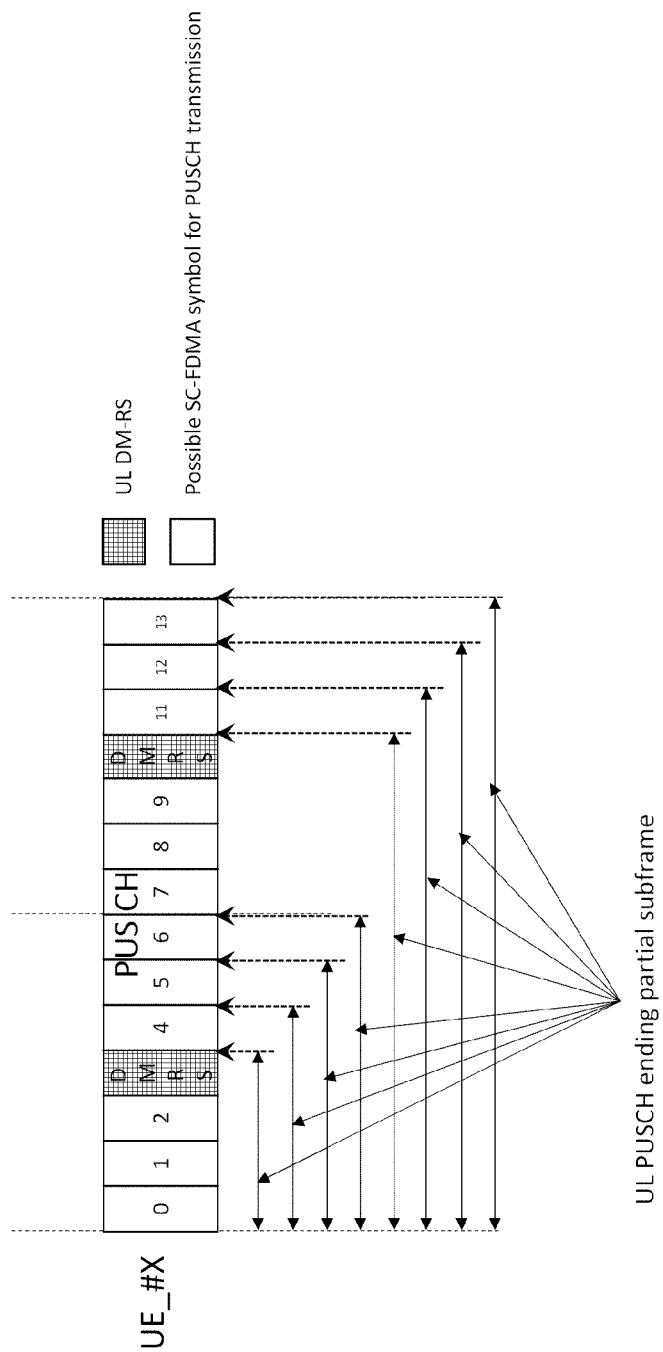

FIGS. 26 and 27 show that a user equipment is configured to receive an ending partial subframe that ends a UL transmission from a base station to perform a UL transmission to a base station according to an embodiment of the present invention.

Hereinafter, the transmitting the partial subframe may indicate transmitting a physical channel in the partial subframe.

The user equipment may be configured by the base station to transmit a partial subframe including at least one UL DM-RS to the base station. In this case, the UL DM-RS may be a reference signal for demodulation of the data channel and the control channel transmitted through the UL. In more detail, the user equipment may end transmitting partial subframes to the base station at the slot boundary. In this case, the user equipment may transmit a partial subframe having 6 and 7 SC-FDMA symbols as a duration. That is, when UL transmission that starts at the SC-FDMA symbol index 1 is scheduled, the user equipment may transmit a partial subframe having a duration of 6 SC-FDMA symbols in the first slot. Furthermore, when UL transmission that starts at the SC-FDMA symbol index 0 is scheduled, the user equipment may transmit a partial subframe having a duration of 7 SC-FDMA symbols at the boundary of the subframe. FIG. 26(a) shows an operation in which a user equipment ends partial subframe transmission for a base station at a slot boundary.

In another specific embodiment, the user equipment may end transmission of the partial subframe for the base station in at least one of the UL DM-RS transmission ending position as well as the slot boundary. In this case, the UL DM-RS may be a reference signal for demodulation of the data channel and the control channel transmitted through the UL. In more detail, the user equipment may end partial subframe transmission for the base station after transmission of the SC-FDMA symbol, which is one of the SC-FDMA symbols transmitting the UL DM-RS and having the index 3 or 10, as well as the slot boundary. FIG. 26(b) shows an operation in which a user equipment ends partial subframe transmission for a base station immediately after transmission of a UL DM-RS as well as a slot boundary.

In another specific embodiment, the user equipment transmits a partial subframe including at least one UL DM-RS to the base station regardless of whether the transmission ending position of the partial subframe is a slot boundary or an SC-FDMA symbol position of the UL DM-RS. In this case, the signaling overhead for the ending position of the partial subframe transmission may be larger than in the above-described embodiment, but the flexibility for the transmission ending time point may be increased. FIG. 27 shows an operation in which a user equipment ends transmitting a partial subframe for a base station in an SC-FDMA symbol index in which the partial subframe may include at least one UL DM-RS.

The user equipment may receive the common control channel from the base station to obtain information on the ending position of the partial subframe transmission. In addition, when the user equipment receives the UL grant, the user equipment may receive a UE specific control channel from the base station to obtain information on the ending position of the partial subframe transmission. In addition, when the user equipment receives the common control channel and the UL grant, the user equipment may receive the UE specific control channel from the base station to obtain information on the ending position of the partial subframe transmission. In a specific embodiment, the control channel may be a PDCCH. As described above, when the user equipment is configured by the base station to end partial subframe transmission for the base station at the slot boundary, the information on the ending position of the partial subframe transmission may be 1-bit information. In addition, when the user equipment ends the partial subframe transmission at the UL DM-RS transmission ending position as well as the slot boundary, the information on the ending position of the partial subframe transmission may be 2-bit information. Also, when the ending position of the partial subframe transmission is determined by the user equipment such that the partial subframe includes at least one DM-RS regardless of whether the ending position of the partial subframe transmission is the slot boundary or the SC-FDMA symbol position of the UL DM-RS, the information on the starting position of the partial subframe transmission may be 3-bit information.

Embodiments described with reference to FIGS. 24 to 27 may be applied to at least one of a case where a partial subframe is transmitted as a starting partial subframe, a case where a partial subframe is transmitted as an ending partial subframe, and a case where a partial subframe is transmitted as a starting partial subframe and an ending partial subframe.

The user equipment may determine a channel access operation starting time point according to a time point for receiving signaling on a starting time point of a UL transmission from a base station. Accordingly, the partial subframe transmission starting position may also vary. In another specific embodiment, the user equipment may determine the channel access operation starting time point before obtaining information on the starting time point of the UL transmission from the base station. The user equipment may receive, from the base station, information on the starting time point of the UL transmission indicating that the user equipment may start UL transmission at the boundary of the subframe and the second slot boundary. In this case, when the user equipment does not succeed in the channel access operation until the starting time point of the transmission, which is the boundary of the subframe, the user equipment may attempt additional channel accesses before the starting time point of the second slot, which is the starting time point of the next UL transmission. In this case, the channel access operation may indicate the LBT based channel operations described above. In a specific embodiment, the user equipment may determine the channel access operation starting time point according to the time point for receiving signaling on the starting time point of the UL transmission from the base station. Accordingly, the partial subframe transmission starting position may also vary. In another specific embodiment, the user equipment may determine the channel access operation starting time point before the time point for receiving signaling on the starting time point of the UL transmission from the base station.

When the user equipment succeeds in channel access until the starting time point of the transmission of the partial subframe, the partial subframe may be transmitted. When the user equipment does not succeed in channel access until the starting time point of the transmission of the partial subframe, the user equipment may attempt channel access for partial subframe transmission before another starting time point of the transmission of the partial subframe configured by the base station in the corresponding subframe. When another starting time point of partial subframe transmission is not configured in the corresponding subframe by the base station, the user equipment may not attempt to transmit the partial subframe.

When the user equipment is not configured for transmission of the partial subframe from the base station, the user equipment may perform channel access for UL transmission as follows. The base station may indicate to the user equipment each of a starting time point for UL transmission and a time point for ending UL transmission using a UL grant. If the user equipment performs channel access after receiving the UL grant and does not succeed in channel access before the starting time point of the UL transmission, which is indicated by the corresponding UL grant, the user equipment may not perform UL transmission in the corresponding subframe according to the configuration by the base station. However, when the UL transmission of the user equipment composed of a plurality of subframes is scheduled by the base station, the user equipment may re-attempt channel access before the starting time point of the next subframe in order for transmission in the next subframe after the subframe that fails in the channel access. In this case, when the user equipment succeeds in channel access, the user equipment may perform UL transmission from a subframe including a starting time point after the time point of successful channel access.

When the user equipment is not configured for transmission of the partial subframe from the base station, the user equipment may determine whether to re-attempt channel access by receiving whether a plurality of subframe UL transmissions are scheduled from the base station. Specifically, when the user equipment receives scheduling for a plurality of subframe UL transmissions from the base station and the channel access is not successful until the scheduled starting time point of the transmission, the user equipment may re-attempt to access the channel. In this case, when the user equipment succeeds in channel access before the subframe boundary after the scheduled starting time point of the transmission, the user equipment may start the UL transmission from the subframe boundary closest to the channel access success time point. Specifically, at the subframe boundary closest to the channel access success time point, the user equipment may start the transmission of the remaining subframes except for the subframe not transmitted from the starting time point of the transmission at which the user equipment receives the scheduling to the nearest subframe boundary from the channel access success time point.

When the user equipment is configured for transmission of the partial subframe from the base station, a method in which the user equipment additionally accesses a channel to perform UL transmission in a partial subframe may be considered. If the user equipment is configured for transmission of a partial subframe and the user equipment does not succeed in channel access for UL transmission at the starting time point of the UL subframe or the starting time point of the UL grant for transmission of the UL subframe indicated by the UL grant, a method in which a user equipment performs additional channel access for transmission of a partial subframe in a UL subframe will be described below.

According to the setting of the base station, the user equipment may start transmission of the starting partial subframe and configure a partial subframe as shown in FIGS. 24 to 25. In this case, when the user equipment performs channel access at the starting time point of the UL transmission indicated by the UL grant from the base station and then fails, the user equipment may additionally perform channel access before the starting time point indicated by the UL grant for UL transmission in the next UL starting partial subframe. In this case, it is a matter of which channel access parameter the user equipment uses while performing channel access for UL transmission in the starting partial subframe. Specifically, it is a matter of which channel access type the user equipment should use to perform channel access for UL transmission in the starting partial subframe.

In addition, it is a matter of which channel access priority class the user equipment should use to perform channel access for UL transmission in the UL starting partial subframe. When the user equipment is configured for partial subframe transmission from the base station, the user equipment may start the UL transmission for the base station at one or more time points within the subframe boundary and a subframe. In this case, the subframe boundary and one or more time points within the subframe may be configured by the base station. In more detail, the subframe boundary and one or more time points within the subframe may be indicated by the UL grant. When the user equipment fails to access the channel until the initial starting time point of the transmission, the user equipment may attempt transmission to the base station by attempting channel access before the remaining starting time points of the transmission other than the initial starting time point of the transmission. When a user equipment can start UL transmission at a plurality of starting time points of the UL transmission in such a manner, the channel access type used by the user equipment and the parameters related to channel access are problematic.

In a specific embodiment, when a user equipment fails to access a channel and fails to start UL transmission at a initial starting time point of the transmission, the user equipment may attempt channel access before the remaining starting time points of the transmission other than the starting time point. In this case, the user equipment may perform channel access using the channel access type indicated by the UL grant with respect to UL transmission at the remaining starting time points of the transmission in the subframe to be transmitted. In addition, the user equipment may perform channel access according to a channel access priority class indicated by a UL grant for a subframe to be transmitted. In this case, the UL grant may be a UL grant in which the user equipment indicates UL transmission at the initial starting time point of the transmission. In addition, the UL grant may be a UL grant indicating the UL transmission that the user equipment attempts after the initial starting time point of the transmission. For example, when a user equipment fails to access a channel using a type 1 channel access indicated by a UL grant and fails to start UL transmission until the initial starting time point of the transmission, the user equipment may attempt channel access using the type 1 channel access after the initial starting time point of the transmission. When a user equipment fails to access a channel using a type 2 channel access indicated by a UL grant and fails to start UL transmission until the initial starting time point of the transmission, the user equipment may attempt channel access using the type 2 channel access after the initial starting time point of the transmission. In another specific embodiment, when a user equipment fails to access a channel using a type 2 channel access indicated by a UL grant, fails to start UL transmission until the initial starting time point of the transmission, and the channel is idle continuously during the defer period after the initial starting time point of the transmission, the user equipment may attempt channel access using the type 2 channel access. In addition, when the user equipment fails to access the channel and fails to start UL transmission until the initial starting time point of the transmission, the user equipment may perform channel access using the channel access priority class used for channel access before the initial starting time point of the transmission with respect to UL transmission at the remaining starting time points of the transmission in the subframe to be transmitted.

In another specific embodiment, when a user equipment fails to access a channel and fails to start UL transmission until the initial starting time point of the transmission, the user equipment may attempt channel access before the remaining starting time points of the transmission other than the initial starting time point. In this case, the user equipment may perform channel access based on the channel access type used in the channel access until the initial starting time point of the transmission. In more detail, when the user equipment fails to access the channel and fails to start UL transmission until the initial starting time point of the transmission, the user equipment may perform channel access based on the channel access type used in the channel access until the initial starting time point of the transmission regardless of the channel access type indicated by the UL grant. This is because the user equipment determines the channel access type according to the channel access type determination condition, so that the user equipment may be allowed to perform channel access according to the same channel access type. In addition, the user equipment may perform channel access based on the channel access priority class used in the channel access before the initial starting time point of the transmission. In more detail, when the user equipment fails to access the channel and fails to start UL transmission until the initial starting time point of the transmission, the user equipment may perform channel access based on the channel access priority class used in the channel access before the initial starting time point of the transmission regardless of the channel access priority class indicated by the UL grant.

In another specific embodiment, when a user equipment fails to access a channel and fails to start UL transmission until a initial starting time point of the transmission, the user equipment may attempt channel access before the remaining starting time points of the transmission other than the initial starting time point. In this case, the user equipment may determine the channel access type used in channel access after the initial starting time point of the transmission based on whether the user equipment performs transmission in the MCOT. In more detail, the user equipment may determine the channel access type based on whether transmission is performed in the MCOT regardless of the channel access type indicated by the UL grant. In this case, when the user equipment performs transmission in the MCOT, the user equipment may perform channel access using channel access type 2. In addition, the user equipment may perform UL transmission based on the 2nd trigger through the C-PDCCH. In this case, the user equipment may determine the channel access type used in channel access after the initial starting time point of the transmission based on whether the user equipment performs transmission within the UL duration set by the base station. Specifically, the user equipment may determine the channel access type used in channel access after the initial starting time point of the transmission based on whether the user equipment performs transmission within the UL duration set by the base station, regardless of the channel access type indicated by the UL grant. In this case, when the user equipment performs transmission in the UL duration set by the base station, the user equipment may perform channel access using the channel access type 2.

In another specific embodiment, when a user equipment fails to access a channel and fails to start UL transmission until a initial starting time point of the transmission, the user equipment may attempt channel access before the remaining starting time points of the transmission other than the initial starting time point. In this case, the user equipment may perform channel access based on the channel access type used in the channel access until the initial starting time point of the transmission. In this case, for example, when the user equipment attempts to access the channel using the channel access type 2 and fails to access the channel thereby failing to start the UL transmission until the initial starting time point of the transmission, the user equipment may attempt channel access using the channel access type 2. In this case, when the channel is continuously idle for a predetermined time section, the user equipment may attempt channel access using the channel access type 2. In addition, when the user equipment attempts to access the channel using the channel access type 2 and fails to access the channel until the initial starting time point of the transmission, the user equipment may attempt channel access using the channel access type 2 until the starting time point of the UL transmission, which is intended by the user equipment or base station. In this case, when the channel is continuously idle for a predetermined time interval, the user equipment may attempt channel access using the channel access type 2.

In another specific embodiment, when a user equipment fails to access a channel and fails to start UL transmission until the initial starting time point of the transmission, the user equipment may attempt channel access before the remaining starting time points of the transmission other than the initial starting time point. In this case, the user equipment may perform channel access using a predetermined channel access type regardless of the channel access type used in the channel access until the initial starting time point of the transmission. Specifically, the user equipment may perform channel access using a predetermined channel access type regardless of the channel access type used by the user equipment for channel access until the initial starting time point of the transmission and whether the user equipment performs transmission in the MCOT. In the above-described embodiments, the predetermined channel access type may be the type 1 channel access described above. For example, when a user equipment fails to access a channel using the type 2 channel access and fails to start UL transmission until the initial starting time point of the transmission, the user equipment may perform the type 1 channel access using a channel access priority class indicated by a UL grant indicating the type 2 channel access. In such an embodiment, the user equipment may perform type 1 channel access to increase fairness for coexistence with other wireless communication devices.

In the above-described embodiments, the MCOT may indicate the MCOT obtained by the base station. In the above-described embodiments, the MCOT may indicate the MCOT obtained by the user equipment.

In the above-described embodiments, when the user equipment succeeds in channel access after the initial starting time point of the transmission, the user equipment may perform UL transmission for the base station from the remaining starting time point of the transmission other than the initial starting time point of the transmission. In this case, when the user equipment receives the scheduling information on the UL transmission of the entire subframe by the UL grant, the user equipment may puncture the data channel scheduled to be transmitted before the starting time point of the UL transmission, and the user equipment may transmit the remaining data channel to the base station from the remaining starting time points of the transmission other than the initial starting time point of the transmission.

In another specific embodiment, when the user equipment receives the scheduling information on the UL transmission of the entire subframe by the UL grant, the user equipment may rate-match the data channel scheduled to be transmitted before the starting time point of the UL transmission, and the user equipment may transmit the rate-matched data channel to the base station from the remaining starting time points of the transmission other than the initial starting time point of the transmission.

When the user equipment accesses the channel using a channel access based random backoff, the user equipment may adjust the size CWS of the contention window based on whether the previously transmitted UL transmission is successful or not. The user equipment may randomly obtain any one of natural numbers from 0 to CW, and backoff for a time interval determined according to the obtained natural number. In this case, the probability that the user equipment obtains each of the natural numbers from 0 to CW is the same. Therefore, the user equipment may adjust the CWS by adjusting the value of CW. In this case, the previously transmitted transmission may specifically indicate the transmission of the previously transmitted subframe. For convenience of description, a corresponding subframe is referred to as a reference subframe in transmission of a subframe that is a reference of CW adjustment. In addition, an identifier ID for identifying an HARQ process of the UL-SCH in the reference subframe is referred to as a reference HARQ_PROCESS_ID. In this case, the UL-SCH is a data channel including user data. In more detail, when an NDI value for at least one HARQ process associated with at least one reference HARQ_PROCESS_ID is toggled, the user equipment may reset a value of the CW for each of all channel access priority classes by each class. When the user equipment resets a value of the CW for each of all channel access priority classes by each class, the user equipment may set the value of the CW for each of all channel access priority classes to the minimum value in a corresponding channel access priority class. When this is not the case, the user equipment may increase the value of the CW for each of all priority classes to the next higher allowed value than the current value of the CW among the allowable values of the priority class. In this case, the user equipment may maintain the value of the CW of the corresponding channel access priority class when the current value of the CW is the largest value in the corresponding channel access priority class. In addition, when the user equipment receives the UL grant, the toggle of the received NDI value may indicate that the transmission corresponding to the HARQ process associated with the corresponding HARQ_PROCESS_ID previously transmitted by the user equipment is successful. In addition, the toggle of the NDI value received when receiving the UL grant may indicate that scheduling from the currently received UL grant indicates new data.

The user equipment may determine the reference subframe $n_{ref}$ according to the following rule. In more detail, the user equipment may determine a reference subframe $n_{ref}$ based on a UL grant subframe $n_g$, which is a subframe for receiving a UL grant for the user equipment. According to a specific embodiment of the present invention, a user equipment may perform UL transmission including a UL-SCH by using a channel access based random backoff, and determine, as the reference subframe $n_{ref}$, a subframe before the time point obtained by subtracting a predetermined time interval from the subframe $n_g$ transmitting the UL grant based on a UL transmission burst including the most recent subframe $n_w$ among subframes for UL transmission. The predetermined time interval may be a duration of three subframes. That is, among the subframes transmitted by the user equipment before the time point (before $n_g$-3) after subtracting the duration of three subframes from the subframes $n_g$ transmitting the UL grant, the most recent subframe transmitted by the user equipment may be a recent subframe $n_w$. In this case, among the subframes transmitted by the user equipment before the duration ($n_g$-3) of three subframes based on the subframe $n_g$ transmitting the UL grant, the user equipment may determine the reference subframe $n_{ref}$ based on the subframe transmitted most recently by the user equipment. Among subframes for UL transmission before a predetermined time interval, which are ahead of the UL grant subframe $n_g$, the UL transmission burst including the most recent subframe $n_w$ is referred to as the reference UL transmission burst. Among the subframes for UL transmission before the time point obtained by subtracting a predetermined time interval from the subframe $n_g$ transmitting the UL grant, when there are one or more subframes that are continuous without a gap with the most recent subframe $n_w$ and are earlier than the most recent subframe $n_w$, the user equipment may determine, as the reference subframe $n_{ref}$, the subframe transmitted by the user equipment first among the corresponding one or more subframes. In addition, when the UL transmission burst includes only one subframe, the user equipment may determine the corresponding subframe $n_w$ as the reference subframe $n_{ref}$.

In addition, as described above, the user equipment may start UL transmission at a time point that is not a subframe boundary. The user equipment may start uplink transmission based on one of an SC-FDMA symbol having an index of 0 and an SC-FDMA symbol having an index of 7 based on the subframe. Specifically, the user equipment may start uplink transmission from at least one of the starting time point of the SC-FDMA symbol having an index of 0, the time point obtained by adding 25 us to the starting time point of the SC-FDMA symbol having an index of 0, the time point obtained by adding Timing Advance (TA) to the time point obtained by adding 35 us to the starting time point of the SC-FDMA symbol having an index of 0, and the starting time point of the SC-FDMA symbol having an index of 1. In addition, the user equipment may further start uplink transmission from at least one of the starting time point of the SC-FDMA symbol having an index of 7, the time point obtained by adding 25 us to the starting time point of the SC-FDMA symbol having an index of 7, the time point obtained by adding TA to the time point obtained by adding 35 us to the starting time point of the SC-FDMA symbol having an index of 7, and the starting position of the SC-FDMA symbol having an index of 8. In a specific embodiment, when the user equipment attempts to access a channel at a subframe starting time point and the user equipment does not succeed in channel access until the subframe starting time point according to the channel access result, the user equipment may start the UL transmission at a specific time point in the corresponding subframe. This UL transmission mode may be referred to as mode 1.

In addition, the user equipment may start the UL transmission according to the indication of the base station at a random time point between the starting time point of the SC-FDMA symbol having an index 7 of the SC-FDMA symbol, and the starting time point of the SC-FDMA symbol having an index 7 of the SC-FDMA symbol and the starting time point of the SC-FDMA symbol having an index of 8. In addition, as described above, the user equipment may further start uplink transmission from at least one of the starting time point of the SC-FDMA symbol having an index of 7, the time point obtained by adding 25 us to the starting time point of the SC-FDMA symbol having an index of 7, the time point obtained by adding TA to the time point obtained by adding 35 us to the starting time point of the SC-FDMA symbol having an index of 7, and the starting position of the SC-FDMA symbol having an index of 8. This UL transmission mode may be referred to as mode 2. In various embodiments including these embodiments, a partial subframe may be transmitted. Therefore, when the reference UL transmission burst includes a partial subframe, a method of setting a reference subframe by the user equipment is a problem. This will be described with reference to FIGS. 28 to 30.

Figure 28:
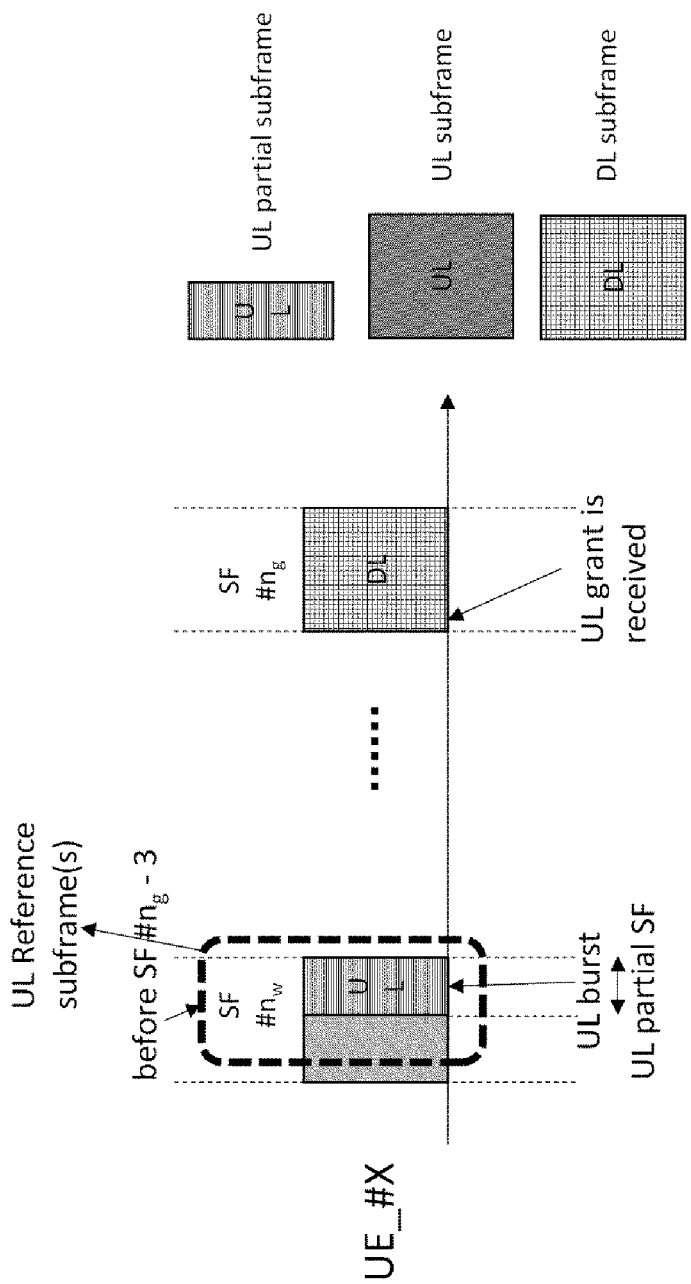
FIGS. 28 to 30 show operation of determining, by a user equipment, a reference subframe of CWS adjustment based on a subframe including an UL grant.
Figure 29:
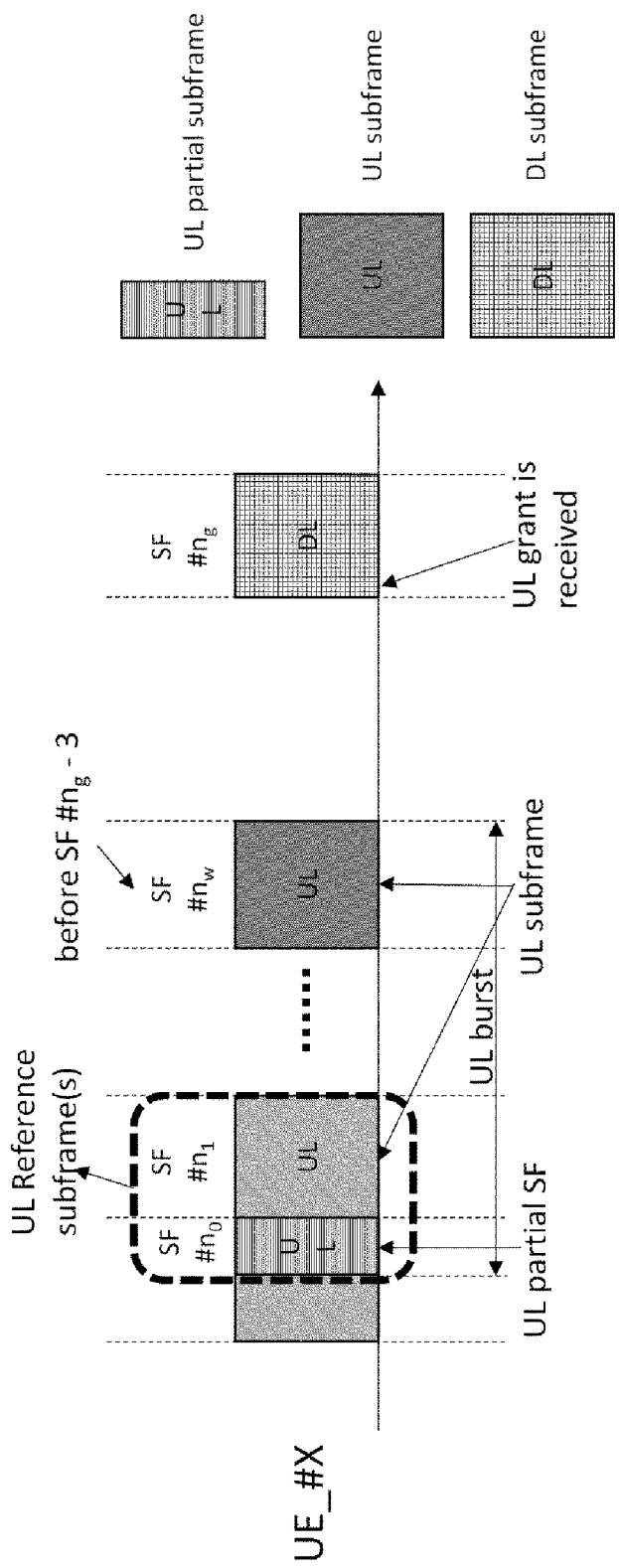
Figure 30:
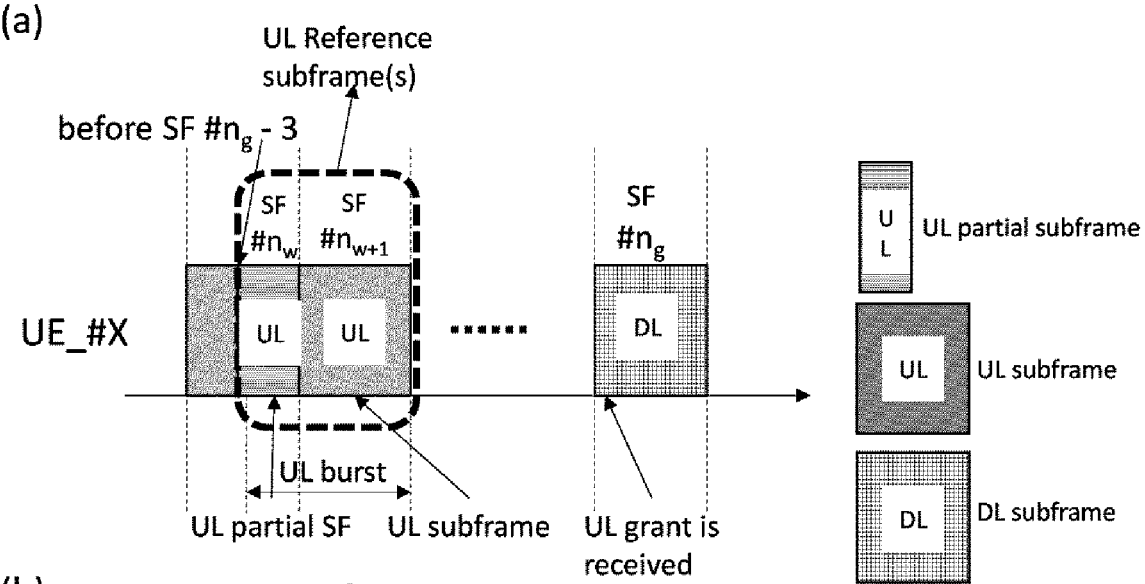
Figure 30:
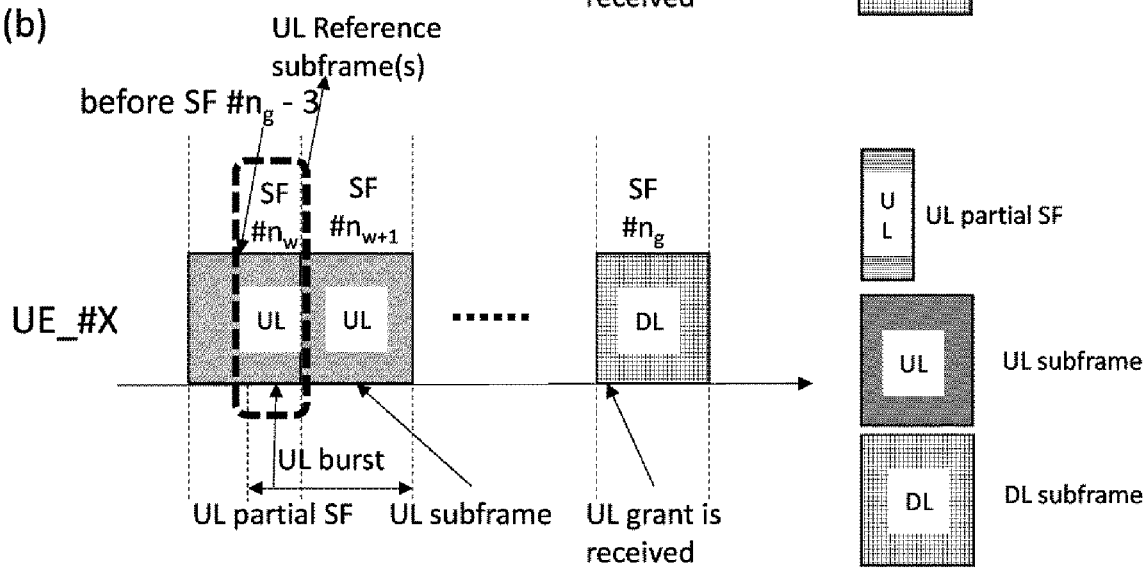

FIGS. 28 to 30 show operation of determining, by a user equipment, a reference subframe of CWS adjustment based on a subframe including an UL grant.

When the reference subframe includes only partial subframes, even if the user equipment succeeds in channel access, due to the short data length transmitted through the partial subframe, the base station may fail to decode the data. Accordingly, the base station may set the NDI corresponding to the partial subframe not to be toggled and request the user equipment to re-transmit. In addition, in the case of the mode 1 described in the embodiment of the present invention, data scheduling is received from the base station for the entire subframe but channel access may fail at the starting time point of the transmission near the subframe boundary, and channel access may be successful before the transmission position of the second slot. In this case, the user equipment may transmit UL data by puncturing part of the UL transmission. Since part of the UL transmissions is punctured, it is likely that the base station fails to decode the UL transmissions of the user equipment. In such a way, although the user equipment succeeds in channel access, the value of the CW may increase due to the data decoding failure of the base station. Therefore, when the reference subframe includes the partial subframe, the user equipment needs to additionally determine a subframe other than the partial subframe as the reference subframe.

When the reference UL transmission burst includes only a partial subframe, the user equipment may determine the corresponding partial subframe as the reference subframe. Specifically, among subframes for UL transmission to subframes ahead of time points obtained by subtracting a predetermined time interval from the subframe $n_g$ receiving the UL grant, when the most recent subframe $n_w$ is a partial subframe and there is no continuous subframe without a gap with the partial subframe, the user equipment may determine the corresponding partial subframe as a reference subframe. In the embodiment of FIG. 28, among subframes for UL transmission to a subframe ahead of (before SF #$n_g$-3) the time point obtained by subtracting three subframe durations from the subframe SF #$n_g$ receiving the UL grant, the most recent subframe SF #$n_w$ is a partial subframe, and there is no continuous subframe with the corresponding partial subframe. Accordingly, among subframes for UL transmission to a subframe ahead of (before SF #$n_g$-3) the three subframe durations, which is other than the subframe SF #$n_g$ receiving the UL grant, the user equipment determines the partial subframe SF #$n_w$, which is the most recent subframe, as a reference subframe.

When the reference UL transmission burst includes a partial subframe and at least one subframe and the partial subframe is the leading subframe no in the UL transmission burst, the user equipment may determine the subframe immediately following the partial subframe as the reference subframe in the partial subframe and the UL transmission burst. Specifically, among subframes for UL transmission to a subframe ahead of the time point obtained by subtracting a predetermined time interval, which is other than the subframe $n_g$ receiving the UL grant, there are one or more subframes that are continuous with the most recent subframe $n_w$ and are ahead of the most recent subframe $n_w$, and the earliest subframe among the one or more subframes may be a partial subframe. In this case, the user equipment may determine the subframe immediately following the corresponding partial subframe as the reference subframes in the corresponding partial subframe and at least one subframe. In such embodiments, when NDI is toggled for at least one HARQ process among the reference HARQ process IDs associated with each of the earliest partial subframe in the reference UL transmission burst and the subframe immediately following the corresponding partial subframe in the UL transmission burst, the user equipment may reset the value of the CW for each channel access priority class to each channel access priority class's minimum value. In addition, when NDI is not toggled for at least one HARQ process among the reference HARQ process IDs associated with each of the earliest partial subframe in the reference UL transmission burst and the subframe immediately following the corresponding partial subframe in the UL transmission burst, the user equipment may increase the value of the CW for each channel priority class to the next larger value than the current value of the CW among the allowable values in the channel priority class.

In the embodiment of FIG. 29, among subframes for UL transmission ahead of (before SF #$n_g$-3) the time point obtained by subtracting three subframe durations from the subframe SF #$n_g$ receiving the UL grant, there is at least one subframe that is continuous without a gap with the most recent subframe SF #$n_w$ before the recent subframe SF #$n_w$. In this case, the earliest subframe among the one or more subframes is the partial subframe SF #no. Therefore, the user equipment determines the partial subframe SF #no and the subframe SF #$n_1$ for UL transmission immediately following the partial subframe SF #no as the reference subframes.

When the reference UL transmission burst includes a partial subframe and the corresponding partial subframe is the earliest subframe in the UL transmission burst including a partial subframe, the user equipment may determine the corresponding partial subframe and the subframe immediately following the corresponding partial subframe as the reference subframes. Specifically, among subframes for UL transmission ahead of the time point obtained by subtracting a predetermined time interval from the subframe $n_g$ transmitting the UL grant, the most recent subframe $n_w$ is a partial subframe and there is no subframe that is continuous without a gap with a partial subframe and is for the preceding UL transmission, but there may be at least one subframe that is continuous with a partial subframe without a gap and is for the following UL transmission. In this case, the user equipment may determine, as a reference subframe, a partial subframe that is the most recent subframe $n_w$ and a subframe immediately following the corresponding partial subframe in one or more subframes. In such embodiments, when NDI is toggled for at least one HARQ process among the reference HARQ process IDs associated with each of the earliest partial subframe in the reference UL transmission burst and the subframe immediately following the corresponding partial subframe in the UL transmission burst, the user equipment may reset the value of the CW for each channel access priority class to each channel access priority class's minimum value. In addition, when NDI is not toggled for at least one HARQ process among the reference HARQ process IDs associated with each of the earliest partial subframe in the reference UL transmission burst and the subframe immediately following the corresponding partial subframe in the UL transmission burst, the user equipment may increase the value of the CW for each channel priority class to the next larger value than the current value of the CW among the allowable values in the channel priority class.

In the embodiment of FIG. 30(a), among subframes for UL transmission ahead of (before SF #$n_g$-3) the time point obtained by subtracting three subframe durations from the subframe SF #$n_g$ transmitting the UL grant, the most recent subframe SF #$n_w$ is a partial subframe. Also, there are one or more subframes that are continuous without a gap with a partial subframe. In this case, the user equipment may receive the NDI as HARQ feedback in consideration of the processing time for the UL reception of the base station for the UL transmission in the subframe $n_w$+1. In this case, the user equipment determines the partial subframe SF #$n_w$ and the subframe SF #$n_w$+1 immediately following the partial subframe SF #$n_w$ as a reference subframe.

In another specific embodiment, when the reference UL transmission burst includes a partial subframe and the corresponding partial subframe is the earliest subframe in the UL transmission burst including a partial subframe, the user equipment may determine the corresponding partial subframe as the reference subframe. Specifically, among subframes for UL transmission ahead of the time point obtained by subtracting a predetermined time interval from the subframe ng transmitting the UL grant, the most recent subframe $n_w$ is a partial subframe and there is no subframe that is continuous without a gap with a partial subframe and is for the preceding UL transmission, but there may be at least one subframe that is continuous with a partial subframe without a gap and is for the following UL transmission. In this case, the user equipment may determine the corresponding partial subframe as a reference subframe. In such embodiments, when the NDI of the reference HARQ process ID associated with the most leasing partial subframe in the reference UL transmission burst is toggled, the user equipment may reset the value of the CW for each channel access priority class to its minimum value. In addition, when the NDI of the reference HARQ process ID associated with the most leasing partial subframe in the reference UL transmission burst is not toggled, the user equipment may increase the value of the CW for each channel priority class to the next larger value than the current value of the CW among the allowable values in the channel priority class.

The user equipment may determine the partial subframe and the subframe immediately following the partial subframe as the reference subframe. In such embodiments, when NDI is toggled for at least one HARQ process among the reference HARQ process IDs associated with each of the earliest partial subframe in the reference UL transmission burst and the subframe immediately following the corresponding partial subframe, the user equipment may reset the value of the CW for each channel access priority class to its minimum value. In addition, when NDI is not toggled for at least one HARQ process among the reference HARQ process IDs associated with each of the earliest partial subframe in the reference UL transmission burst and the subframe immediately following the corresponding partial subframe, the user equipment may increase the value of the CW for each channel priority class to the next larger value than the current value of the CW among the allowable values in the channel priority class.

Like the embodiment of FIG. 30(a), in the embodiment of FIG. 30(b), among subframes for UL transmission ahead of the time point obtained by subtracting three subframe durations from the subframe SF #$n_g$ transmitting the UL grant, the most recent subframe SF #$n_w$ is a partial subframe. Also, there may be one or more subframes that are continuous without a gap with a partial subframe. In this case, the user equipment may not receive the NDI as HARQ feedback in consideration of the processing time for the UL reception of the base station for the UL transmission in the subframe $n_w$+1. In this case, the user equipment determines the partial subframe SF #$n_w$ as the reference subframe. The user equipment may access the channel based on the adjusted value of the CW according to the embodiments described with reference to FIGS. 28 to 30. When the user equipment succeeds in channel access, the user equipment may perform UL transmission for the base station.

The embodiments described with reference to FIGS. 28 to 30 may also be applied when the reference UL transmission burst is transmitted in mode 1 among the above-described UL transmission modes. In addition, the embodiments described with reference to FIGS. 28 to 30 may also be applied when the reference UL transmission burst is transmitted in mode 2 among the above-described UL transmission modes. In addition, the embodiments described with reference to FIGS. 28 to 30 may be equally applicable to autonomous UL transmission (AUL) as well as schedule-based UL transmission.

In addition, the control channel may support cross-carrier scheduling as well as self-carrier scheduling. The DL control channel may be any one of the above-described PDCCH and E-PDCCH. In addition, the DL data channel may be PDSCH. The UL control channel may be a PUCCH. In addition, the UL data channel may be a PUSCH. Embodiments of the invention described above may be applied to unlicensed bands as well as other frequency bands using radio resources after a contention procedure.

Figure 31:
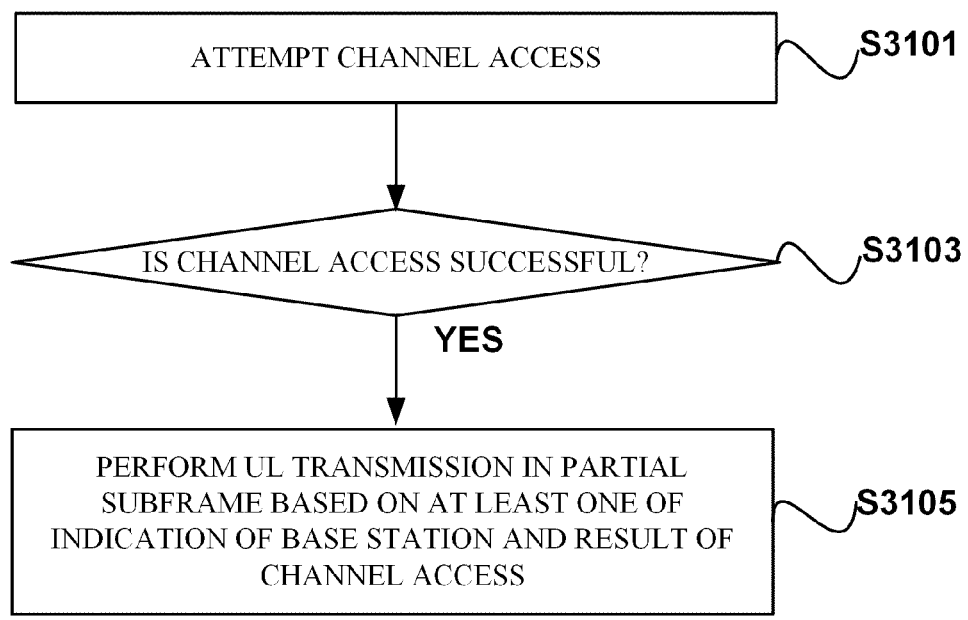
FIG. 31 is a flowchart illustrating an operation of a user equipment according to an embodiment of the present invention.

FIG. 31 is a flowchart illustrating an operation of a user equipment according to an embodiment of the present invention.

The user equipment may perform uplink (UL) transmission including a single or a plurality of subframes. In this case, the user equipment may perform UL transmission to the base station in a partial subframe having a duration shorter than one subframe duration according to at least one of the indication of the base station and the channel access result. The UL transmission may include transmission of a UL channel. In this case, the UL channel may be a PUSCH. In addition, the UL transmission may include transmission of a reference signal. In this case, the reference signal may be an SRS or UL DM-RS.

The user equipment attempts to access a channel (S3101). The user equipment may attempt to access the channel using type 1 channel access or type 2 channel access. In this case, the type 1 channel access may indicate a channel access based random backoff. In more detail, the type 1 channel access may indicate a channel access method in which a user equipment obtains a random value in a contention window and accesses the channel based on whether the channel is idle for a time interval determined based on the random value obtained by the user equipment. In more detail, the type 1 channel access may indicate a channel access method using the cat-4 LBT described above. In addition, the type 2 channel access may indicate a channel access method in which a user equipment accesses a channel based on whether the channel is idle for a predetermined single time section. In this case, the predetermined time section may be 25 us. In more detail, the type 2 channel access may indicate a channel access using the cat-2 LBT described above. The detailed operation of the user equipment may follow the embodiments described with reference to FIGS. 14 to 16.

When the user equipment succeeds in the accessing the channel, the user equipment performs UL transmission to the base station in a partial subframe based on at least one of an indication of the base station and a result of the accessing the channel (S3105). The duration of the partial subframe may be smaller than the duration of one subframe as described above. The duration of one subframe may be 1 ms.

As described above, the user equipment may transmit the first subframe of the UL transmission burst as a partial subframe. In addition, the user equipment may transmit the last subframe of the UL transmission burst as a partial subframe. In a specific embodiment, the user equipment may start transmission of the partial subframe for the base station from at least one of the UL DM-RS transmission starting position as well as the slot boundary. In this case, the UL DM-RS may be a reference signal for demodulation of the data channel and the control channel transmitted in the UL transmission. In more detail, the user equipment may start transmission at one or more time points designated based on a subframe boundary and at least one time point designated based on one or more time points in the subframe.

In another specific embodiment, the user equipment may transmit a partial subframe including at least one UL DM-RS to the base station regardless of whether the transmission starting position of a partial subframe is a slot boundary.

In another specific embodiment, the user equipment may end transmission of the partial subframe for the base station in at least one of the UL DM-RS transmission ending position as well as the slot boundary. In this case, the UL DM-RS may be a reference signal for demodulation of the data channel and the control channel transmitted in the UL transmission. In more detail, the user equipment may start transmission at one or more time points designated based on a subframe boundary and at least one time point designated based on one or more time points in the subframe.

In another specific embodiment, in relation to the configuration of the partial subframe, the user equipment configures the partial subframe from the SC-FDMA index 0 to the SC-FDMA symbol having an SC-FDMA symbol index of 3, 6, or 10, and transmits the partial subframe to the base station. In this case, the user equipment may transmit a Demodulation-Reference Signal (DM-RS) at the position of the SC-FDMA symbol having an index of 3 or 10 in the subframe.

In another specific embodiment, the user equipment may transmit a partial subframe including at least one UL DM-RS to the base station regardless of whether the transmission ending position of a partial subframe is a slot boundary.

In the above-described embodiments, the base station may signal the information on the starting position of the partial subframe transmission or the information on the ending position of the partial subframe transmission using a common control channel. The user equipment may receive the common control channel from the base station to obtain information on the starting position of the partial subframe transmission or information on the ending position of the partial subframe transmission ending position. In addition, the base station may signal the information on the starting position of the partial subframe transmission or the information on the ending position of the partial subframe transmission by using a UE specific control channel transmitted when the UL grant is transmitted. When the user equipment receives a UL grant, the user equipment may receive a UE specific control channel from the base station to obtain information on the starting position of the partial subframe transmission or information on the ending position of the partial subframe transmission. In addition, the base station may signal the information on the starting position of the partial subframe transmission or the information on the ending position of the partial subframe transmission by using the common control channel and a UE specific control channel transmitted when the UL grant is transmitted. When the user equipment receives a common control channel and a UL grant, the user equipment may receive a UE specific control channel from the base station to obtain information on the starting position of the partial subframe transmission or information on the ending position of the partial subframe transmission. In addition, in a specific embodiment, the control channel may be a PDCCH. Also, the user equipment may perform specific operations regarding transmission start and transmission end of a partial subframe according to the embodiments described with reference to FIGS. 23 to 27.

The UL grant may indicate that the user equipment is capable of starting transmission at the subframe boundary and at one or more time points within the subframe, and the user equipment may fail to access the channel until the initial starting time point of the transmission. In this case, the user equipment may attempt UL transmission to the base station before the remaining starting time points of the transmission other than the initial starting time point of the transmission. In a specific embodiment, after the initial starting time point of the transmission, the user equipment may perform channel access using a channel access type indicated by a UL grant for a subframe to be transmitted. In another specific embodiment, after the initial starting time point of the transmission, the user equipment may perform channel access based on the channel access type used in the channel access until the initial starting time point of the transmission.

In another specific embodiment, when the user equipment fails to access the channel and fails to start UL transmission to the base station until the initial starting time point of the transmission, the user equipment may determine the channel access type used for channel access after the initial starting time point of the transmission based on whether the user equipment performs transmission in the MCOT. In this case, the MCOT may be set by the base station. Specifically, based on whether the user equipment performs transmission within the MCOT regardless of the channel access type indicated by the UL grant indicating the UL transmission for the base station, the user equipment may determine the channel access type used for channel access after the initial starting time point of the transmission. In this case, when the user equipment performs transmission in the MCOT, the user equipment may perform channel access using channel access type 2.

In another specific embodiment, when the user equipment fails to access the channel until the initial starting time point of the transmission and fails to start UL transmission until the initial starting time point of the transmission, the user equipment may perform channel access after the initial starting time point of the transmission based on the channel access type used in the channel access until the initial starting time point of the transmission. Specifically, regardless of the channel access type indicated by the UL grant indicating the UL transmission after the initial starting time point, the user equipment may access the channel for UL transmission to the base station after the initial starting time point of the transmission using the channel access type used before the initial starting time point of the transmission. The specific operation of the user equipment with respect to channel access may follow the above-described embodiments.

When the user equipment accesses the channel using a channel access based random backoff, the user equipment may adjust the value of the contention window used for the channel access based random backoff based on whether a transmission of a reference subframe previously transmitted using the channel access based random backoff is successful or not. In this case, the user equipment may attempt UL transmission to the base station by accessing the channel based on the adjusted contention window. In this case, the reference subframe may include the partial subframe. In addition, the contention window may indicate a range in which a natural number that determines a backoff time in a procedure of a channel access based random backoff is obtained randomly, and the value of the contention window may be the largest value among natural values that determine the backoff time. In addition, the minimum value of the contention window may be fixed to 0.

The earliest subframe among the first one or more subframes that are continuously transmitted without intervals before the subframes recently transmitted by the user equipment and perform UL transmission may be a partial subframe. In this case, the recently transmitted subframe is a subframe that is transmitted by the user equipment ahead of the time point obtained by subtracting a predetermined time interval from the starting time point of the subframe including the UL grant and is most recently transmitted by the user equipment among the subframes performing the UL transmission, and the UL grant may indicate UL transmission for the base station attempting the transmission by accessing a channel based on the size of the contention window. In this case, the user equipment may determine, as the reference subframe, the subframe transmitted by the user equipment immediately following the earliest subframe among the earliest subframe and one or more first subframes.

When the recently transmitted subframe is the partial subframe and there are no one or more first subframes, the user equipment may determine only the recently transmitted subframe as the reference subframe.

The recently transmitted subframe may be a partial subframe, there may be no one or more first subframes, and there may be one or more second subframes that are transmitted by the user equipment continuously without a gap after a recently transmitted subframe and perform UL transmission. In this case, however, a subframe following the recently transmitted subframe among the recently transmitted subframe and the one or more second subframes may be determined as the reference subframe.

When a new data indicator (NDI) for at least one HARQ process associated with at least one reference HARQ process ID is toggled, the user equipment may set the value of the contention window of all channel access priority classes to the minimum value of the value of the contention window corresponding to each of the corresponding channel access priority classes. In this case, the reference HARQ process ID may be an identifier for identifying the HARQ process of the UL-SCH in the reference subframe. In addition, when an NDI for at least one HARQ process associated with at least one reference HARQ process ID is not toggled, the user equipment may increase the size of the contention window of all channel access priority classes to the next larger value than the current contention window value among the values allowed in the channel access priority class. In this case, if the value of the current contention window is the largest value among the contention window values allowed in the corresponding channel access priority class, the user equipment may maintain the contention window value of the corresponding channel access priority class as it is.

Figure 32:
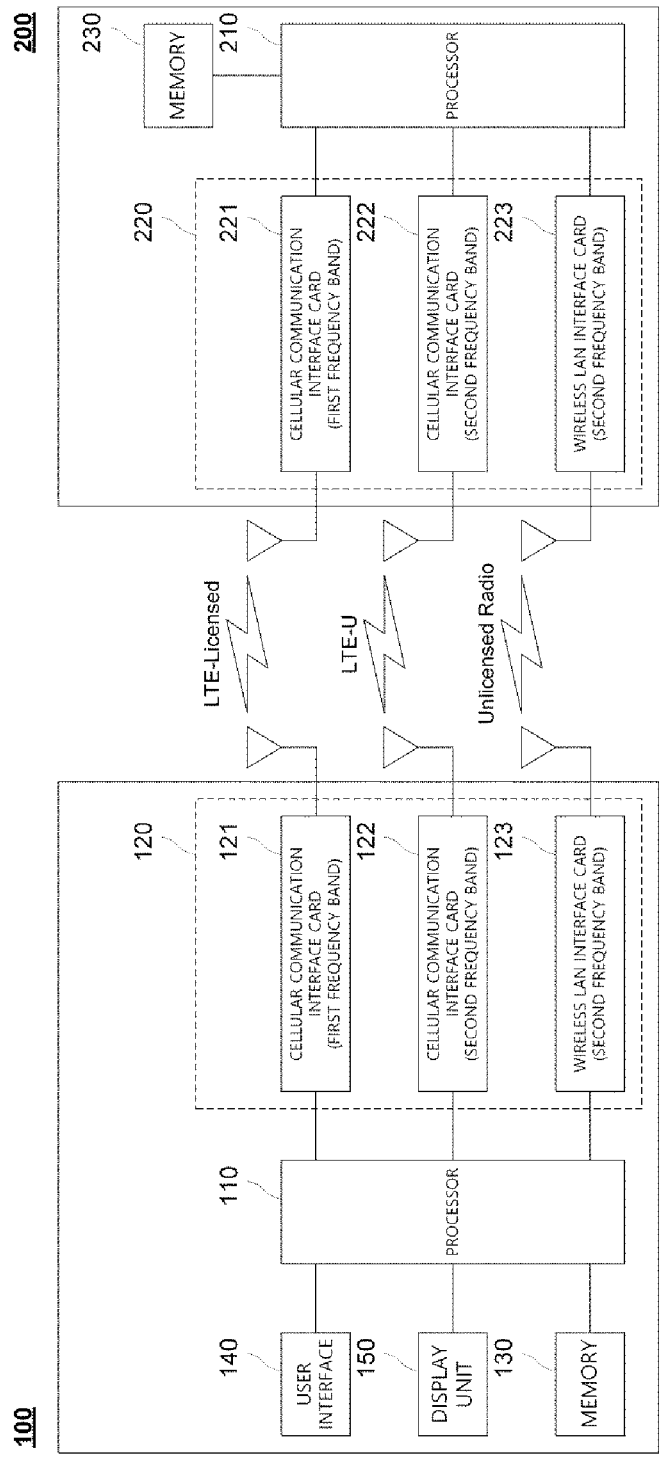
FIG. 32 shows a configuration of a user equipment and a base station according to an embodiment of the present invention.

FIG. 32 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (eg, macrocell, femtocell, picocell, etc.) corresponding to a service area and perform function such as transmitting signal, designating channel, monitoring channel, self-diagnosis, relay. The base station may be referred to as an evolved NodeB (eNB), an access point (AP), or the like.

Referring to the figure, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In the figure, the communication module 120 is illustrated as the integrated module, but the respective network interface cards may be independently disposed according to a circuit configuration or a purpose unlike the figure.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data and control channel transmission/reception among the units. For example, the processor 210 may transmit/process the downlink transmission of data and control channel according to the proposal of the present invention. For example, transmission of control channel and used data is performed according to the FIGS. 17 to 23.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In the figure, the communication module 220 is illustrated as the integrated module, but the respective network interface cards may be independently disposed according to the circuit configuration or the purpose unlike the figure.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In the figure, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A user equipment configured to operate in a wireless communication system, the user equipment comprising:
a communication module; and
a processor,
wherein the processor is configured to:
perform, in an unlicensed band, a first transmission on a single or a plurality of subframes by using the communication module,
wherein the processor is further configured to:
perform, in the unlicensed band, the first transmission in a partial subframe having a duration shorter than a duration of one subframe according to at least one of an indication of a mode of the first transmission and a result of a channel access of the user equipment,
when the user equipment accesses a channel in the unlicensed band using a random backoff based channel access, adjust a size of a contention window used in the random backoff based channel access based on whether a transmission of a reference subframe previously transmitted by the user equipment using the random backoff based channel access is successful or not, and
perform, in the unlicensed band, a second transmission by accessing the channel based on the size of the contention window,
wherein the reference subframe comprises the partial subframe,
wherein a backoff time in a procedure of the random backoff based channel access is determined based on a random number uniformly distributed within 0 and the size of the contention window.

2. The user equipment of claim 1, wherein the processor is configured to:
when an earliest subframe among a plurality of subframes that are continuously transmitted, by the user equipment in the unlicensed band, without a gap before a recently transmitted subframe is the partial subframe, determine, as the reference subframe, the earliest subframe and a subframe transmitted by the user equipment immediately after the earliest subframe among the plurality of subframes,
wherein the recently transmitted subframe is a subframe that is transmitted most recently by the user equipment among subframes that are transmitted by the user equipment before a time point obtained by subtracting a predetermined time interval from a starting time point of a subframe including a first grant,
wherein the first grant indicates the second transmission.

3. The user equipment of claim 2, wherein when the plurality of subframes include no subframe, the processor is configured to determine only the recently transmitted subframe in the unlicensed band as the reference subframe.

4. The user equipment of claim 1, wherein when a new data indicator (NDI) for at least one hybrid automatic repeat request (HARQ) process associated with at least one reference HARQ process identifier (ID) is toggled, the processor is configured to set a size of a contention window of all channel access priority classes to a minimum size of a size of a contention window corresponding to each channel access priority classes,
wherein the reference HARQ process ID is an identifier for identifying an HARQ process of a data channel of the user equipment in the reference subframe.

5. The user equipment of claim 1, wherein when a new data indicator (NDI) for at least one hybrid automatic repeat request (HARQ) process associated with at least one reference HARQ process identifier (ID) is not toggled, the processor is configured to increase a size of a contention window of all channel access priority classes to a next greater size than a current size of a contention window among sizes allowed in a corresponding channel access priority class.

6. The user equipment of claim 1, wherein when a second grant indicates a third transmission, and the user equipment fails to access the channel to start the third transmission, in the unlicensed band, until an initial starting time point of the third transmission, the processor is configured to attempt a channel access for the third transmission, in the unlicensed band, before remaining starting time points of the third transmission other than the initial starting time point of the third transmission.

7. The user equipment of claim 6, wherein when the user equipment fails to access the channel to start the third transmission until the initial starting time point of the third transmission, the processor is configured to determine a channel access type used in the channel access for the third transmission after the initial starting time point of the third transmission based on whether the user equipment performs the third transmission, in the unlicensed band, within a maximum channel occupancy time (MCOT) configured by a station which receives the third transmission.

8. The user equipment of claim 7, wherein when the user equipment fails to access the channel to start the third transmission until the initial starting time point of the third transmission and the user equipment performs the third transmission within the MCOT configured by the station which receives the third transmission, the processor is configured to attempt to access the channel for the third transmission based on whether the channel is idle for a predetermined single time interval, in the unlicensed band, after the initial starting time point of the third transmission.

9. The user equipment of claim 7, wherein when the user equipment fails to access the channel to start the third transmission, in the unlicensed band, until the initial starting time point of the third transmission, the processor is configured to determine the channel access type used in the channel access for the third transmission after the initial starting time point of the third transmission based on whether the user equipment performs the third transmission in the MCOT configured by the station which receives the third transmission, regardless of an indication of the channel access type.

10. The user equipment of claim 7, wherein the channel access type comprises a first type indicating a random backoff based channel access and a second type indicating channel access in which channel access is performed based on whether the channel is idle for a predetermined single time interval.

11. The user equipment of claim 6, wherein when the user equipment fails to access the channel to start the third transmission until the initial starting time point of the third transmission, the processor is configured to access the channel for the third transmission after the initial starting time point of the third transmission regardless of an indication of a channel access type.

12. The user equipment of claim 1, wherein when the user equipment transmits a last subframe of a fourth transmission, in the unlicensed band, as the partial subframe, the processor is configured to configure the partial subframe composed of the number of SC-FDMA symbols starting from a Single Carrier (SC)-Frequency Division Multiple Access (FDMA) symbol index 0 to an SC-FDMA symbol index of 3, 6, or 10, and ends the fourth transmission by transmitting the configured partial subframe.

13. The user equipment of claim 12, wherein the processor is configured to transmit a Demodulation-Reference Signal (DM-RS) at an SC-FDMA symbol position having an SC-FDMA symbol index of 3 or 10 in a subframe.

14. An operation method of a user equipment configured to operate in a wireless communication system, the method comprising:
performing, in an unlicensed band, a first transmission on a single or a plurality of subframes,
wherein the performing the first transmission comprises performing the first transmission in a partial subframe having a duration shorter than a duration of one subframe according to at least one of an indication of a mode of the first transmission and a result of a channel access of the user equipment,
when the user equipment accesses a channel in the unlicensed band using a random backoff based channel access, adjusting a size of a contention window used in the random backoff based channel access based on whether a transmission of a reference subframe previously transmitted by the user equipment using the random backoff based channel access is successful or not, and
performing, in the unlicensed band, a second transmission by accessing the channel based on the size of the contention window,
wherein the reference subframe comprises the partial subframe,
wherein a backoff time in a procedure of the random backoff based channel access is determined based on a random number uniformly distributed within 0 and the size of the contention window.

15. The method of claim 14, wherein the adjusting the size of the contention window comprises, when an earliest subframe among a plurality of subframes that are continuously transmitted, by the user equipment in the unlicensed band, without a gap before a recently transmitted subframe is the partial subframe, determining, as the reference subframe, the earliest subframe and a subframe transmitted by the user equipment immediately after the earliest subframe among the plurality of subframes, wherein the recently transmitted subframe is a subframe that is transmitted most recently by the user equipment among subframes that are transmitted by the user equipment before a time point obtained by subtracting a predetermined time interval from a starting time point of a subframe including a grant, wherein the grant indicates the second transmission.

16. The method of claim 15, wherein the adjusting the size of the contention window further comprises, when the plurality of subframes only include the most recently transmitted subframe, determining only the most recently transmitted subframe in the unlicensed band as the reference subframe.

* * * * *